(12) United States Patent
Losik

(10) Patent No.: US 10,538,958 B2
(45) Date of Patent: Jan. 21, 2020

(54) SAFETY GATE FOR PETS AND SMALL CHILDREN

(71) Applicant: Kyle R. Losik, Rye, NH (US)

(72) Inventor: Kyle R. Losik, Rye, NH (US)

( * ) Notice: Subject to any disclaimer, the term of this patent is extended or adjusted under 35 U.S.C. 154(b) by 34 days.

(21) Appl. No.: 15/453,204

(22) Filed: Mar. 8, 2017

(65) Prior Publication Data

US 2017/0260802 A1   Sep. 14, 2017

Related U.S. Application Data

(60) Provisional application No. 62/305,224, filed on Mar. 8, 2016.

(51) Int. Cl.
*E06B 9/02* (2006.01)
*E06B 9/01* (2006.01)
*E06B 9/00* (2006.01)

(52) U.S. Cl.
CPC .............. *E06B 9/02* (2013.01); *E06B 9/01* (2013.01); *E06B 2009/002* (2013.01); *E06B 2009/015* (2013.01)

(58) Field of Classification Search
CPC ............. E06B 9/02; E06B 9/08; E06B 9/0692
See application file for complete search history.

(56) References Cited

U.S. PATENT DOCUMENTS

| | | | | |
|---|---|---|---|---|
| 181,318 A | * | 8/1876 | Davis ..................... | E06B 9/52 160/372 |
| 232,725 A | * | 9/1880 | Joseph .................... | E06B 9/52 160/372 |
| 1,216,794 A | * | 2/1917 | Garman .................. | E06B 9/54 160/23.1 |
| 2,225,167 A | * | 12/1940 | Farmer .................. | E06B 9/01 160/373 |
| 5,060,421 A | * | 10/1991 | Castelli ................ | E05B 65/0014 24/31 V |
| 5,312,467 A | * | 5/1994 | Wolfe ................... | A62B 23/025 55/493 |
| 5,531,258 A | | 7/1996 | Poulson et al. | |
| 5,575,113 A | * | 11/1996 | Huang .................... | E06B 9/02 160/372 |

(Continued)

*Primary Examiner* — Justin B Rephann
(74) *Attorney, Agent, or Firm* — Pandiscio & Pandiscio

(57) ABSTRACT

A safety gate for preventing pets and small children from passing through an opening, the safety gate comprising: a collapsible frame for selective disposition in the opening, the collapsible frame comprising: a resizable base having a first end and a second end, the resizable base being configured so that the distance between the first end and the second end is adjustable; and first and second arms adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and a flexible barrier for adjustable mounting to the collapsible frame so as to prevent a pet or small child from passing through the space between the resizable base and the first and second arms.

24 Claims, 53 Drawing Sheets

(56) References Cited

U.S. PATENT DOCUMENTS

| | | | |
|---|---|---|---|
| 5,657,809 A | 8/1997 | Longoria et al. | |
| 5,660,144 A * | 8/1997 | Venti | A01K 1/035 119/416 |
| 5,671,790 A | 9/1997 | Andersen et al. | |
| 5,704,164 A * | 1/1998 | Huang | E06B 9/02 160/372 |
| 5,868,191 A | 2/1999 | Blackmon, Jr. | |
| 5,906,421 A * | 5/1999 | Floyd | E06B 9/02 160/100 |
| 6,056,038 A * | 5/2000 | Foster | E06B 9/02 160/240 |
| 6,189,839 B1 | 2/2001 | Lemieux | |
| 6,296,041 B1 * | 10/2001 | Cicero | E06B 9/02 160/327 |
| 6,301,832 B1 | 10/2001 | Andersen | |
| 6,470,948 B2 | 10/2002 | Yates et al. | |
| 6,638,885 B1 | 10/2003 | Mcgrath et al. | |
| 6,711,857 B1 | 3/2004 | Wagnitz et al. | |
| 6,733,204 B1 * | 5/2004 | Paniccia | E01F 7/06 160/238 |
| 6,807,999 B1 * | 10/2004 | Bowen | E01F 13/028 160/24 |
| 7,178,792 B2 | 2/2007 | Monahan et al. | |
| 7,219,709 B1 | 5/2007 | Williams | |
| 7,334,624 B2 | 2/2008 | Waldman et al. | |
| 7,356,966 B2 | 4/2008 | Burke | |
| 7,377,490 B1 * | 5/2008 | Khosravian | E01F 13/028 119/416 |
| 7,658,220 B2 | 2/2010 | Yates | |
| 8,230,816 B2 | 7/2012 | Hirokawa et al. | |
| D698,505 S | 1/2014 | Muzaffer | |
| 8,745,922 B1 | 6/2014 | Matsuda et al. | |
| 8,881,787 B2 * | 11/2014 | Wang | E06B 9/60 160/24 |
| 8,887,441 B2 | 11/2014 | Lundh | |
| 9,140,056 B2 | 9/2015 | Fitzpatrick | |
| 9,328,551 B2 | 5/2016 | Henderson et al. | |
| 9,598,896 B1 * | 3/2017 | Pichik | E06B 9/08 |
| 2003/0029089 A1 | 2/2003 | Wenzl et al. | |
| 2005/0098770 A1 * | 5/2005 | Schell | E01F 13/028 256/25 |
| 2005/0173078 A1 * | 8/2005 | Perez, Jr. | A01K 1/035 160/99 |
| 2006/0092378 A1 | 5/2006 | Marsden et al. | |
| 2006/0151123 A1 * | 7/2006 | Chandler | E01F 13/028 160/24 |
| 2006/0180283 A1 * | 8/2006 | Andersen | E06B 9/00 160/215 |
| 2006/0180284 A1 * | 8/2006 | Wiggins | E06B 9/02 160/368.1 |
| 2007/0144691 A1 * | 6/2007 | Yates | E06B 9/04 160/377 |
| 2008/0307708 A1 * | 12/2008 | Quan | E06B 9/02 49/55 |
| 2009/0158665 A1 * | 6/2009 | Wu | E06B 9/02 49/55 |
| 2010/0293861 A1 | 11/2010 | Ting et al. | |
| 2011/0088323 A1 * | 4/2011 | Lundh | E05B 43/00 49/57 |
| 2012/0186755 A1 | 7/2012 | Sessa | |
| 2012/0211182 A1 | 8/2012 | Pilgrim et al. | |
| 2014/0373448 A1 | 12/2014 | Henderson et al. | |
| 2015/0330142 A1 * | 11/2015 | Pilgrim | E06B 5/10 49/465 |
| 2019/0032399 A1 | 1/2019 | Fitzpatrick | |

* cited by examiner

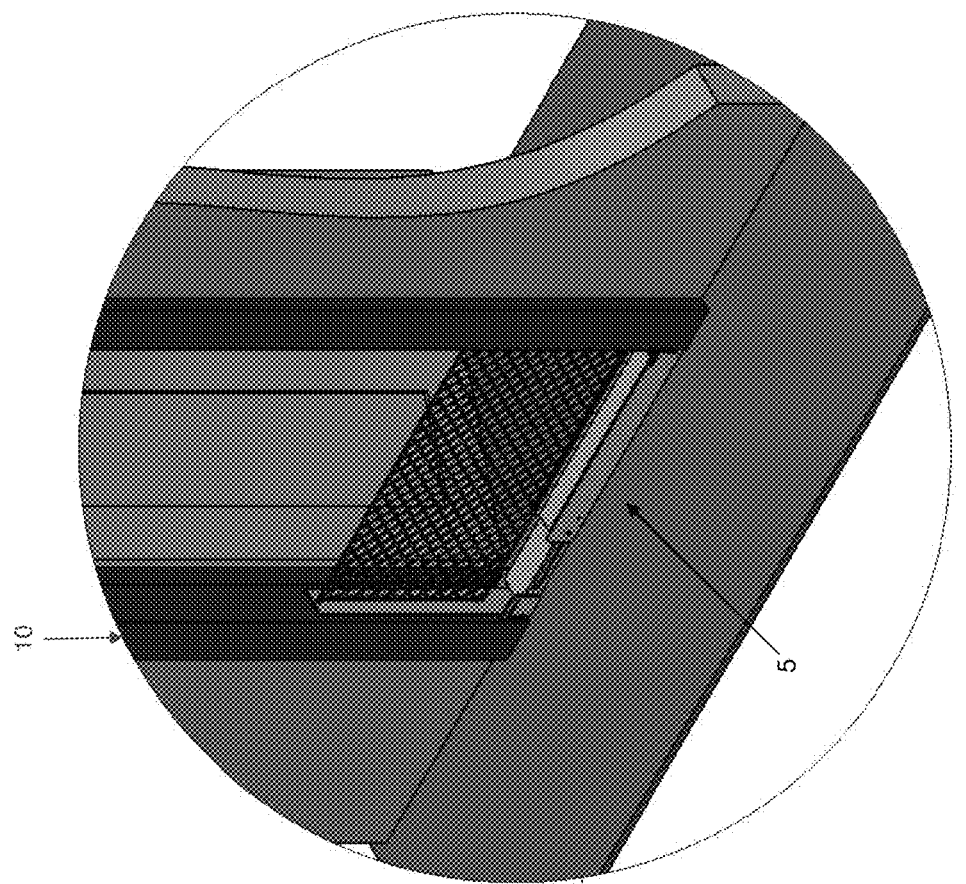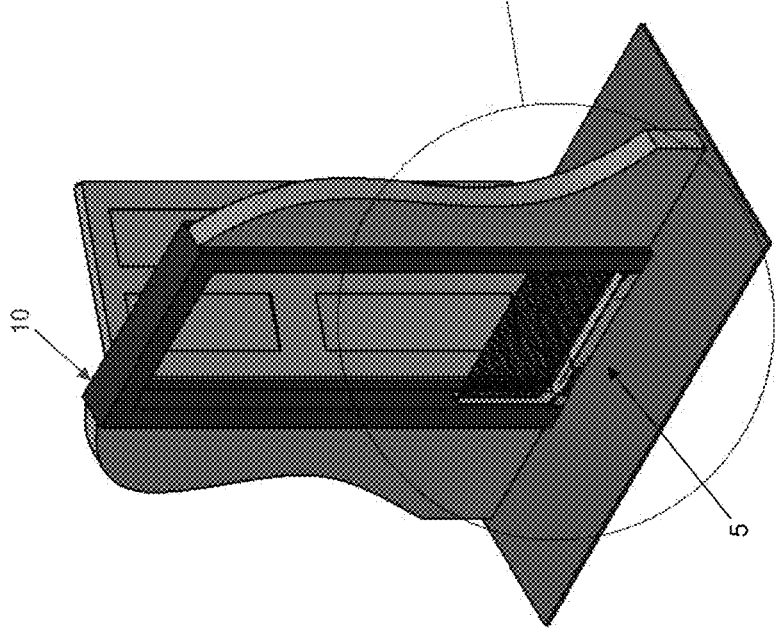
FIG. 2

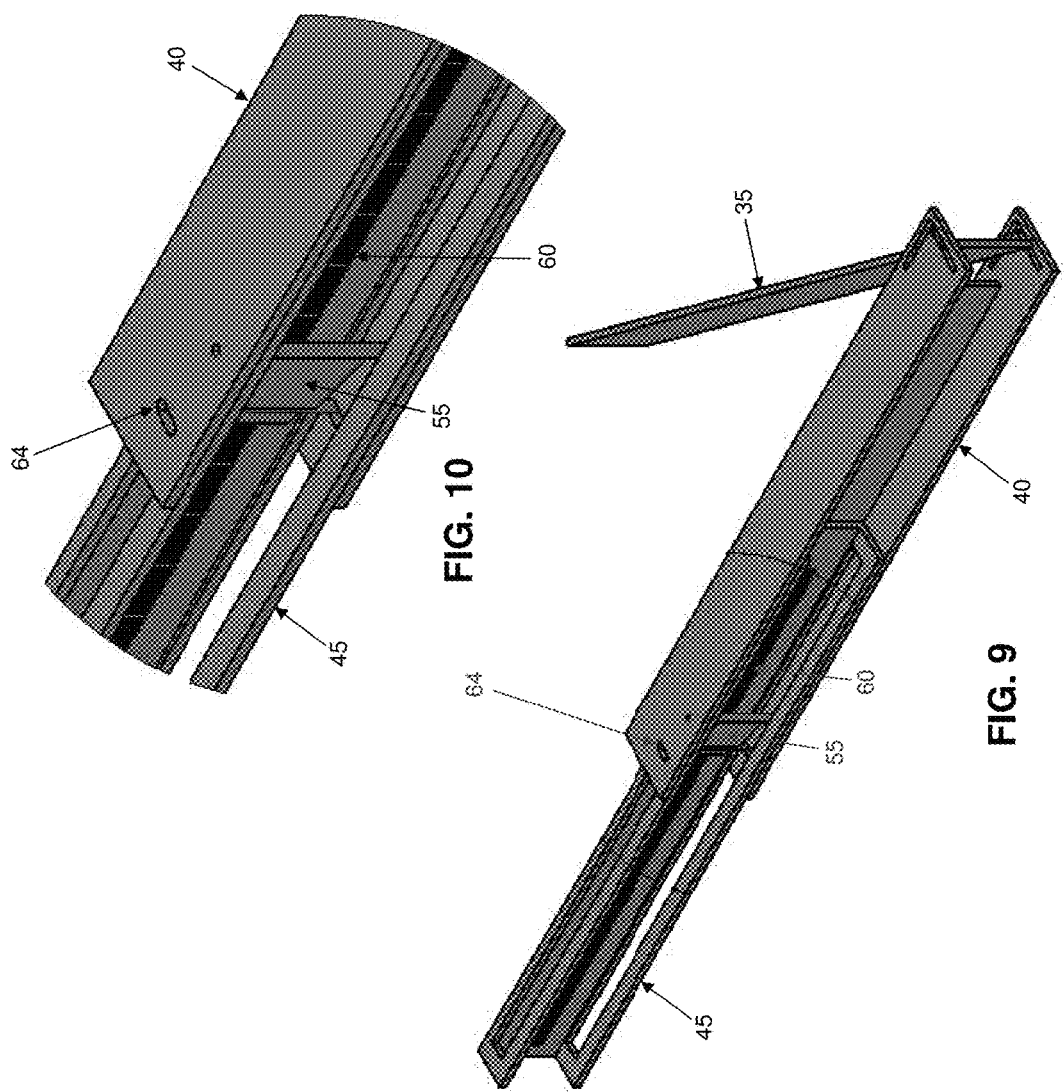

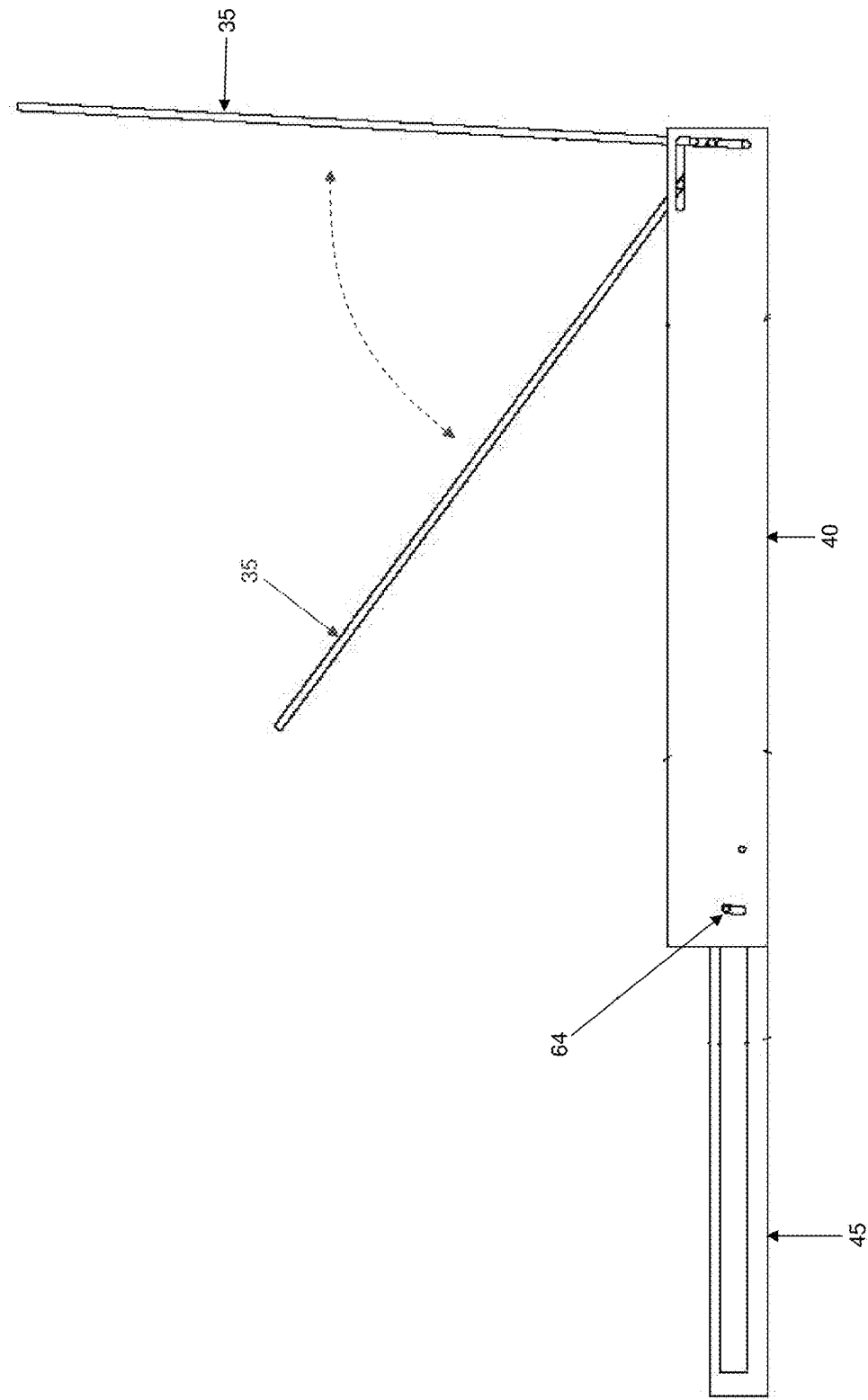

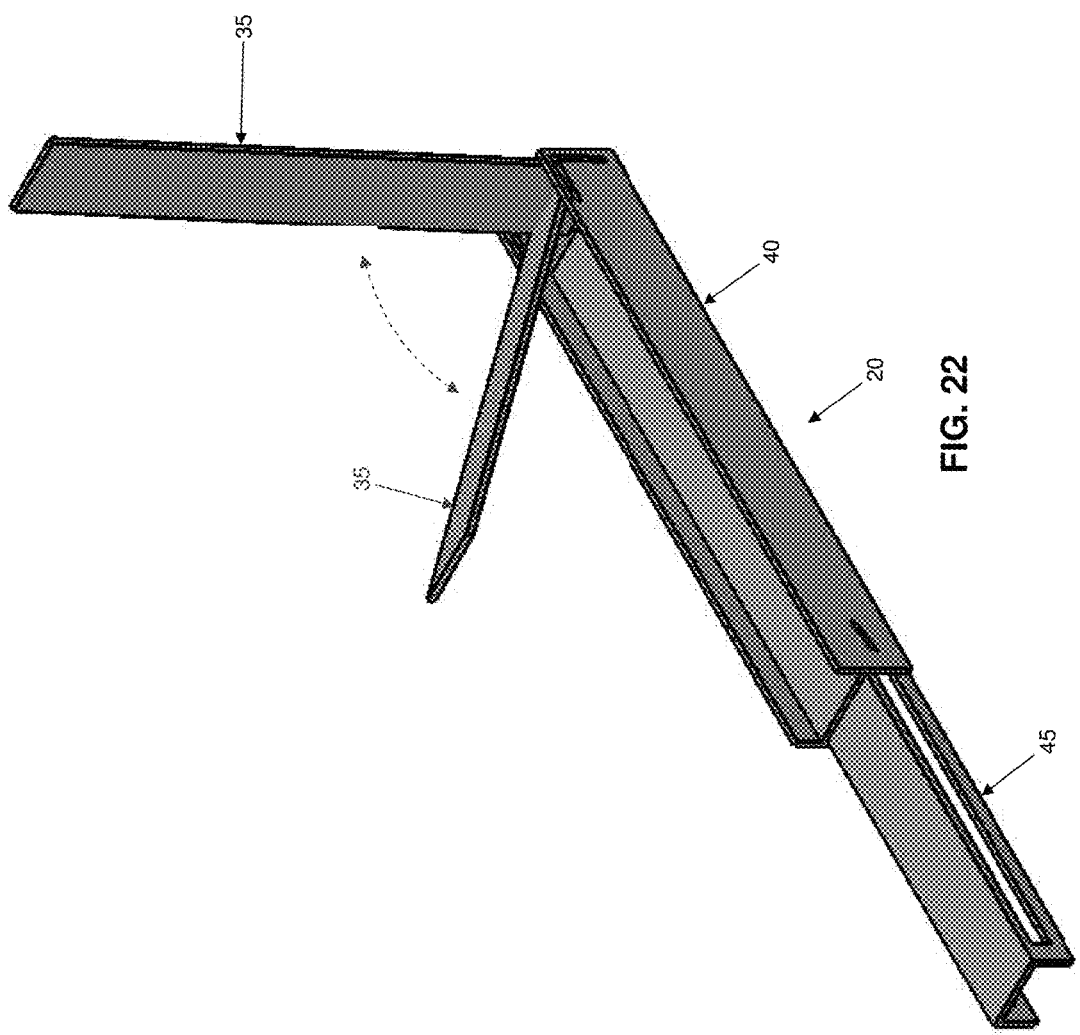

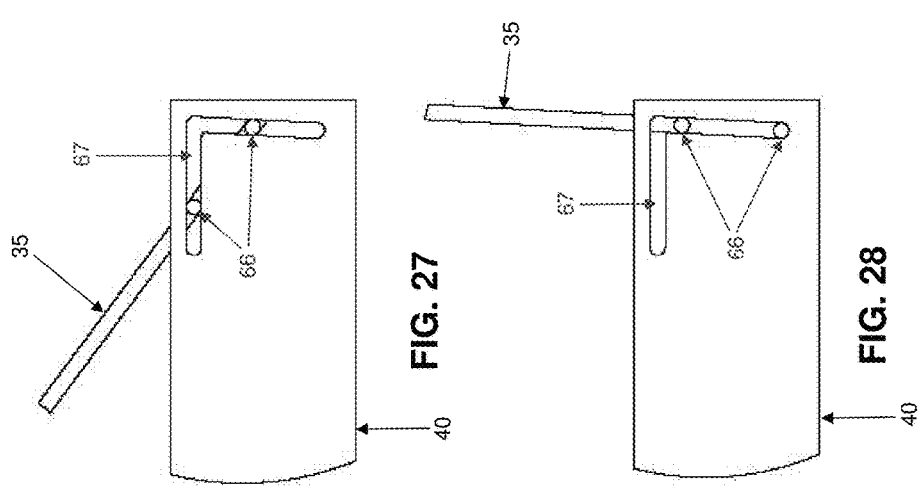
FIG. 27
FIG. 28
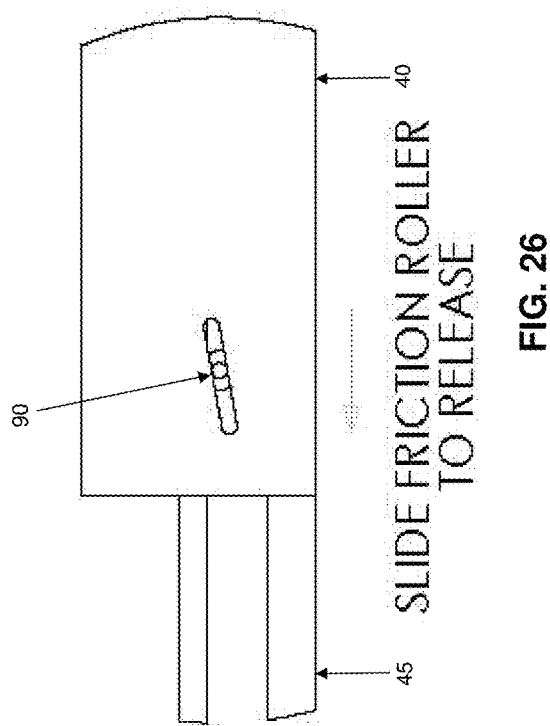
FIG. 26

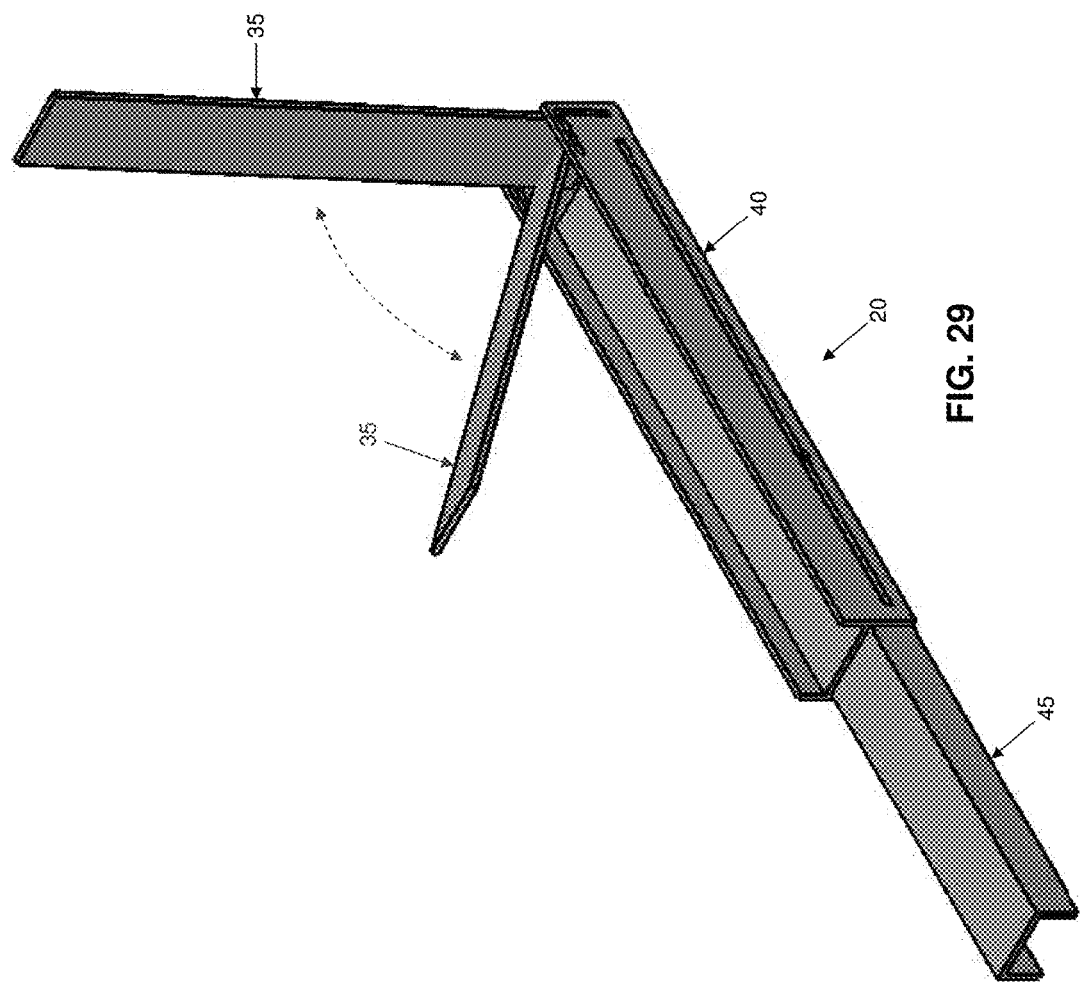

SAFETY GATE FOR PETS AND SMALL CHILDREN

REFERENCE TO PENDING PRIOR PATENT APPLICATION

This patent application claims benefit of prior U.S. Provisional Patent Application Ser. No. 62/305,224, filed Mar. 8, 2016 by Kyle R. Losik for COLLAPSIBLE AND FLEXIBLE PET GATE, which patent application is hereby incorporated herein by reference.

FIELD OF THE INVENTION

This invention relates to gates in general, and more particularly to safety gates for pets and small children.

BACKGROUND OF THE INVENTION

Pet owners and parents of small children currently use a wide variety of safety gates to keep their pets and small children restricted from certain areas. Safety gates provide an array of essential benefits including safety, training, protection, etc.

There are generally two types of safety gates. One type of safety gate (sometimes referred to herein as a "substantially permanent" safety gate) is a safety gate which is intended to be set up once and then thereafter be left in place on a substantially permanent basis. The other type of safety gate (sometimes referred to herein as a "temporary" safety gate) is a safety gate which is intended to be set up and taken down as needed.

Current versions of both types of safety gates suffer from significant limitations.

More particularly, substantially permanent safety gates are stationary gates which are secured to walls, doorframes, etc. by permanent fasteners (e.g., bolts, screws, etc.) which extend into the walls, doorframes, etc. In general, these substantially permanent gates are placed in a doorway or hallway or walkway and remain in place on a substantially permanent basis. The primary benefit of substantially permanent gates is that they are generally easier to pass through, since they typically have a hinged door that is opened by a latch or handle. A significant disadvantage of substantially permanent gates is that they are effectively fixed in place and cannot be easily moved from one location to another. Thus, substantially permanent safety gates effectively serve a single location.

Temporary safety gates comprise "freestanding" safety gates and temporary gates which are fastened in place against walls, doorframes, etc. using temporary means such as clamps, sliding mechanisms, etc. The primary benefit of temporary safety gates is that they can be set up or taken down as needed. A significant disadvantage of temporary safety gates is that they are not secured to an adjoining architectural structure (in the case of a freestanding safety gate) or they are inadequately secured to (e.g., they slip or easily detach from) an adjoining architectural structure (in the case of a temporary gate). In addition, temporary safety gates tend to be inconvenient when an adult needs to pass by the safety gate—the adult typically needs to either (i) "step over" the temporary gate (and this must be done without touching the temporary gate for fear of knocking over or moving aside the temporary safety gate) or (ii) the adult needs to take down or move the safety gate, pass through the opening, and then reset the safety gate.

In addition to the foregoing, substantially permanent safety gates and temporary safety gates also both possess the following additional limitations:

1. Inflexible—Current safety gates (both substantially permanent safety gates and temporary safety gates) are generally formed out of rigid materials (e.g., plastic, wood, metal, etc.). These materials make the safety gates substantially rigid, and that rigidity creates significant limitations and complications. More particularly, rigid safety gates have no "give", making them difficult for adults to pass by. To pass by a rigid safety gate, an adult must either (a) "step over" the safety gate, or (b) have a door formed in the safety gate, or (c) remove the safety gate (and then set the safety gate back up again). Stepping over a rigid safety gate is awkward, often resulting in (i) a "banged up" shin as the person's leg strikes the rigid safety gate, and/or (ii) the safety gate "crashing down", and/or (iii) worse—a person falling over while attempting to step over the safety gate. Providing a door in the safety gate in order to allow an adult to pass by the safety gate generally requires a more complex safety gate design, and also generally requires that the safety gate be constructed out of substantially rigid materials. Removing the safety gate in order to allow an adult to pass by the opening is impractical with permanent safety gates, and removing temporary safety gates to allow an adult to pass by the opening is generally inconvenient and requires free hands and space (something which is not always readily available). In addition, after the temporary safety gate has been taken down and the person passes through the doorway or hallway or walkway, the safety gate must then be set back in place again.

2. Structurally Large—The average size of "smaller" rigid safety gates is 23" H (high)×28" W (wide). Temporary rigid safety gates generally take up 4.47 square feet of storage space (i.e., 23"×28"=4.47 square feet), are bulky, and are often difficult to maneuver.

Thus there is a need for a new and improved safety gate for pets and small children which is temporary, flexible, folds up to a manageable size and provides an easy way for adults to pass by the safety gate without needing to move the entire safety gate.

SUMMARY OF THE INVENTION

These and other objects are addressed by the provision and use of a new and improved safety gate for pets and small children that is temporary, flexible, folds up to a manageable size and provides an easy way for adults to pass by the safety gate without needing to move the entire safety gate.

More particularly, in accordance with the present invention, there is provided a new and improved safety gate which is designed to be positioned in an opening such as a doorway or hallway or walkway. The new and improved safety gate generally comprises a collapsible frame and a flexible barrier.

The collapsible frame acts as a support structure for the flexible barrier, holding the flexible barrier extending across the opening which is to be closed off. The collapsible frame is designed to make a pressure fit against an adjoining architectural structure, and is designed to be folded up (i.e., collapsed and condensed) to a manageable size when not in use.

The flexible barrier is intended to be set across the collapsible frame when the opening is to be closed off, and disconnected from the collapsible frame when an adult needs to pass by the safety gate.

In use, the collapsible frame is erected across an opening such as a doorway or hallway or walkway, with the collapsible frame making a pressure fit against an adjoining architectural structure. Then the flexible barrier is set across the collapsible frame so as to close off the opening. When an adult needs to pass by the safety gate, one end of the flexible barrier is disconnected from the collapsible frame so that the adult can pass through the opening. After the adult has passed through the opening, the flexible barrier is re-set across the collapsible frame so as to once again close off the opening. When the safety gate is no longer needed in that location, the flexible barrier is released and the collapsible frame is taken down, whereupon the safety gate may be moved to another location or placed into storage.

In one form of the invention, there is provided a safety gate for preventing pets and small children from passing through an opening, the safety gate comprising:

a collapsible frame for selective disposition in the opening, the collapsible frame comprising:
  a resizable base having a first end and a second end, the resizable base being configured so that the distance between the first end and the second end is adjustable; and
  first and second arms adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and
a flexible barrier for adjustable mounting to the collapsible frame so as to prevent a pet or small child from passing through the space between the resizable base and the first and second arms.

In another form of the invention, there is provided a method for preventing pets and small children from passing through an opening, the method comprising:

providing a safety gate, the safety gate comprising:
a collapsible frame for selective disposition in the opening, the collapsible frame comprising:
  a resizable base having a first end and a second end, the resizable base being configured so that the distance between the first end and the second end is adjustable; and
  first and second arms adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and
  a flexible barrier for adjustable mounting to the collapsible frame so as to prevent a pet or small child from passing through the space between the resizable base and the first and second arms;
positioning the collapsible frame across the opening in its expanded configuration so that the resizable base extends along the bottom of the opening and the first and second arms extend along opposing sides of the opening, with the first and second arms applying an outward force to opposing sides of the opening; and positioning the flexible barrier on the collapsible frame so as to prevent a pet or small child from passing through the space between the resizable base and the first and second arms.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIGS. 1-4 are schematic views showing a new and improved safety gate formed in accordance with the present invention, wherein the safety gate is shown erected in a doorframe so as to close off the lower portion of the opening of the doorway to passage by pets and small children;

FIGS. 8-17 are schematic views showing the collapsible frame of the safety gate of FIGS. 1-7 in further detail;

FIGS. 22-28 are schematic views showing another form of the collapsible frame of the safety gate of FIGS. 1-7;

FIGS. 29-35 are schematic views showing still another form of the collapsible frame of the safety gate of FIGS. 1-7;

DETAILED DESCRIPTION OF THE PREFERRED EMBODIMENTS

Figure 1:
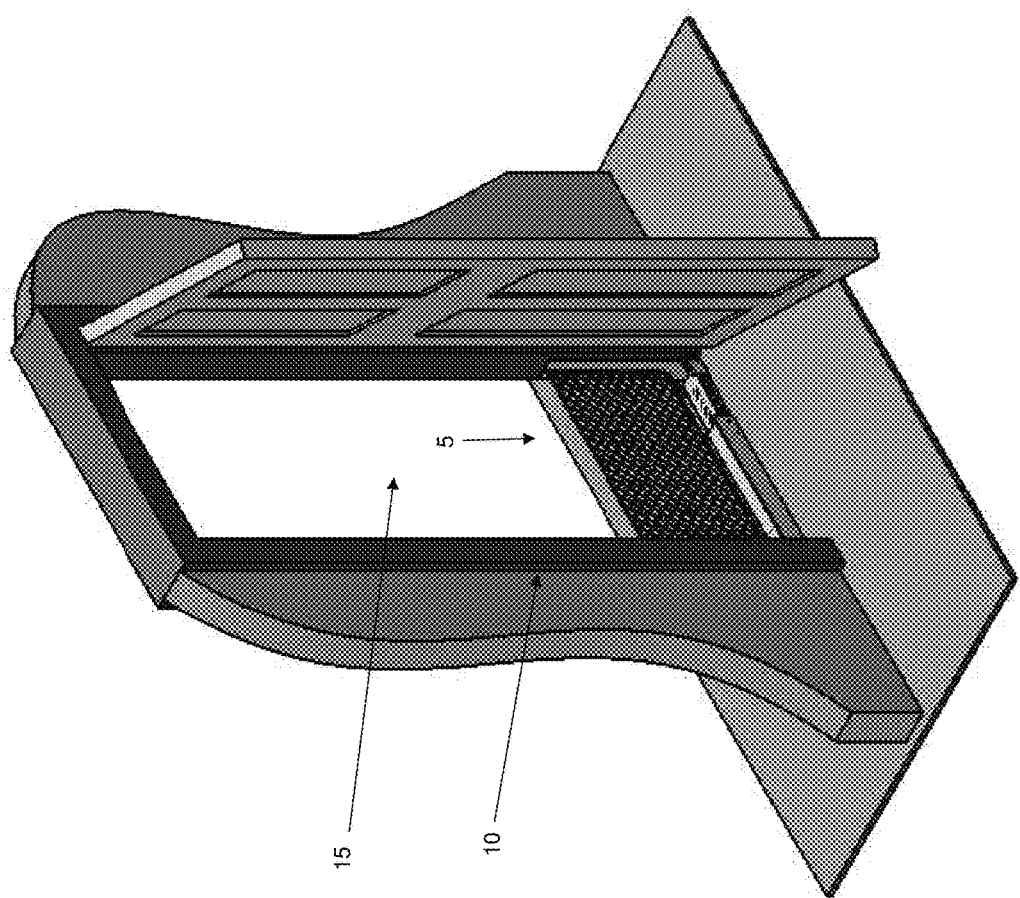
Figure 3:
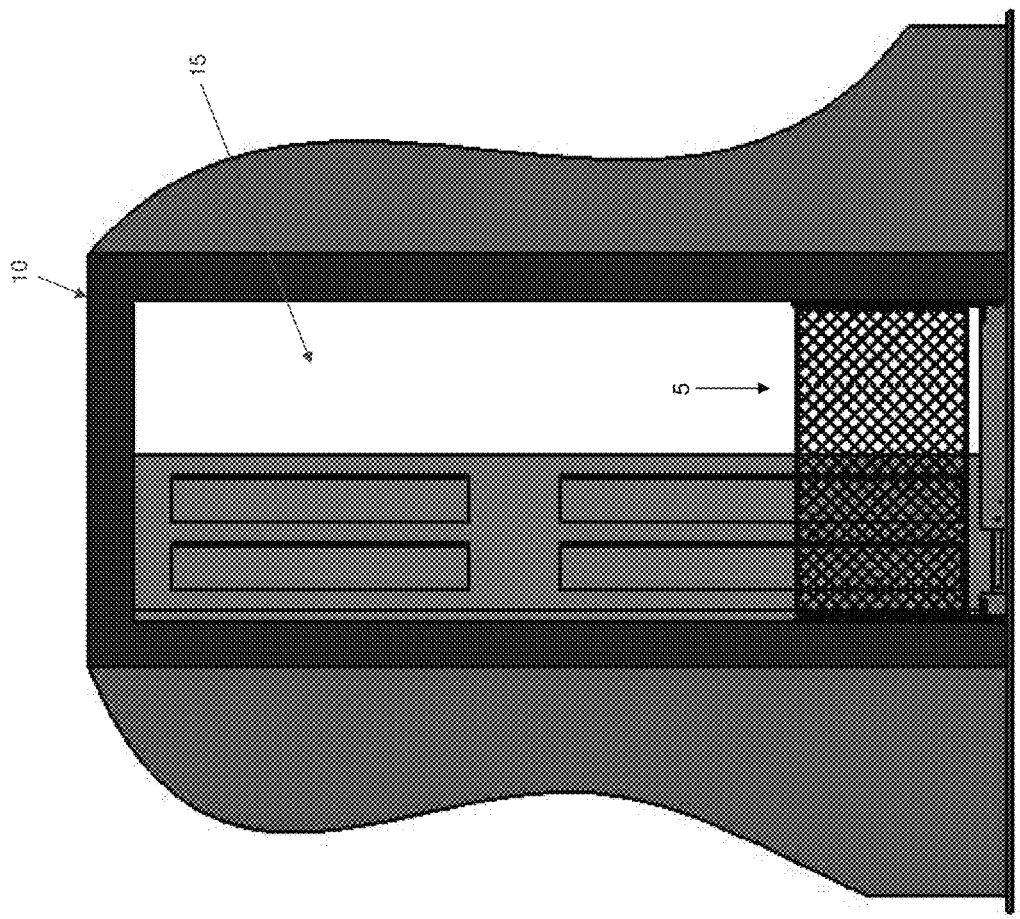
Figure 4:
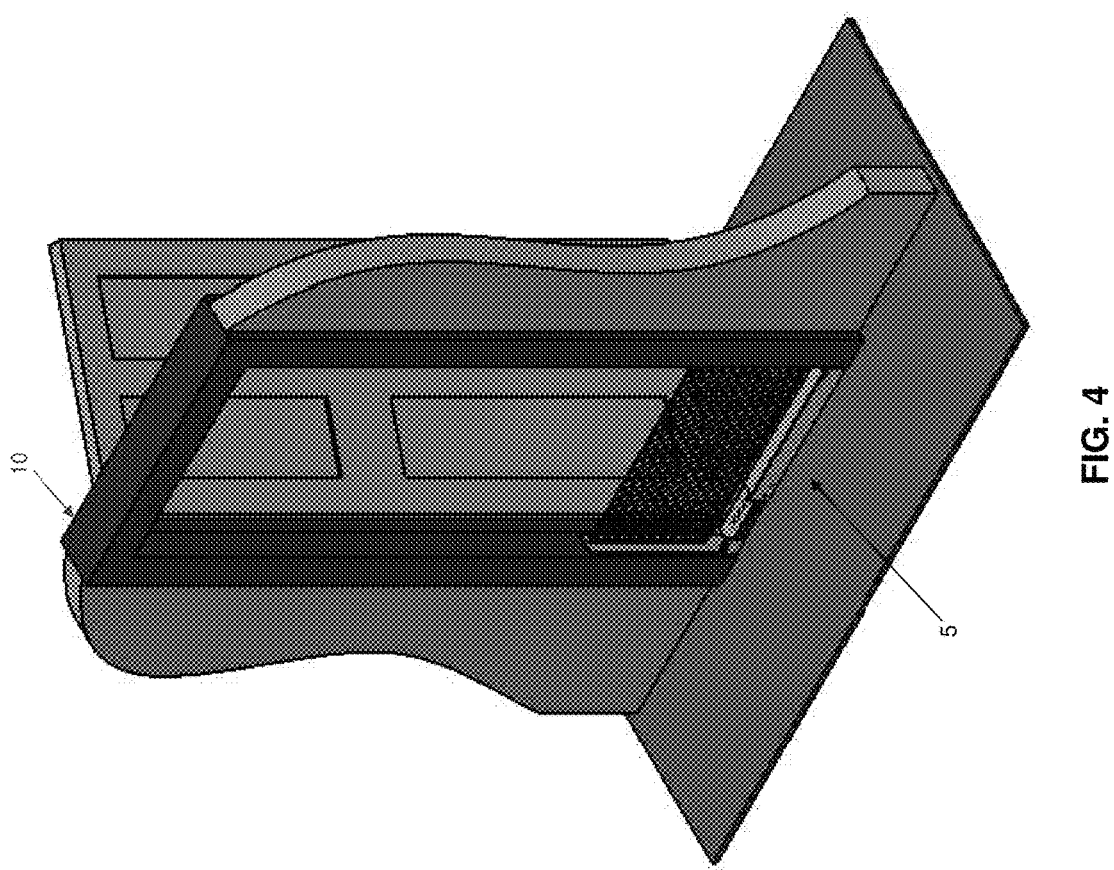
Figure 5:
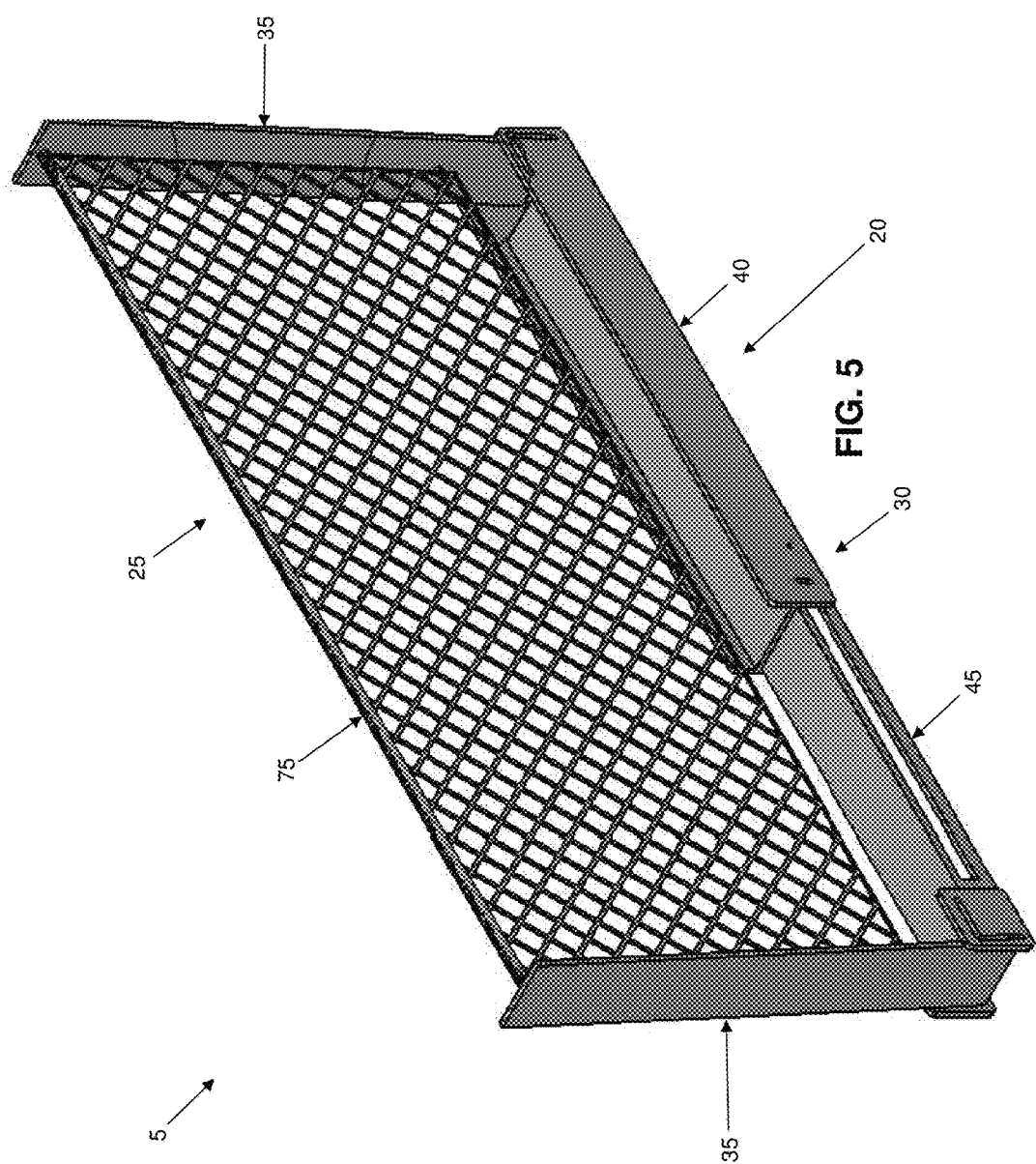
FIGS. 5-7 are schematic views showing the safety gate of FIGS. 1-4 in further detail.
Figure 6:
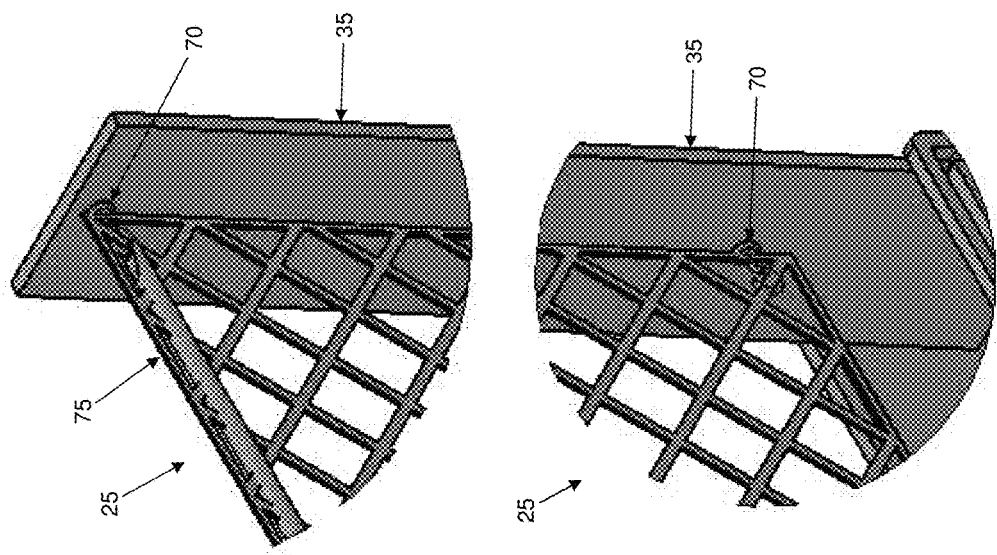
Figure 7:
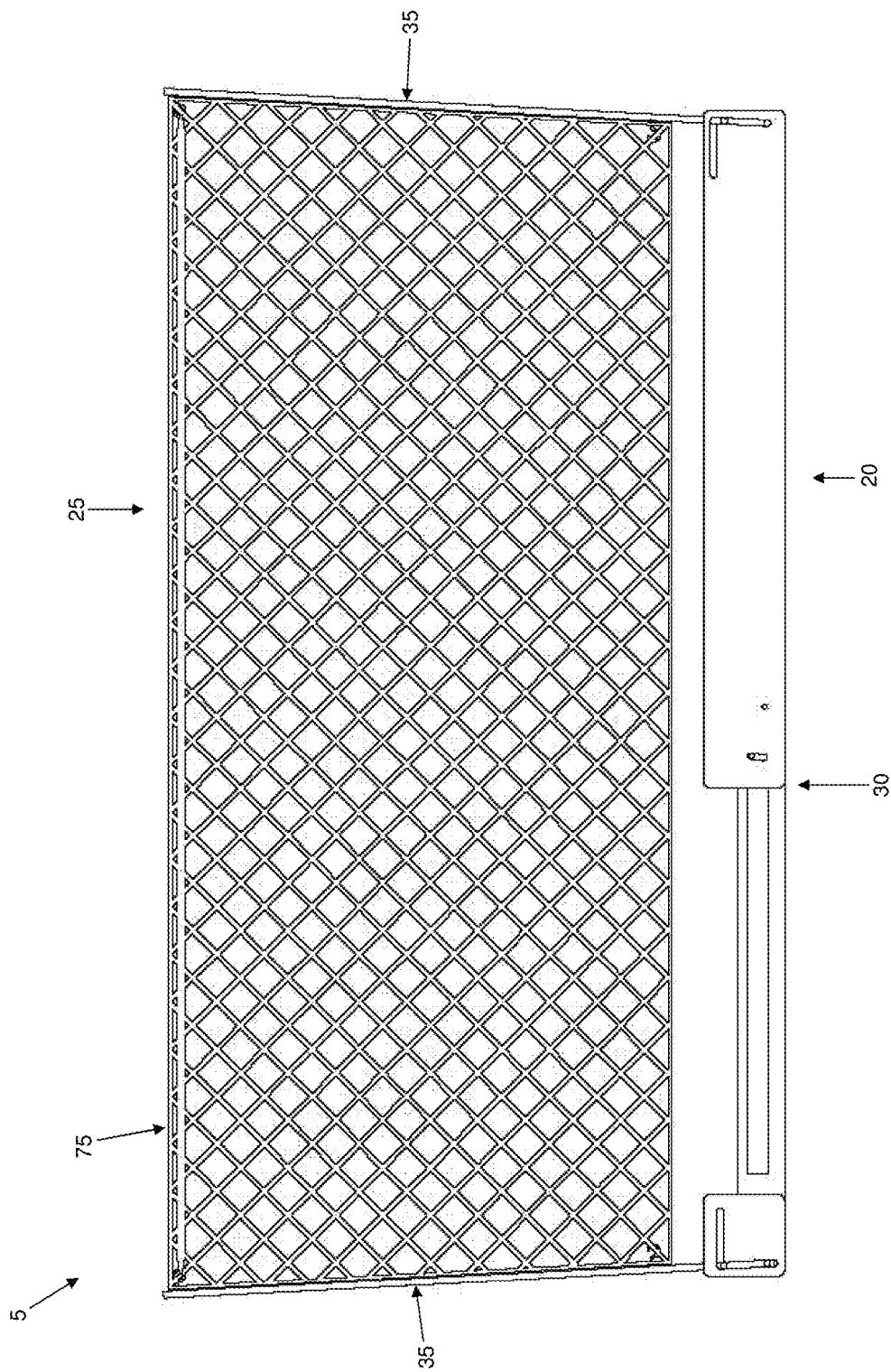
Figure 8:
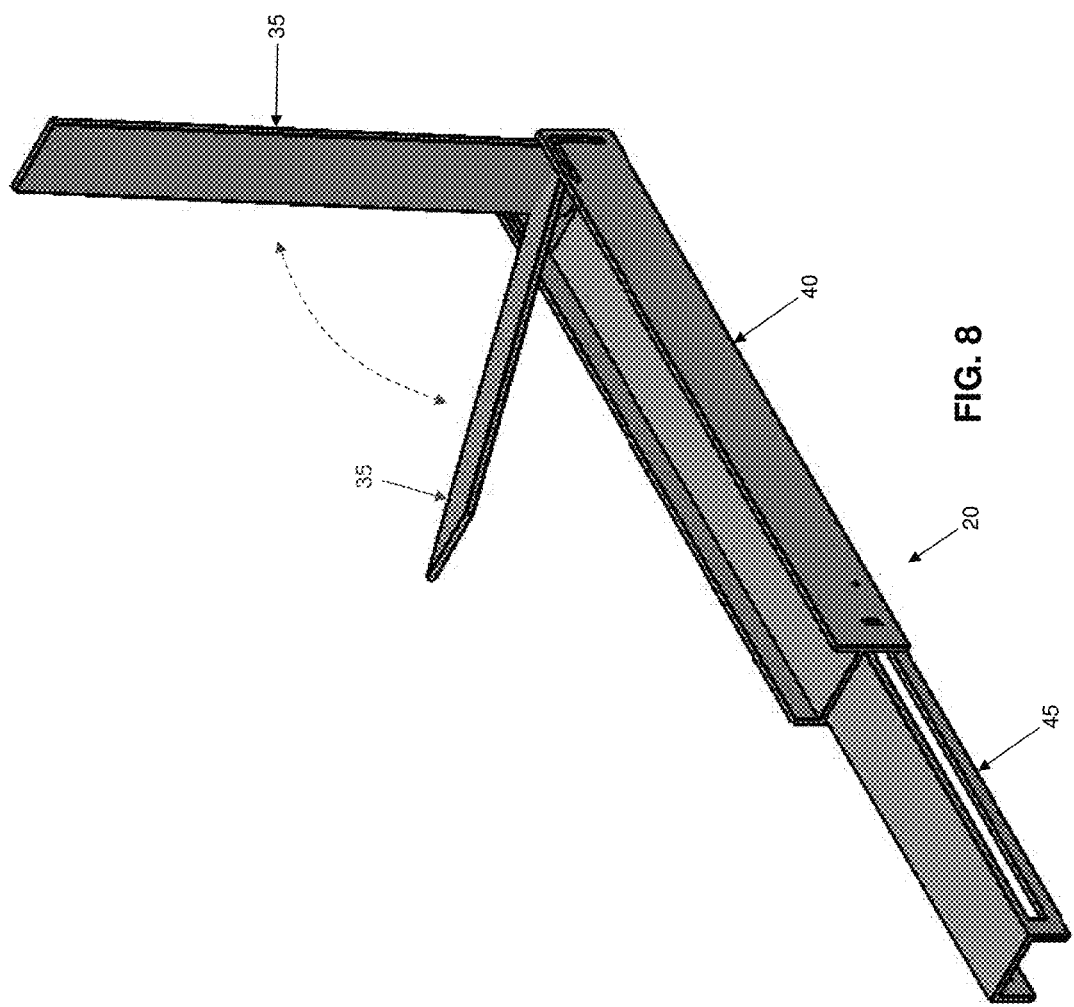
Figure 13:
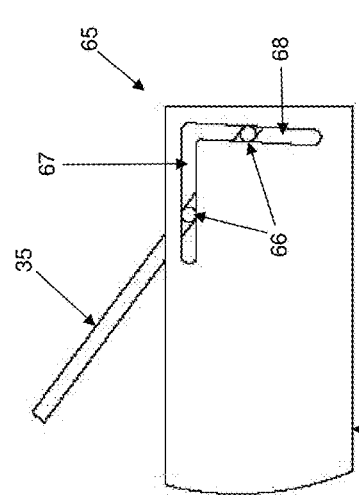
Figure 14:
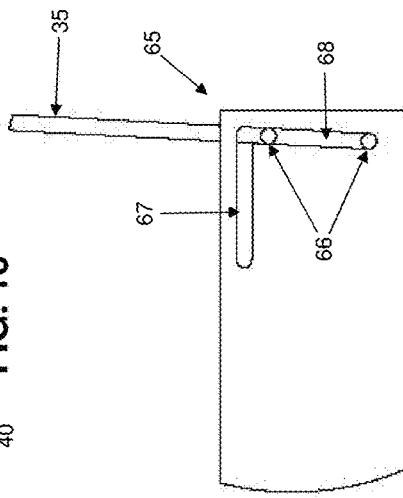
Figure 12:
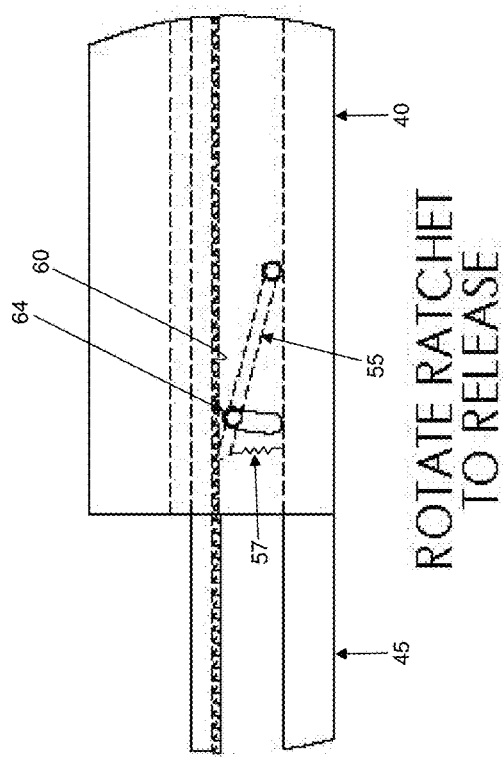

The New and Improved Safety Gate in General

The present invention comprises the provision and use of a new and improved safety gate which may be positioned in an opening such as a doorway or hallway or walkway so as to close off the opening to pets and/or small children. The safety gate generally comprises a collapsible frame and a flexible barrier. The collapsible frame acts as a support structure for the flexible barrier, holding the flexible barrier as the barrier extends across the opening of the doorway or hallway or walkway. The collapsible frame is designed to make a pressure fit against an adjoining architectural structure, and is designed to be folded up (i.e., collapsed and condensed) to a manageable size when not in use. The flexible barrier is intended to be set across the collapsible frame when the opening is to be closed off, and can be selectively detached from the collapsible frame when an adult needs to pass through the opening. The safety gate is intended to be temporary in nature and thus able to be can be erected in any doorway, walkway, etc.

Safety Gate Having a Flexible Barrier Manually "Hung" on the Collapsible Frame In one preferred form of the invention, the safety gate is constructed so that the flexible barrier is manually "hung" on the collapsible frame.

More particularly, and looking now at FIGS. 1-4, there is shown a new and improved safety gate 5 erected in a doorframe 10 so as to close off the lower portion of the opening 15 of the doorway. Safety gate 5 is releasably secured in doorframe 10 using a pressure fit so as to provide a barrier to prevent a pet or small child from passing through opening 15 (e.g., so as to prevent a pet or small child from passing from one room to another room). Safety gate 5 is also capable of closing off other openings, e.g., in a hallway or walkway, so as to restrict access by a pet or small child.

Looking next at FIGS. 5-8, safety gate 5 is shown in greater detail. Safety gate 5 generally comprises a collapsible frame 20 and a flexible barrier 25.

The Collapsible Frame

FIGS. 5-17 show one preferred construction for collapsible frame 20. In this form of the invention, collapsible frame 20 comprises a resizable base 30 and a pair of hinged arms 35.

Resizable base 30 comprises two base members 40, 45 which are telescopically extendable relative to one another so as to accommodate an array of different doorway (or hallway or walkway) widths. Base members 40, 45 are able to slide freely in one direction (i.e., in an opening direction) but are prevented from returning in the other direction (i.e., in a closing direction) by a latch mechanism 50. In the embodiment shown in FIGS. 5-17, latch mechanism 50 comprises a pivot plate 55 which is spring-biased (i.e., by a spring 57, FIG. 12) into engagement with a ribbed rack 60. To release latch mechanism 50, a finger tab 64 is used to push pivot plate 55 against the power of spring 57, whereby to allow pivot plate 55 to disengage from ribbed rack 60.

Hinged arms 35 pivot upwards from resting positions parallel to resizable base 30, pivoting on hinges 65. Each of the hinges 65 is formed by two pins 66 which ride in two slots 67, 68. When hinged arms 35 are fully erect, they lock into place by means of pins 66 residing in slots 68. Hinged arms 35 can be released from their locked erect positions by pulling upwards on the hinged arms and then folding the hinged arms back down on resizable base 30, with pins 66 moving into slots 67.

Note that when hinged arms 35 are in their erect positions, the hinged arms preferably yieldably angle outward slightly at their upper ends so as to ensure secure engagement of the hinged arms with the vertical walls of the doorway (or hallway or walkway). In other words, hinged arms 35 diverge outwardly as they extend away from resizable base 30, and hinged arms 35 are resilient so that they can be urged inwardly towards one another.

Note also that hinged arms 35 include fasteners 70 (FIG. 6) to which flexible barrier 25 may be releasably secured (i.e., so that flexible barrier 25 may be manually "hung" on collapsible frame 20).

Figure 15:
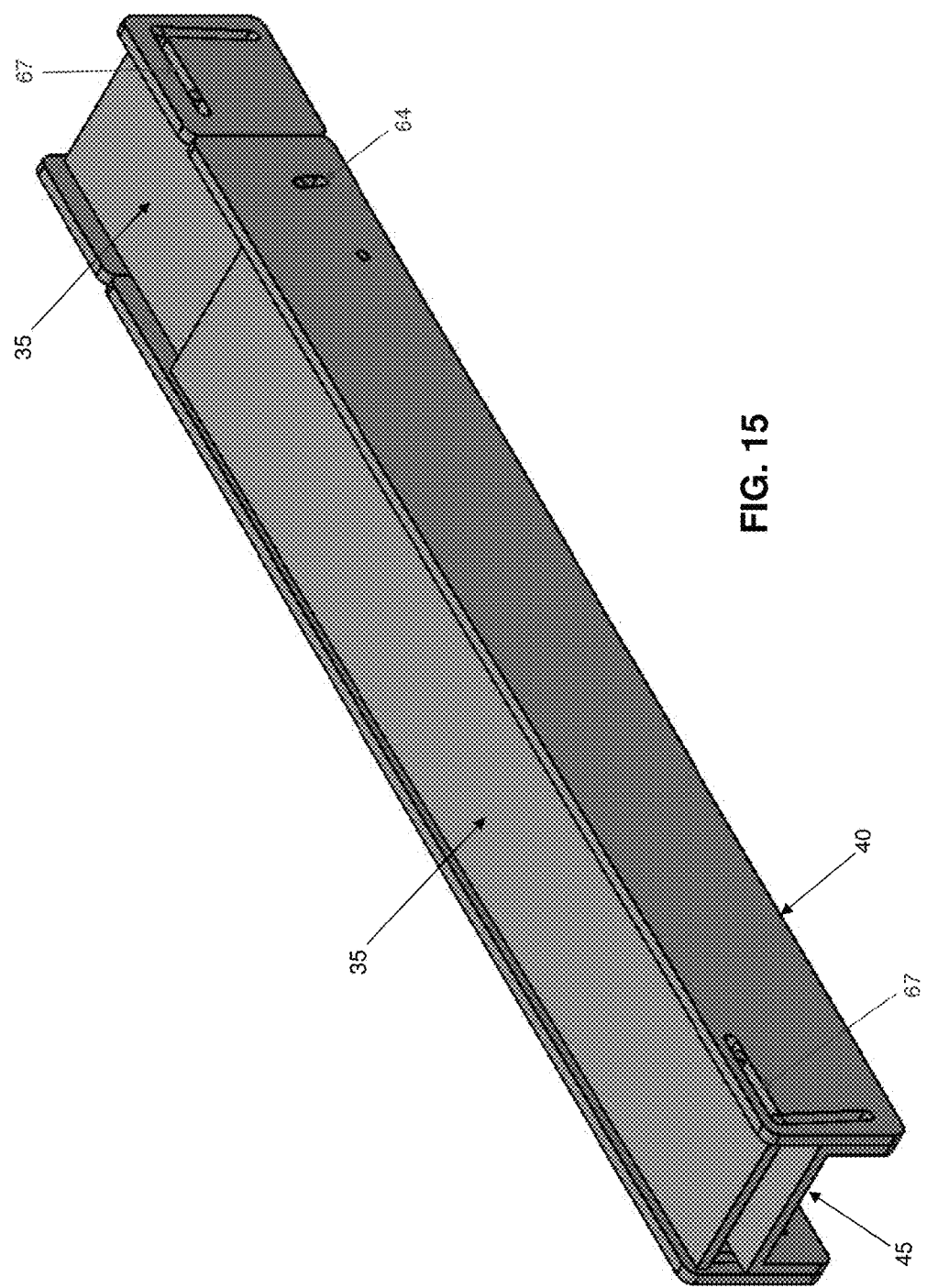
Figure 16:
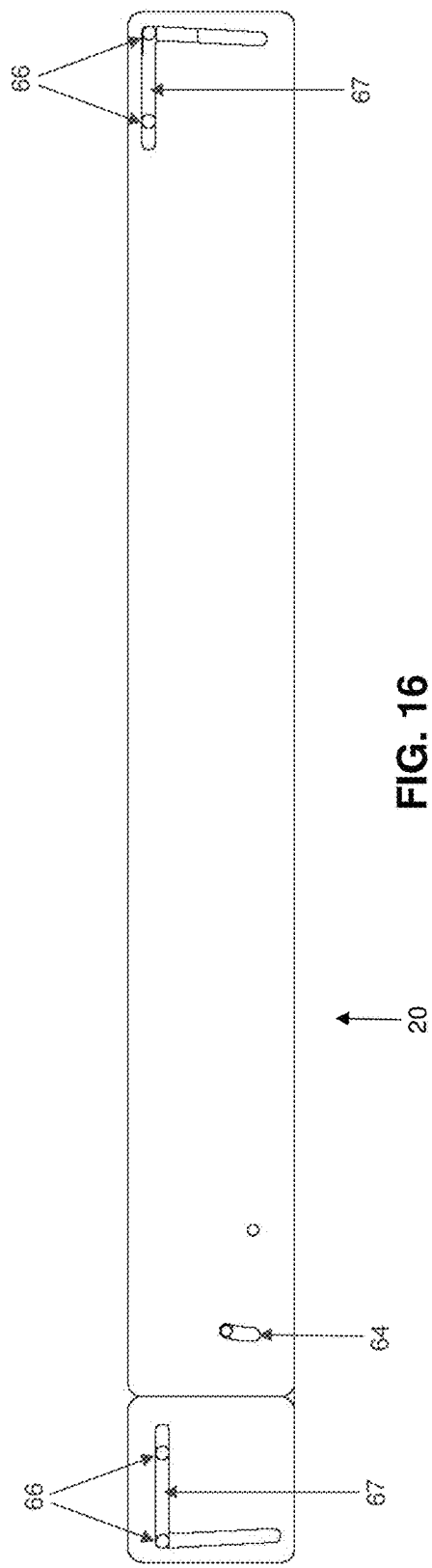
Figure 17:
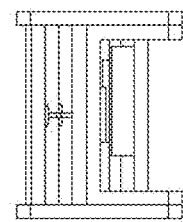

And note that resizable base 30 and hinged arms 35 may be folded up to a compact condition for easy transport and storage, i.e., with resizable base 30 reduced in size and with hinged arms 35 extending parallel to resizable base 30 (FIGS. 15-17).

The Flexible Barrier

Figure 18:
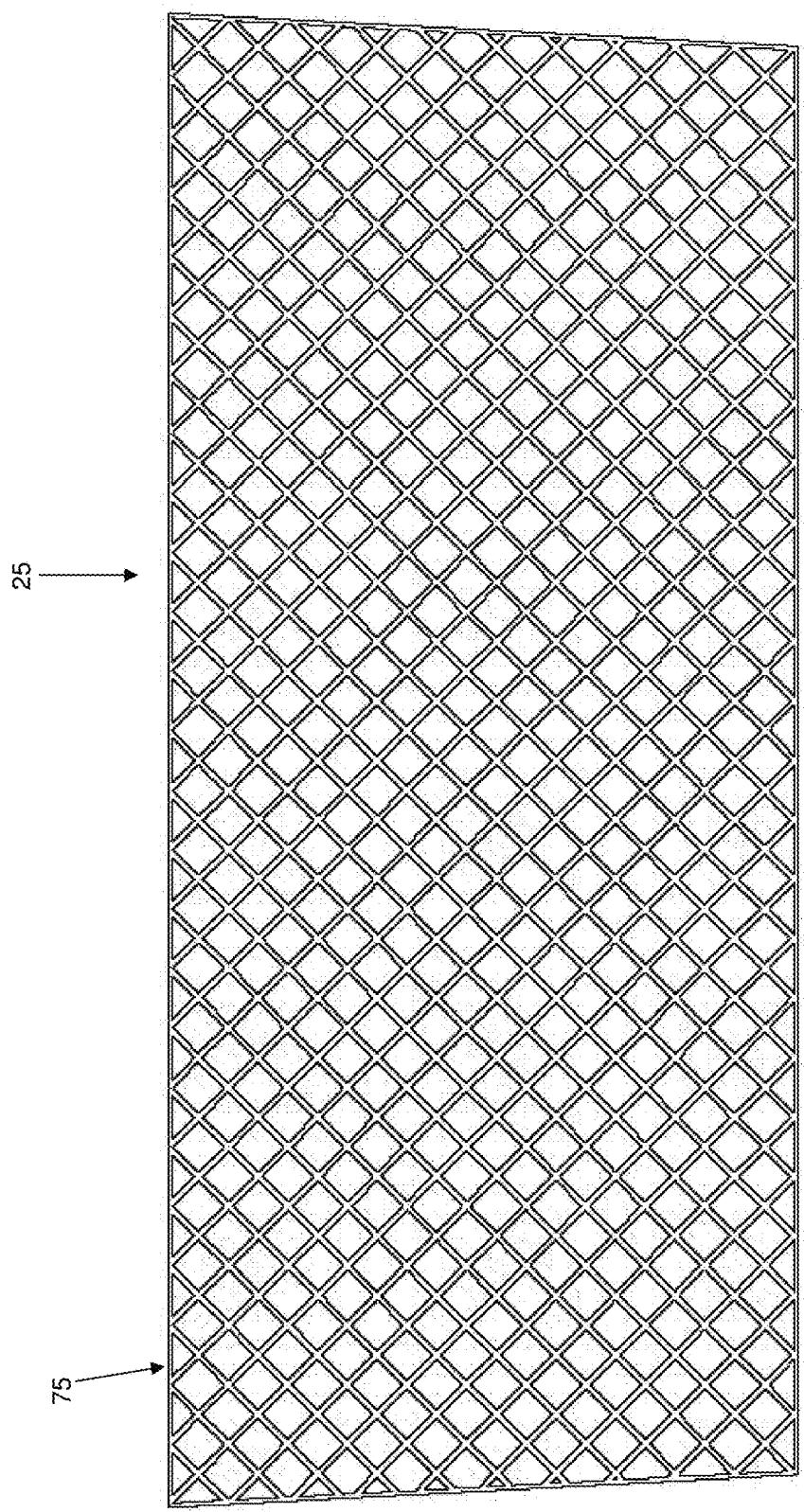
FIGS. 18 and 19 are schematic views showing the flexible barrier of the safety gate of FIGS. 1-7 in further detail.
Figure 19:
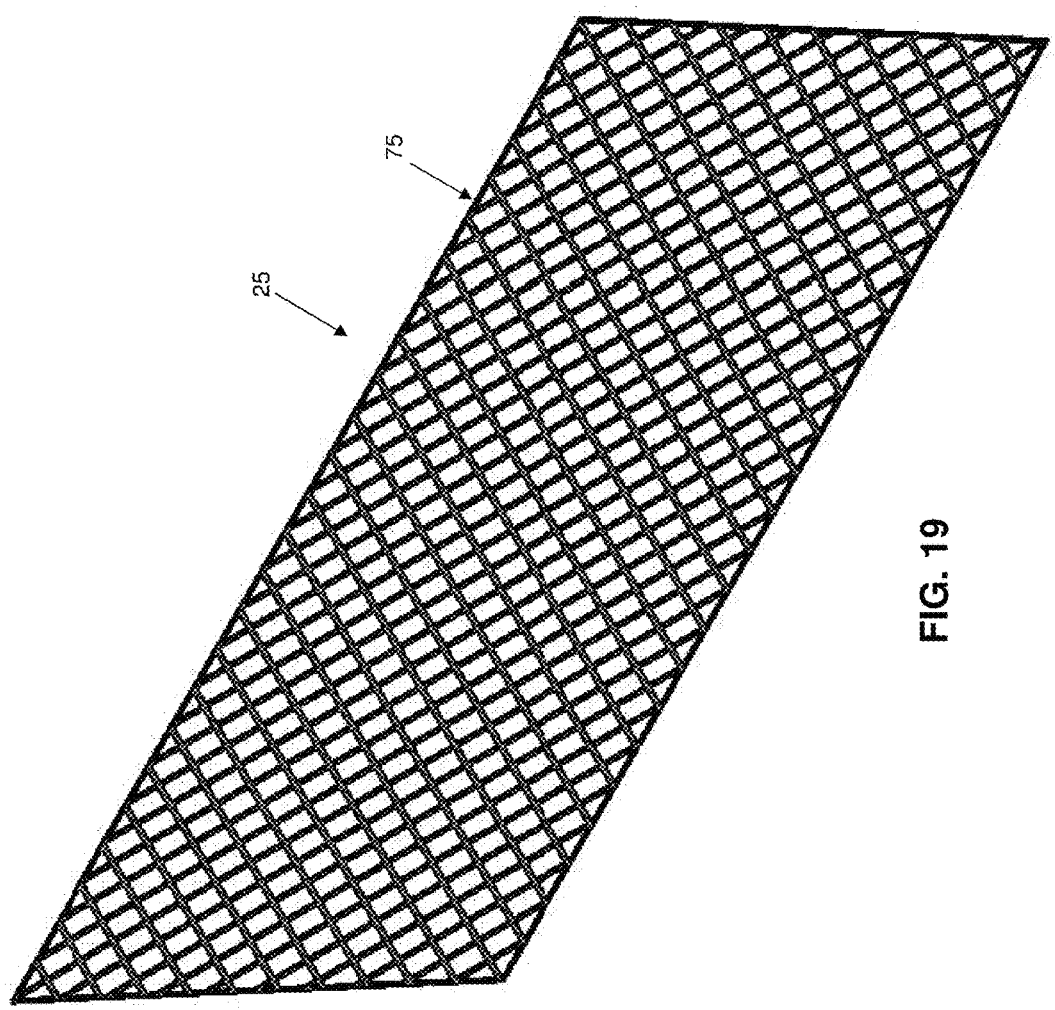

FIGS. 18 and 19 show one preferred construction for flexible barrier 25. Flexible barrier 25 is relatively soft and pliable and, if desired, may be elastic (i.e., resilient) in nature. In one form of the invention, the entire flexible barrier 25 may be elastic in nature; in another form of the invention, the top portion of flexible barrier 25 may be elastic in nature and the remainder of the flexible barrier may be relatively inelastic; and in still another form of the invention, the entire flexible barrier 25 may be relatively inelastic. In one preferred form of the invention, flexible barrier 25 is formed as a woven structure (e.g., as a woven net) using flexible filaments so that flexible barrier 25 can be stretched to some extent.

Flexible barrier 25 is attached to collapsible frame 20 after collapsible frame 20 has been set in a doorway (or hallway or walkway), with resizable base 30 appropriately sized and locked in position, and with hinged arms 35 locked in their upright position. Flexible barrier 25 is then erected between the two hinged arms 35, with flexible barrier 25 being releasably secured to fasteners 70 (FIG. 6), i.e., so that flexible barrier 25 may be manually "hung" on collapsible frame 20.

Use of Safety Gate 5

Safety gate 5 may be used to prevent pets and small children from passing through an opening and into restricted areas.

More particularly, safety gate 5 can be erected in a desired opening by setting up collapsible frame 20 in the opening so that the collapsible frame makes a pressure fit against an adjoining architectural structure, and then stringing flexible barrier 25 between the two hinged arms 35 of collapsible frame 25 (i.e., by manually hanging flexible barrier 25 on collapsible frame 20).

In one preferred method of use, collapsible frame 20 has its two hinged arms 35 set in their erect positions, with the upper ends of the two arms yieldably diverging from one another. Resizable base 30 is then set in opening 15 and base members 40, 45 are telescoped apart so that the outer ends of base members 40, 45 securely engage doorframe 10, and so that the two hinged arms 35 securely engage doorframe 10. As this occurs, the two hinged arms 35 press outwardly against doorframe 10, with the two hinged arms yielding as needed, so as to ensure that collapsible frame 20 makes a secure, binding fit with doorframe 10 (i.e., so that collapsible frame 20 makes a pressure fit against doorframe 10). Then flexible barrier 25 is manually hung on collapsible frame 20 using fasteners 70.

To allow an adult to pass through the safety gate, an adult can unlatch one of the top two corners of the flexible barrier, walk through the safety gate, and then re-attach the detached corner of the flexible barrier.

When safety gate 5 is no longer needed in that location, the safety gate may be taken down and folded up to a manageable size for easy transportation and storage.

More particularly, in one preferred method of disassembly, flexible barrier 25 is detached from hinged arms 35, latch mechanism 50 is released and base members 40, 45 are telescoped inward, preferably to the most minimal distance. As base members 40, 45 telescope inwardly, the force securing the two hinged arms 35 against the adjoining architectural structure is disengaged (i.e., the pressure fit of collapsible frame 20 against the doorframe is released). Then hinged arms 35 are pulled upward and then folded down parallel to base members 40, 45. With safety gate 5 in its collapsed condition, the safety gate may then be easily transported and stored.

Note that at no time is safety gate 5 permanently fastened to wall structures.

Thus it will be seen that the present invention provides a self-contained safety gate 5 which is (i) collapsible to a linear configuration which is easily transported and stored, and (ii) erectable to a substantially U-shaped configuration which is pressure-mounted against the surfaces of an adjoining architectural structure, with the pressure-mounted safety gate being locked in place against the adjoining architectural structure until the latch mechanism in the resizable base is released.

Elastic Strap or Cord at the Top of the Flexible Barrier

Figure 21:
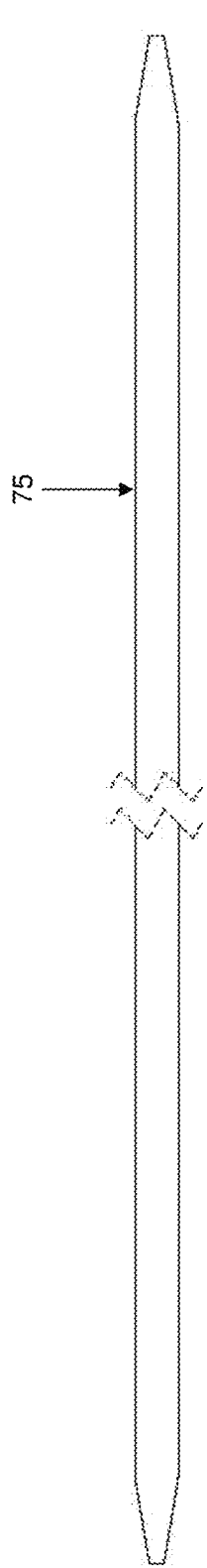
FIGS. 20 and 21 are schematic views showing an elastic strap or cord which may be added at the top of the flexible barrier of the safety gate of FIGS. 1-7.
Figure 20:
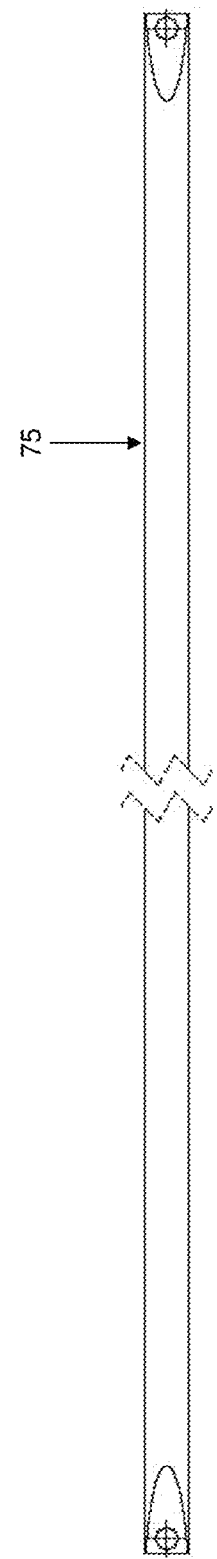
Figure 23:
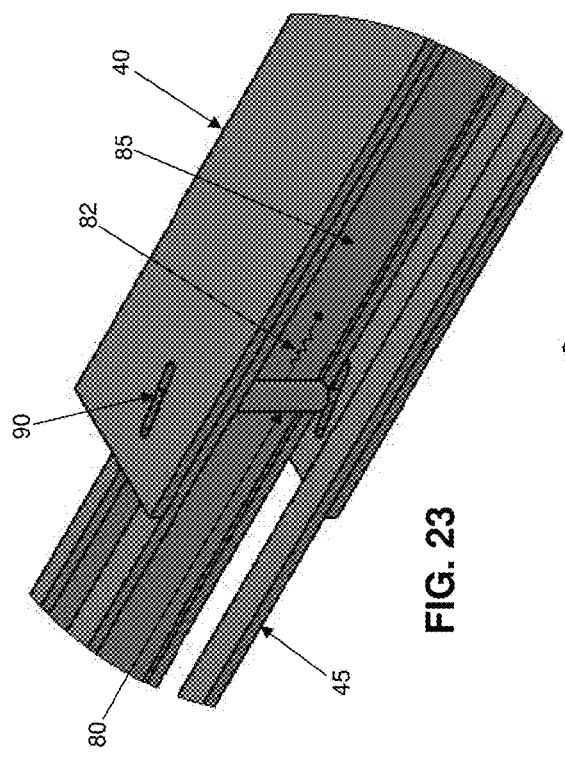
Figure 24:
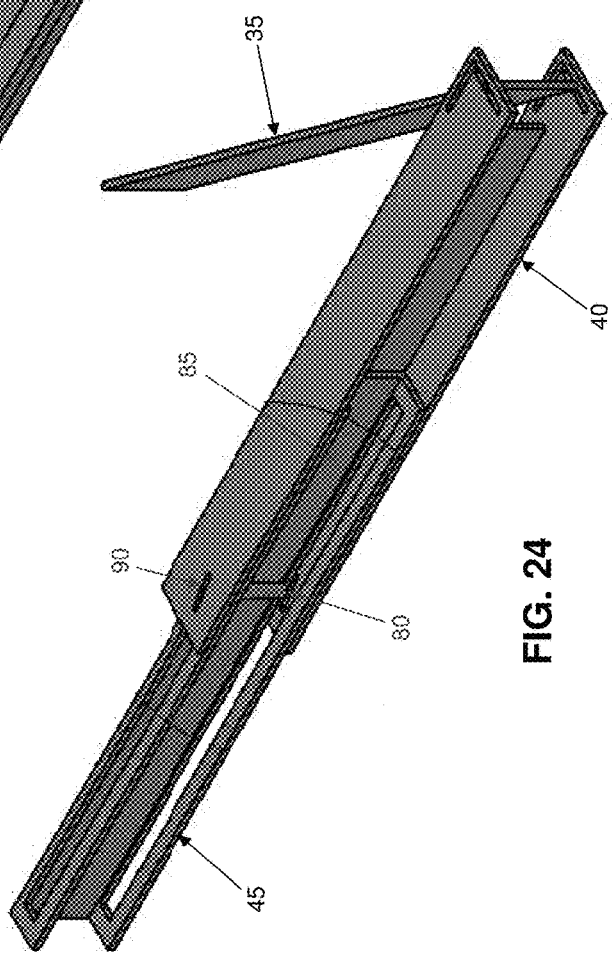
Figure 25:
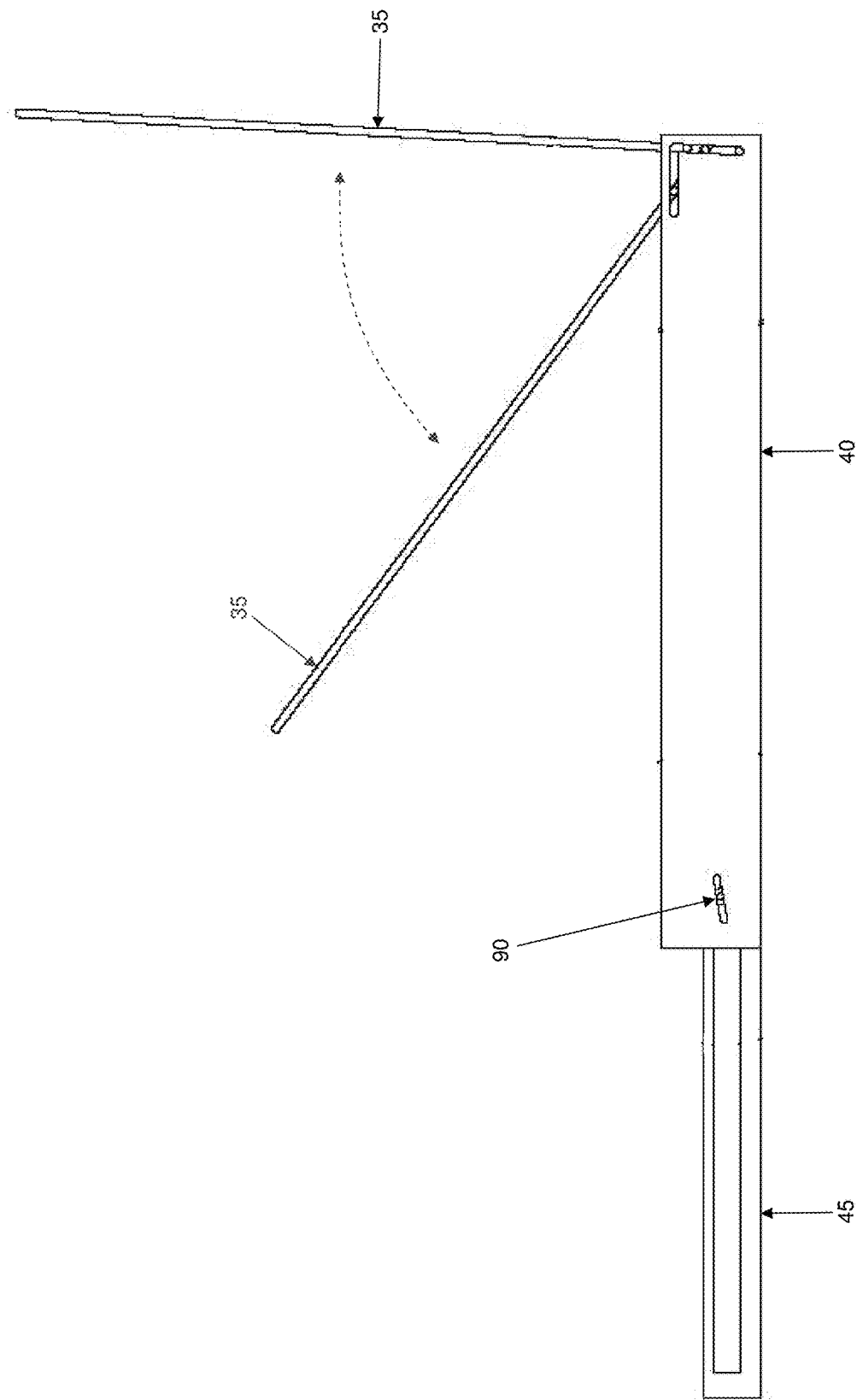
Figure 30:
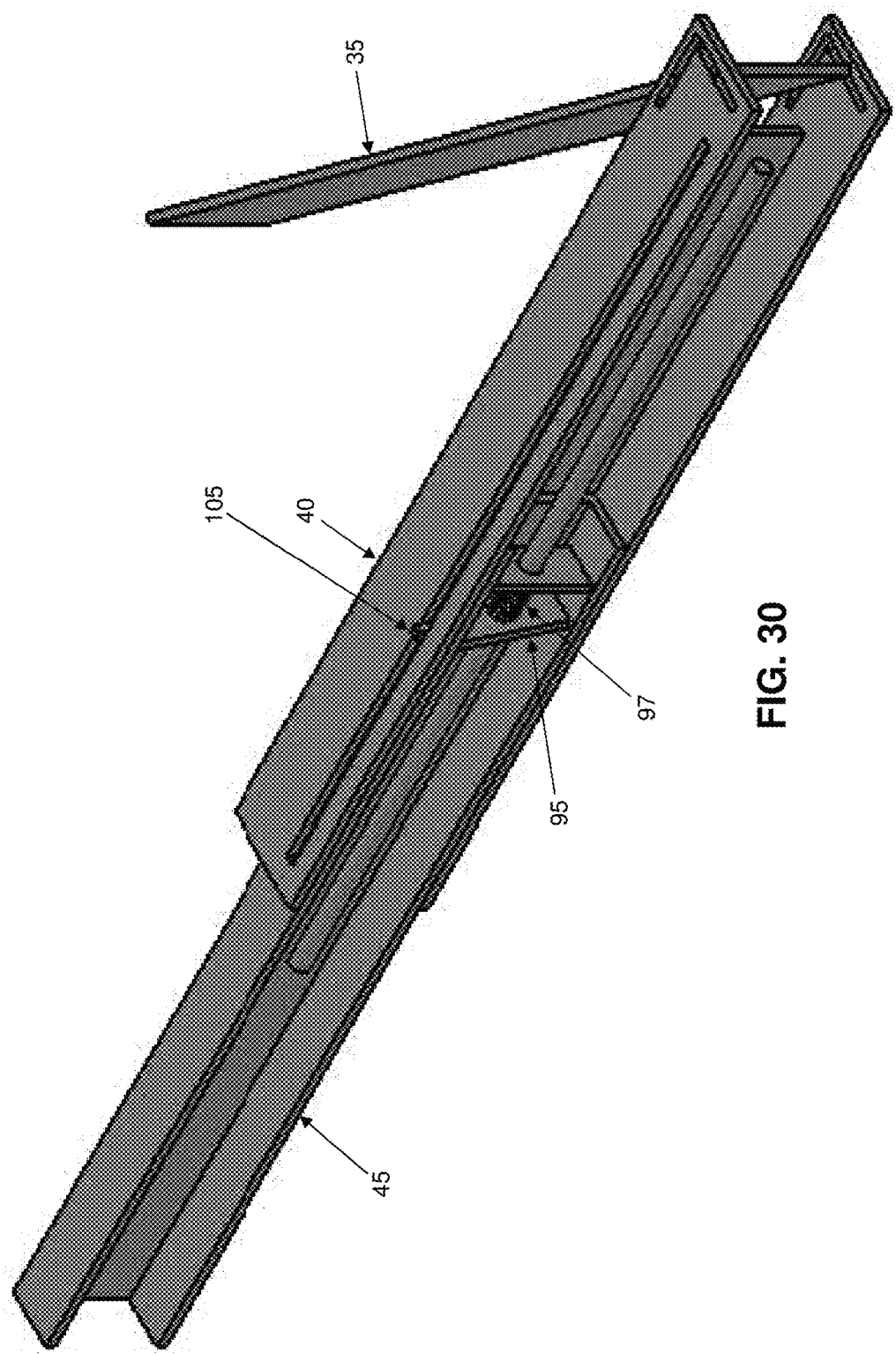
Figure 31:
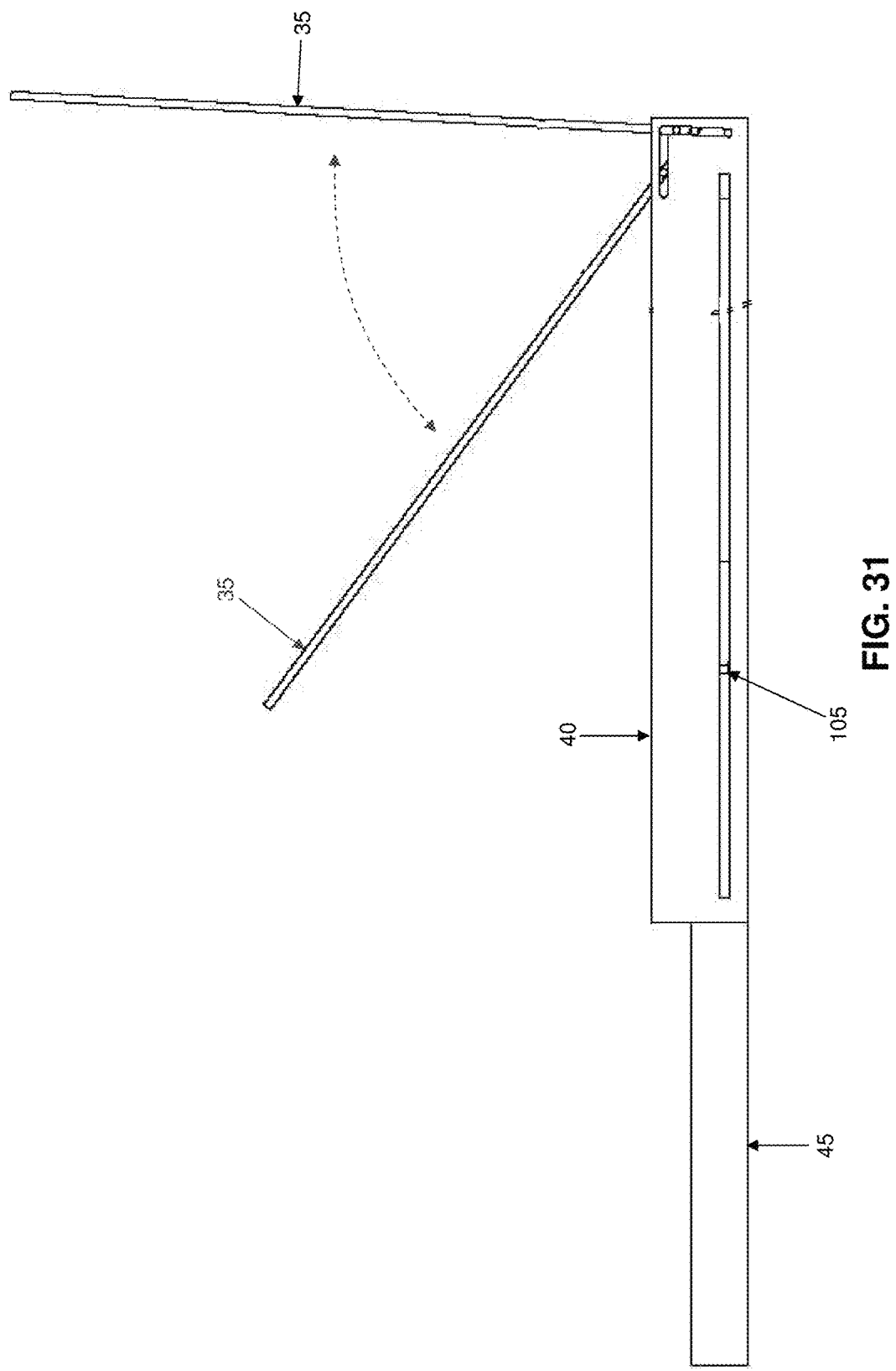
Figure 32:
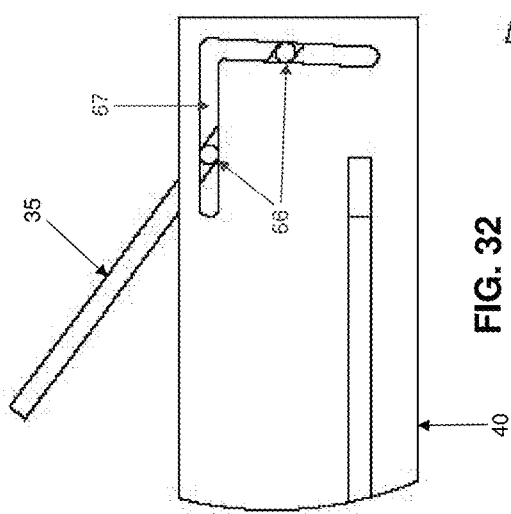
Figure 33:
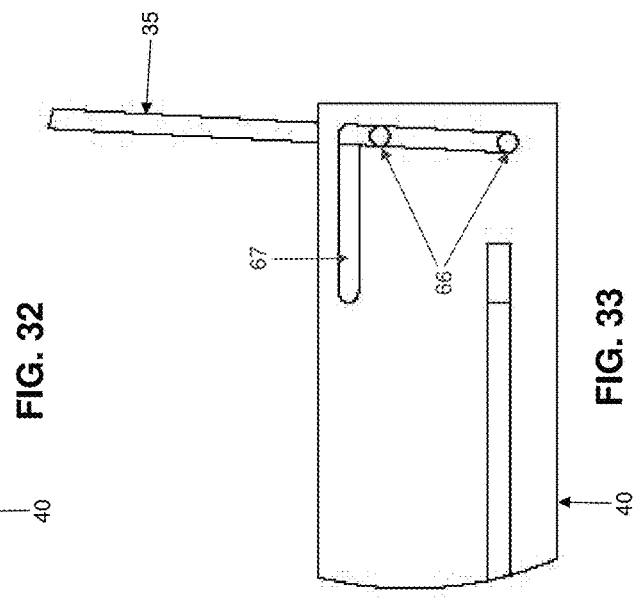
Figure 34:
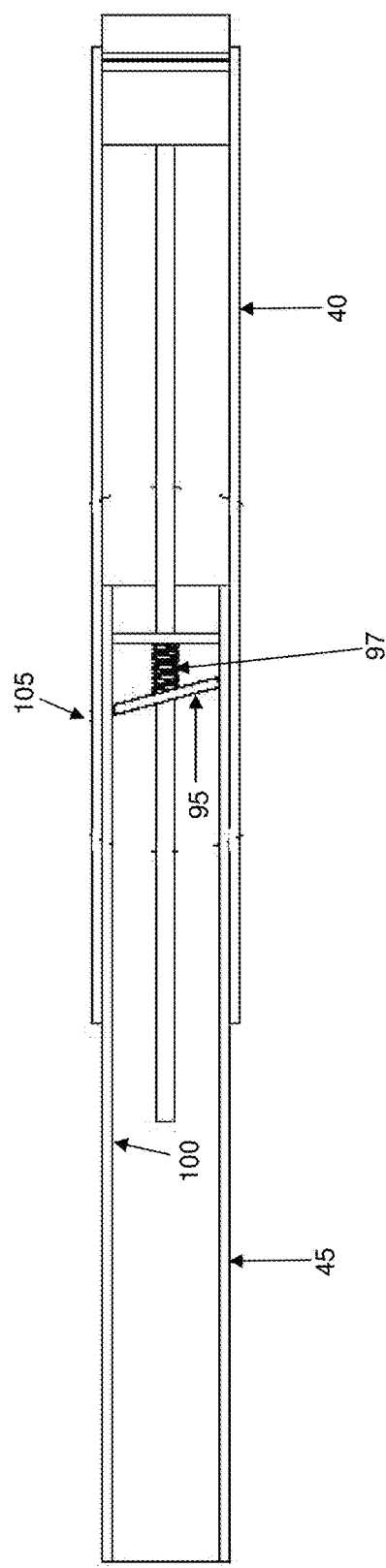
Figure 35:
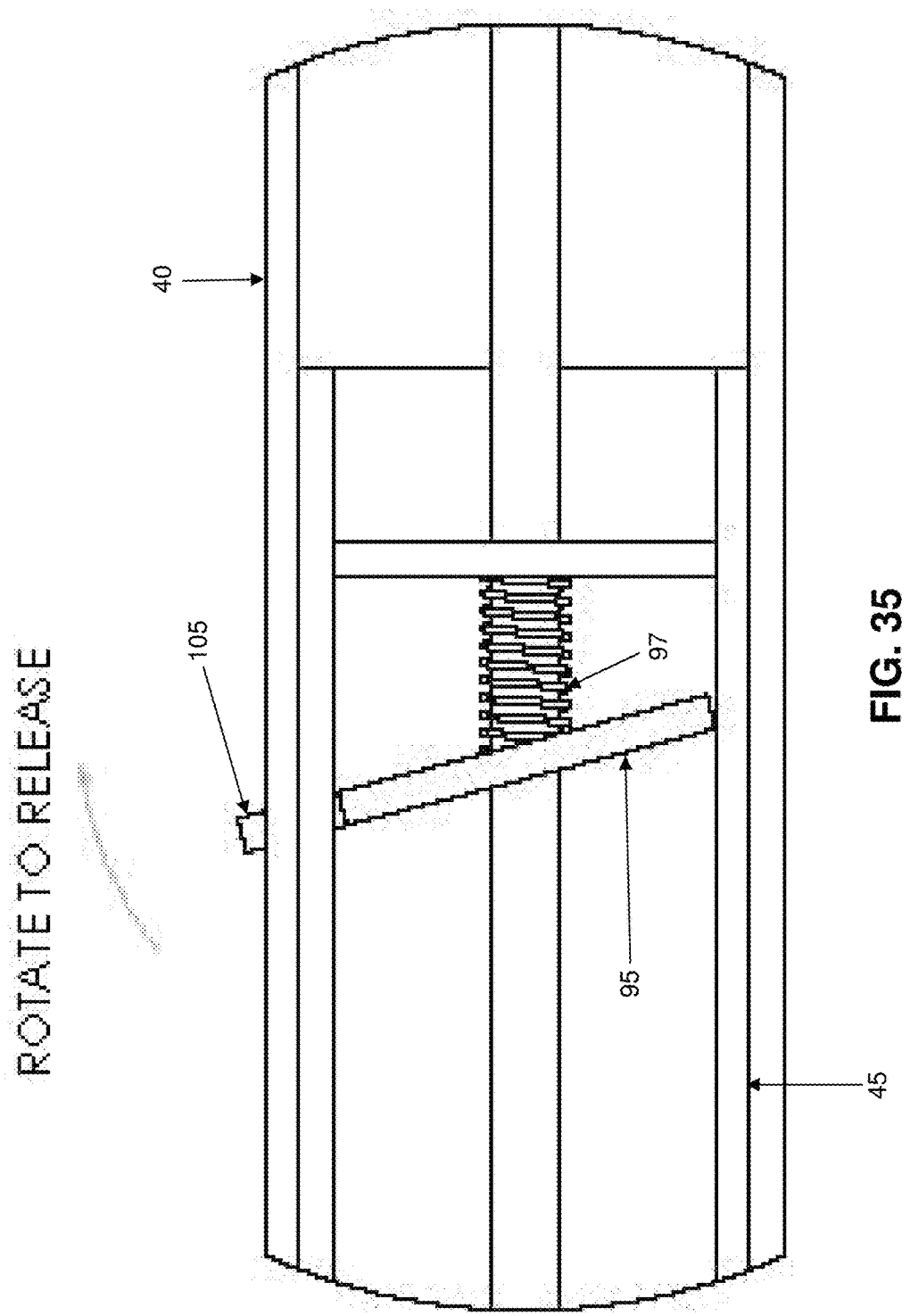

If desired, and looking now at FIGS. 20 and 21, an elastic strap or cord 75 may be (i) passed through, or otherwise connected to, the top end of flexible barrier 25, and (ii) connected to the two hinged arms 35 of collapsible frame 20 at the top two corners of the safety gate (e.g., at fasteners 70). See also FIGS. 5, 6, 7, 18 and 19, where flexible barrier 25 has an elastic strap or cord 75 attached to the top end of flexible barrier 25. Elastic strap or cord 75 provides increased support to help hold up the top end of flexible barrier 25.

In one form of the invention, the entire flexible barrier may be elastic in nature, and elastic strap or cord 75 may provide additional support to help hold up the top end of flexible barrier 25. In another form of the invention, only elastic strap or cord 75 is elastic and the remainder of the flexible barrier may be relatively inelastic.

Alternative Latch Mechanisms

It is also possible to utilize different latch mechanisms for resizable base 30 of collapsible frame 20 of safety gate 5.

Thus, for example, and looking now at FIGS. 22-28, the latch mechanism may comprise a locking pin 80 which is spring-biased by a spring 82 (FIG. 23) into engagement with a friction rack 85. To release the latch mechanism, a finger tab 90 is used to push locking pin 80 against the power of spring 82, whereby to allow locking pin 80 to disengage from friction rack 85.

Furthermore, and looking now at FIGS. 29-35, the latch mechanism may comprise a locking plate 95 which is spring-biased by a spring 97 (FIG. 30) into engagement with a wall 100 of base member 45 of collapsible frame 20. To release the latch mechanism, a finger tab 105 is used to push locking plate 95 against the power of spring 97, whereby to allow locking plate 95 to disengage from wall 100 of base member 95.

Safety Gate with Flexible Barrier Spooled on Collapsible Frame

In another preferred form of the invention, the safety gate can have its flexible barrier spooled into one hinged arm of its collapsible frame, with the flexible barrier being drawn across the opening of the collapsible frame when the safety gate is to provide its barrier function, and with the flexible barrier being spooled back into one hinged arm of the collapsible frame when the safety gate is to be opened for passage.

Figure 36:
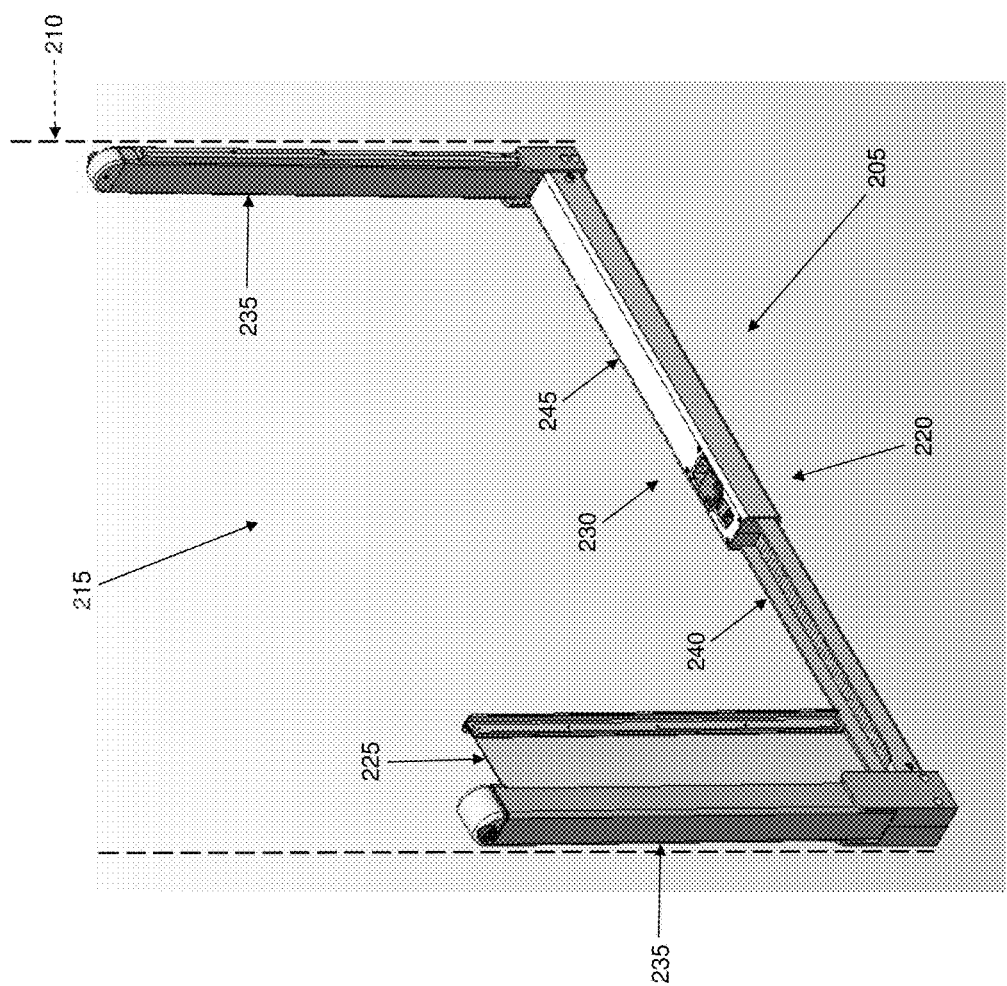
FIGS. 36-38 are schematic views showing another safety gate formed in accordance with the present invention.
Figure 37:
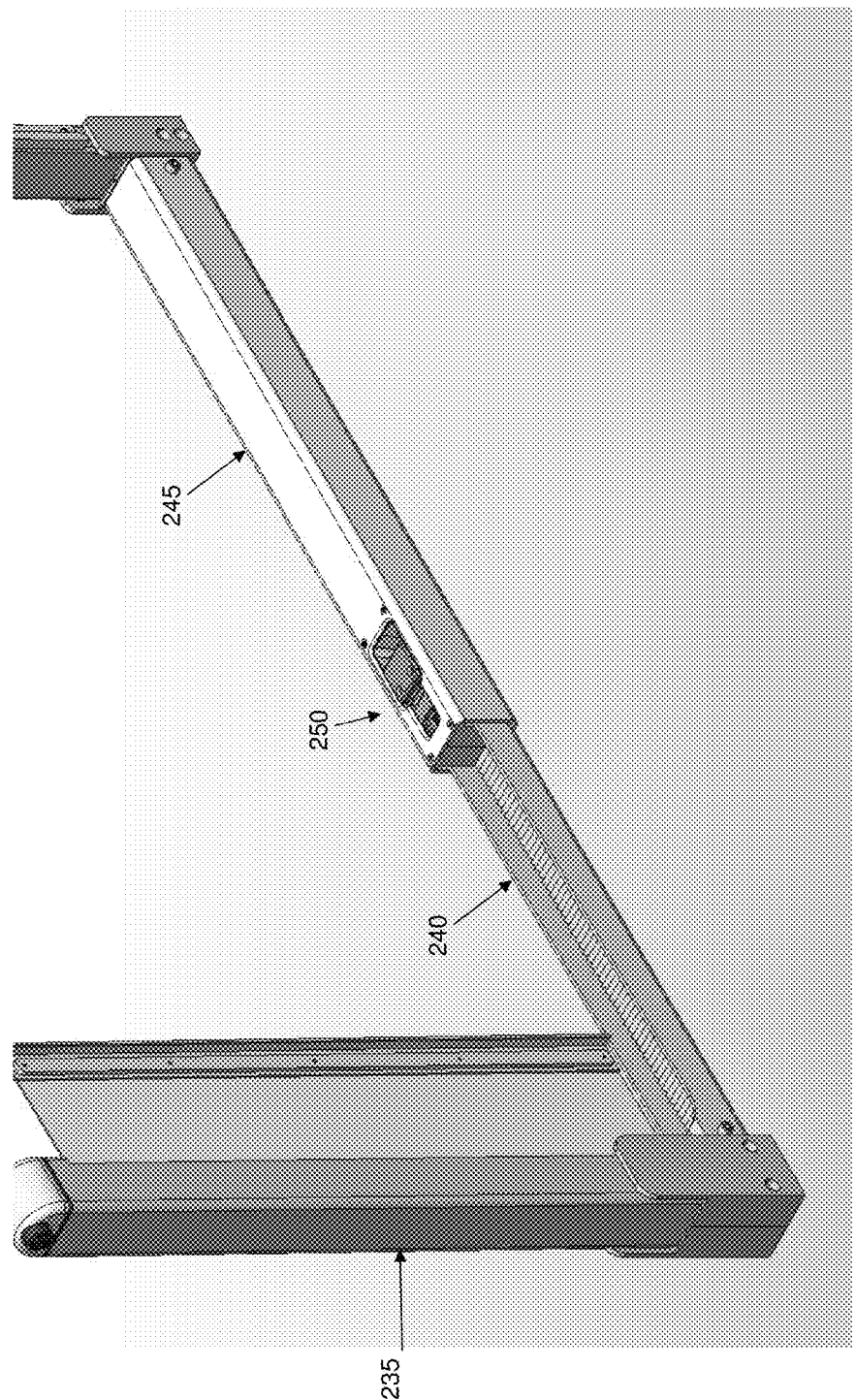
Figure 38:
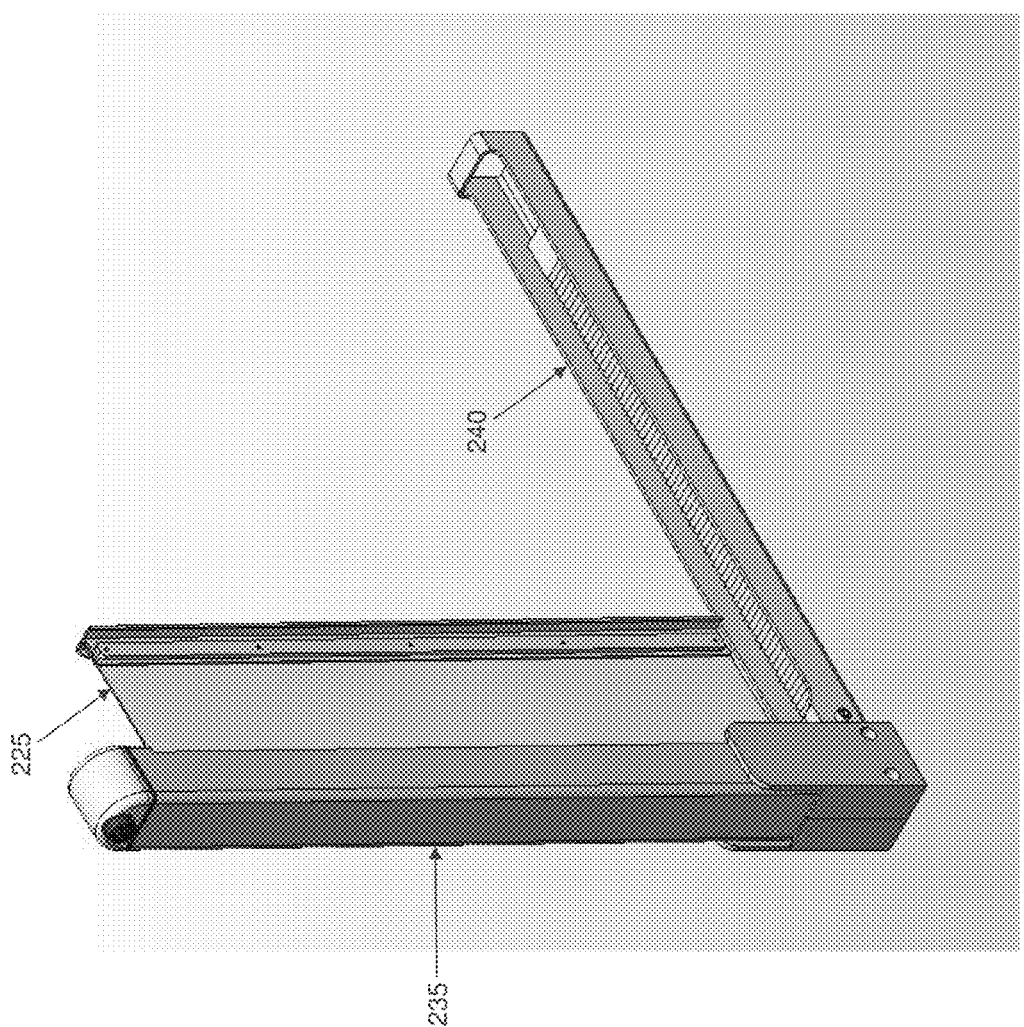
Figure 39:
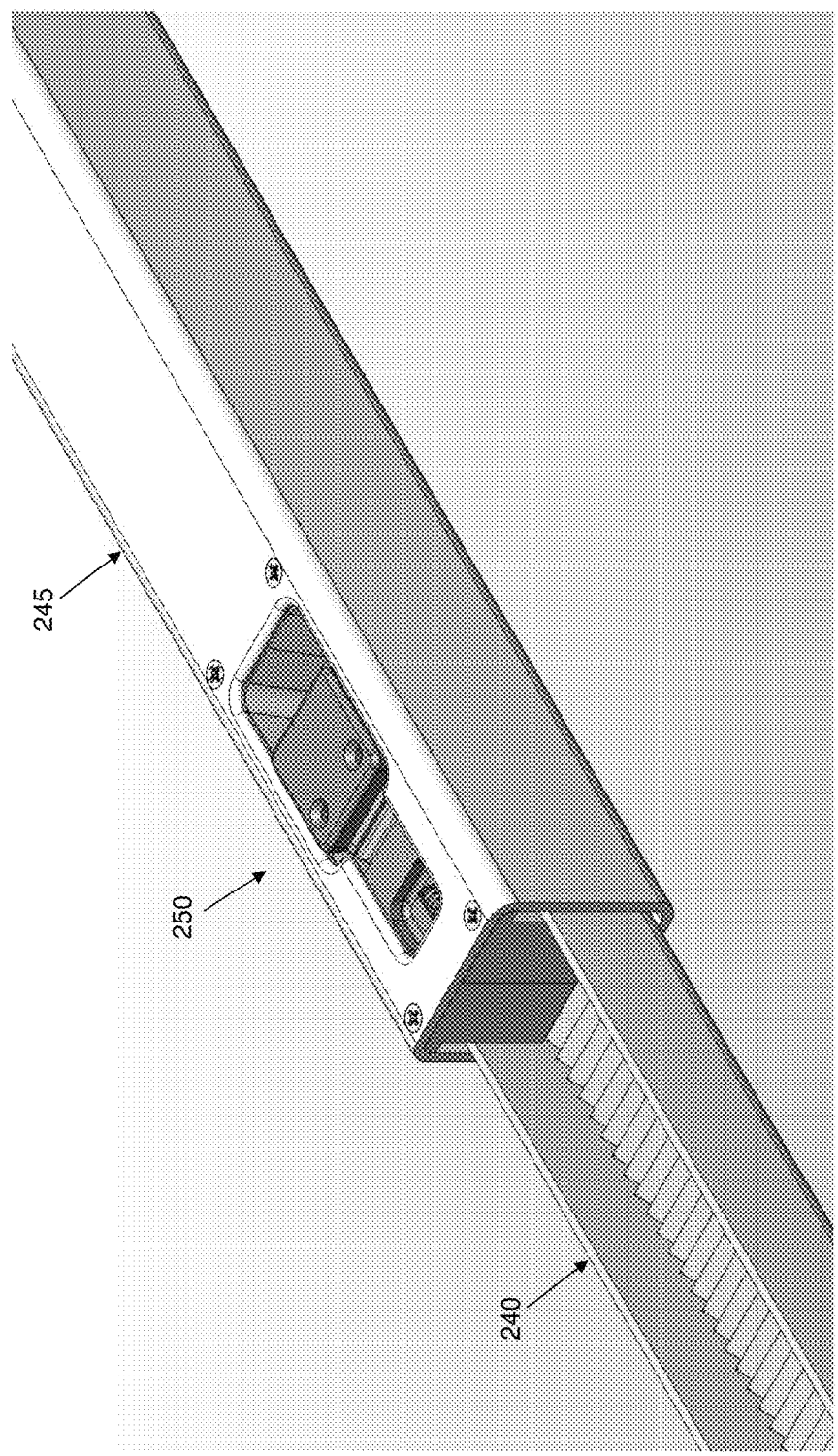
FIGS. 39-46 are schematic views showing further details of the collapsible frame of the safety gate of FIGS. 36-38.
Figure 40:
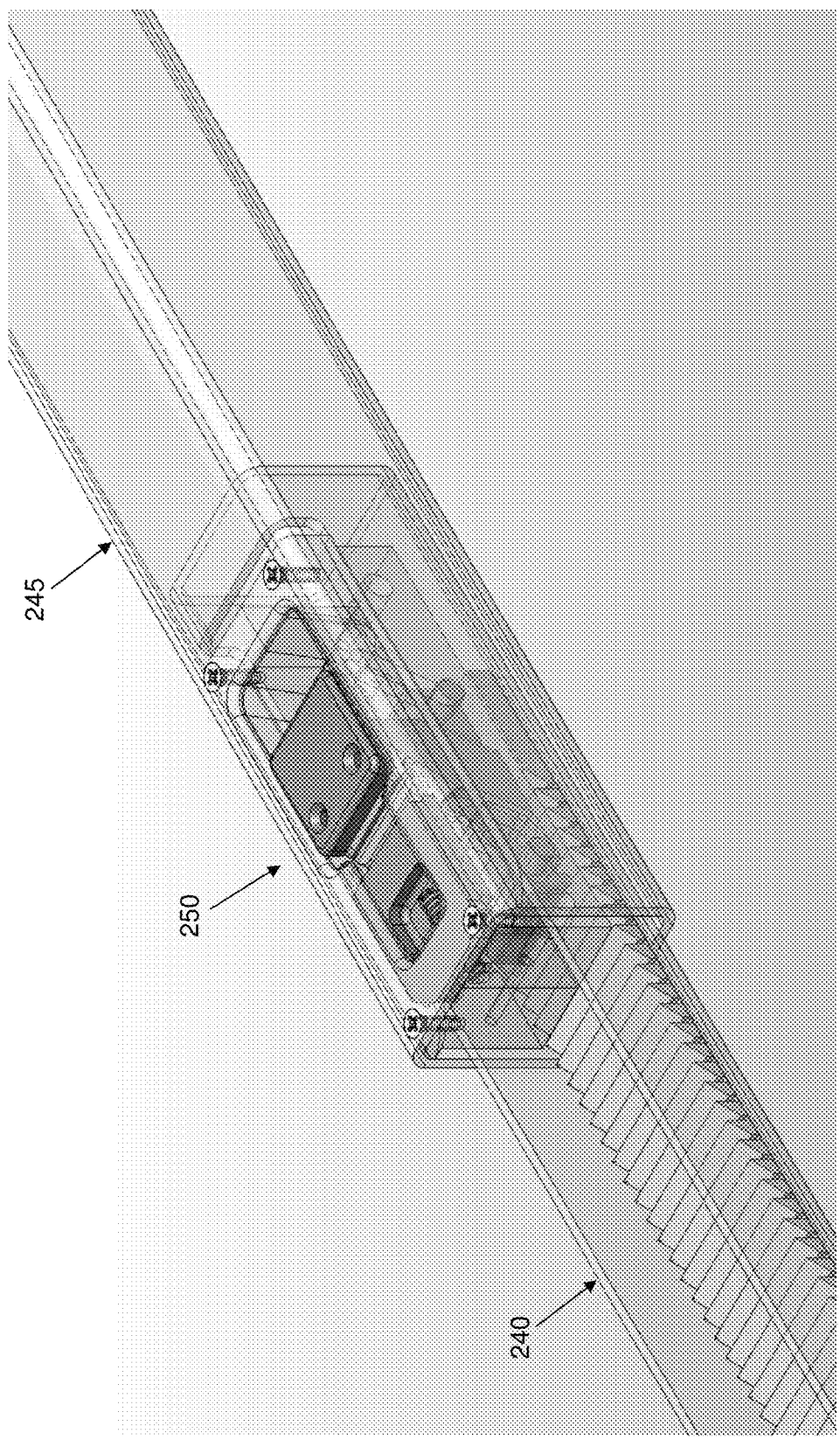
Figure 41:
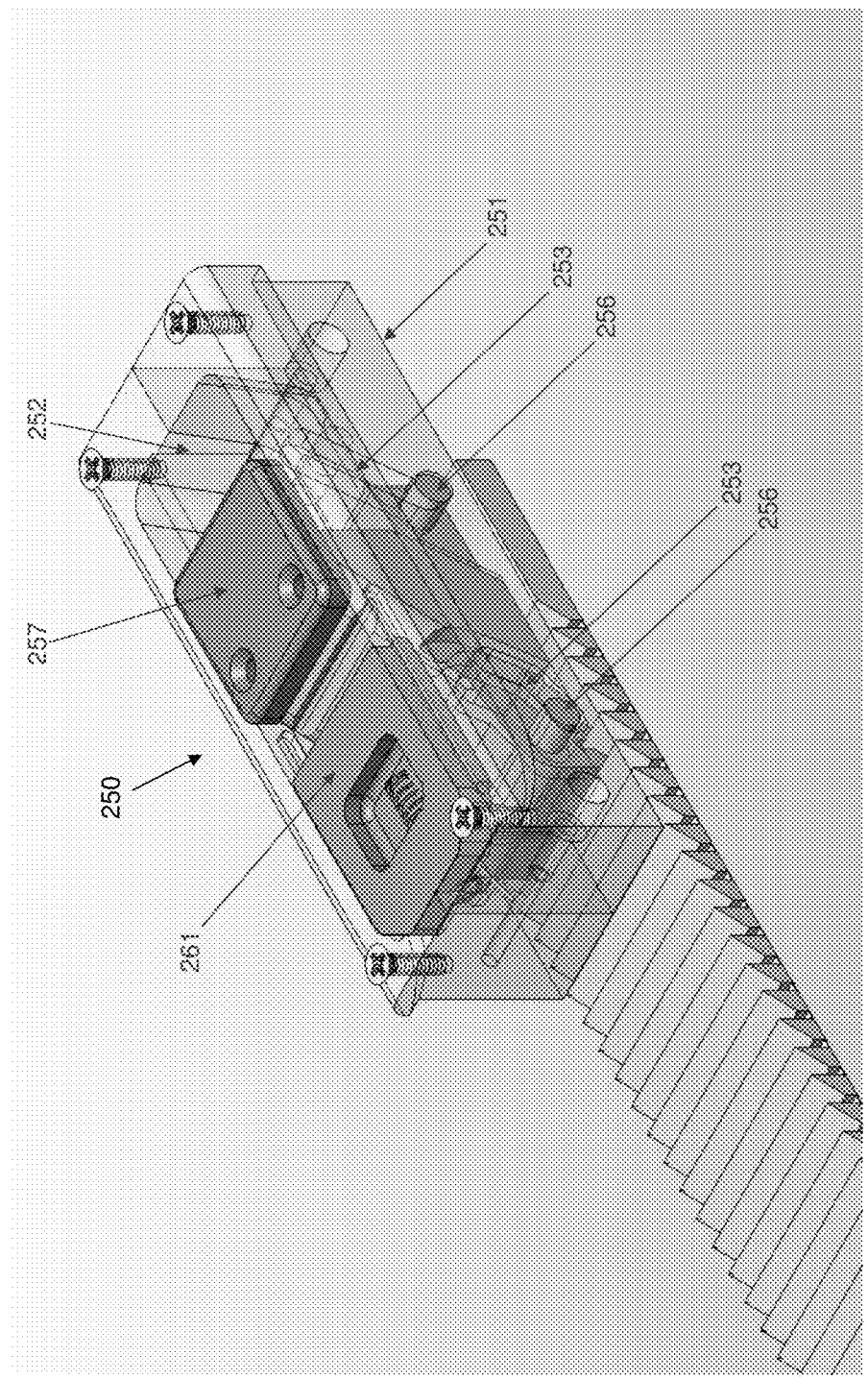
Figure 42:
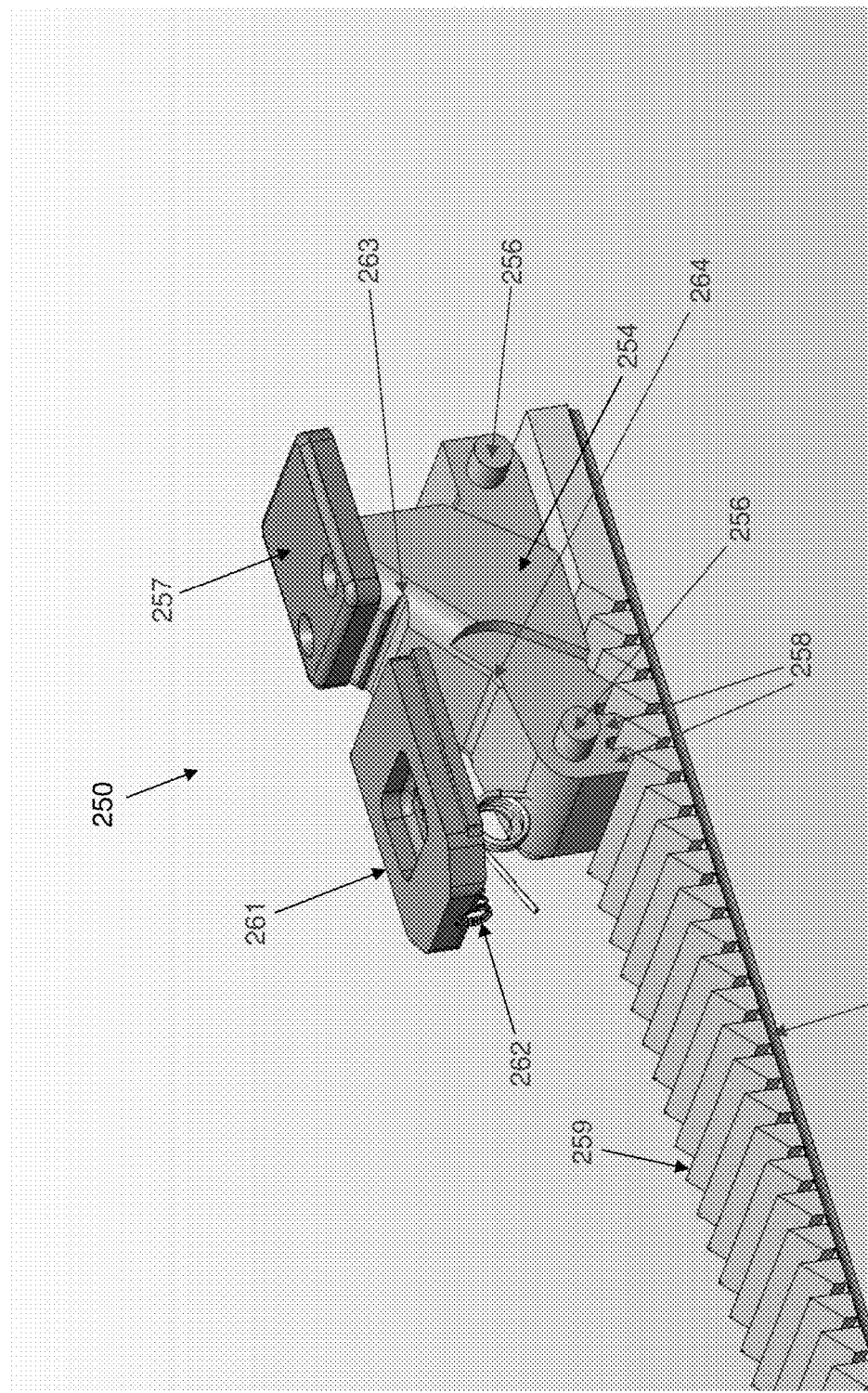
Figure 43:
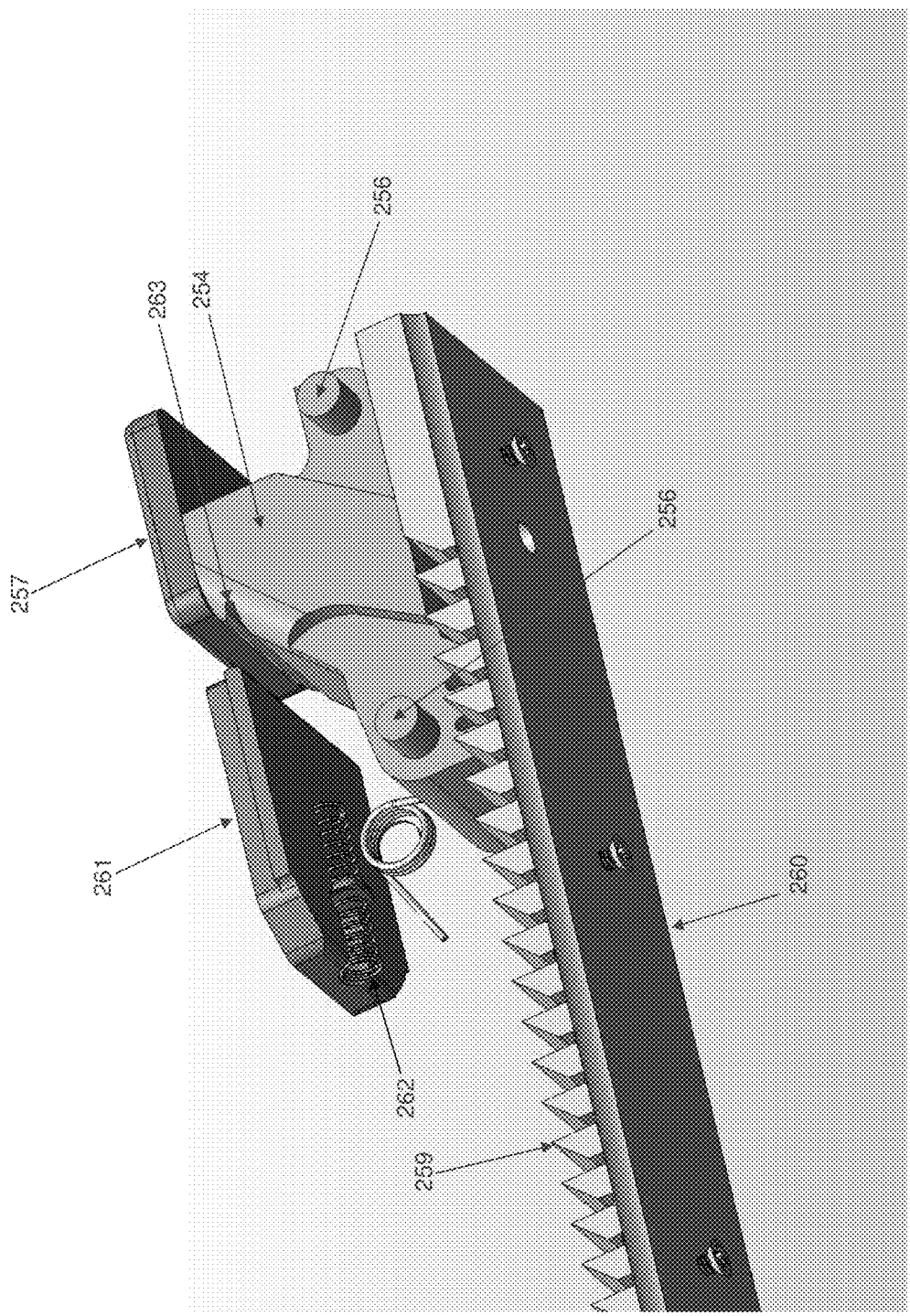

More particularly, and looking now at FIGS. 36 and 37, there is shown a safety gate 205 erected in a doorframe 210 so as to close off the lower portion of the opening 215 of the doorway. Safety gate 205 is releasably secured in doorframe 210 using a pressure fit so as to provide a barrier to prevent a pet or small child from passing through the opening of the doorway (e.g., so as to prevent a pet or small child from passing from one room to another room). Safety gate 205 is also capable of closing off other openings, e.g., in a hallway or walkway, so as to restrict access by a pet or small child.

Safety gate 205 generally comprises a collapsible frame 220 and a flexible barrier 225.

The Collapsible Frame

FIGS. 36-60 show one preferred construction for collapsible frame 220. In this form of the invention, collapsible frame 220 comprises a resizable base 230 and a pair of hinged arms 235.

Resizable base 230 comprises two base members 240, 245 which are telescopically extendable relative to one another so as to accommodate an array of different doorway (or hallway or walkway) widths. Base members 240, 245 are able to slide freely in one direction (i.e., in an opening direction) but are prevented from returning in the other direction (i.e., in a closing direction) by a latch mechanism 250.

As seen in greater detail in FIGS. 39-43, latch mechanism 250 comprises a housing 251 having a recess 252 and slots 253 formed therein. A grip 254 is slidably disposed within recess 252 of housing 251. More particularly, grip 254 comprises a pair of pins 256 which ride along slots 253 of housing 251. Grip 254 comprises a finger tab 257 for urging grip 254 along slots 253, and teeth 258 for selectively engaging teeth 259 of a ribbed rack 260, whereby to lock base members 240, 245 of resizable base 230 in position relative to one another.

A lock 261 is provided to selectively lock grip 254 in (i) an "engaged" position wherein teeth 258 of grip 254 engage teeth 259 of ribbed rack 260 (and hence lock base members 240, 245 of resizable base 230 in position relative to one another), or (ii) a "disengaged" position wherein teeth 258 of grip 254 are disengaged from teeth 259 of ribbed rack 260 (and hence allow base members 240, 245 of resizable base 230 to move relative to one another). More particularly, lock 261 is spring-biased against grip 254 by a spring 262, and grip 254 comprises a groove 263 for receiving lock 261 when latch mechanism 250 is in its "engaged" position, and a groove 264 for receiving lock 261 when latch mechanism 250 is in its "disengaged" position. Note that when lock 261 is seated in groove 263 or groove 264, grip 254 is prevented from moving within recess 252 of housing 251.

When latch mechanism 250 is in its "engaged" position and is to be released, lock 261 is pulled against the power of spring 262 so as to withdraw lock 261 from groove 263, and then finger tab 257 is lifted up so as to cause grip 254 to ride along slots 253 and disengage teeth 258 of grip 254 from teeth 259 of ribbed rack 260. Latch mechanism 250 may then be maintained in this "disengaged" position by releasing the force on lock 261 so that spring 262 seats lock 261 in groove 264.

When latch mechanism 250 is in its "disengaged" position and is to be re-set in its "engaged" position, lock 261 is pulled against the power of spring 262 so as to withdraw lock 261 from groove 264, and then finger tab 257 is pushed down so as to cause grip 254 to ride along slots 253 and securely engage teeth 258 of grip 254 with teeth 259 of ribbed rack 260. Latch mechanism 250 may then be maintained in this "engaged" position by releasing the force on lock 261 so that spring 262 seats lock 261 in groove 263.

Figure 44:
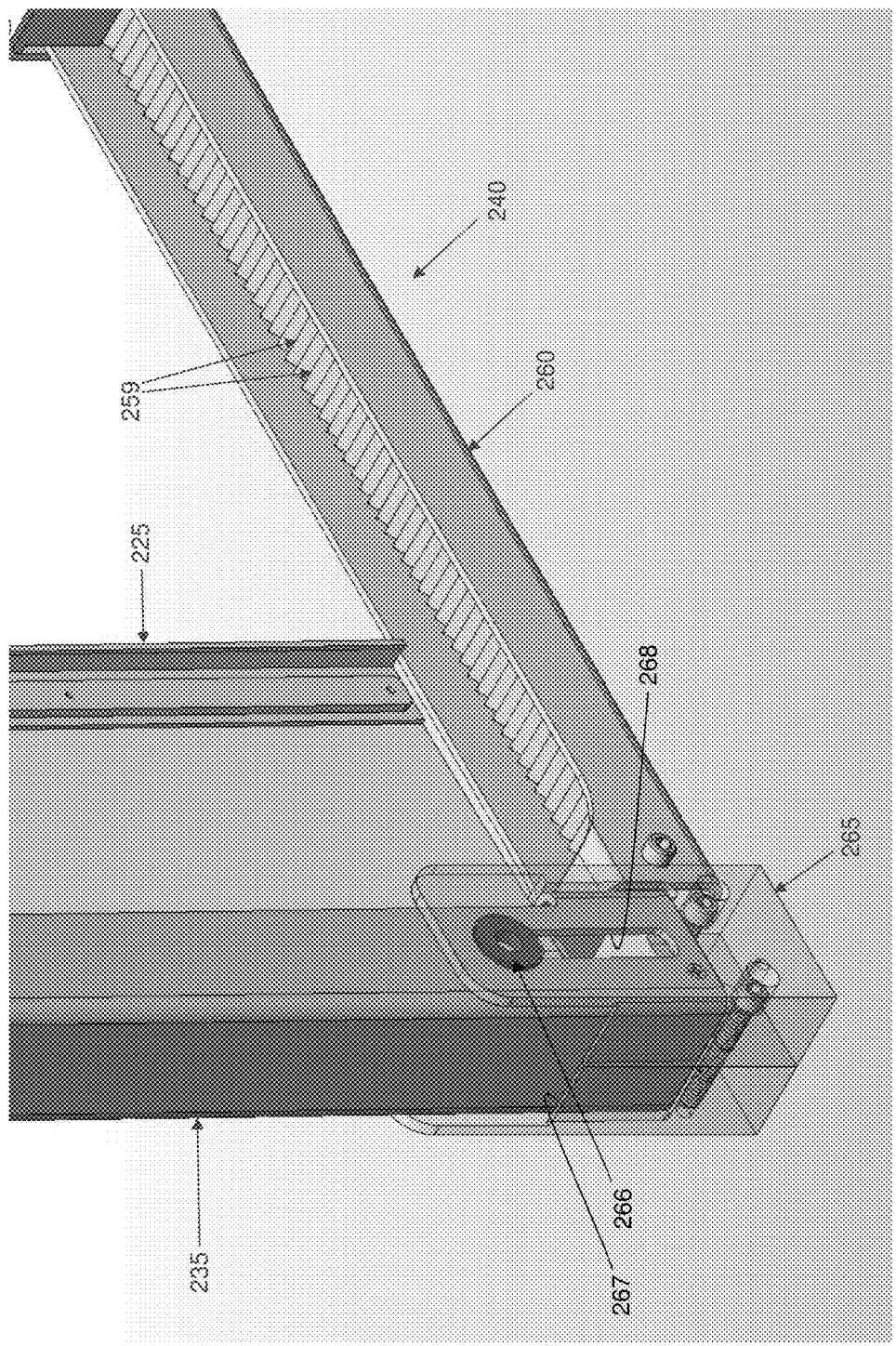
Figure 45:
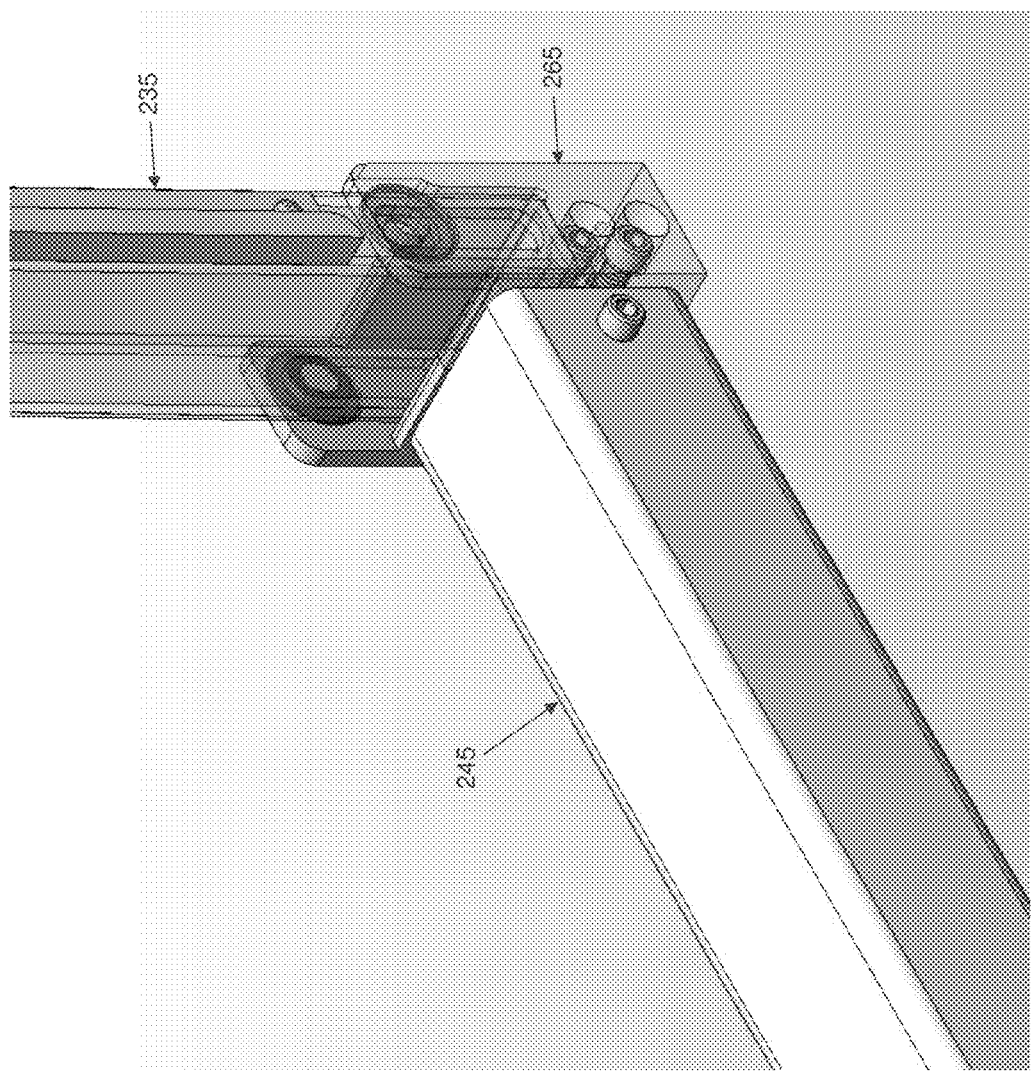
Figure 46:
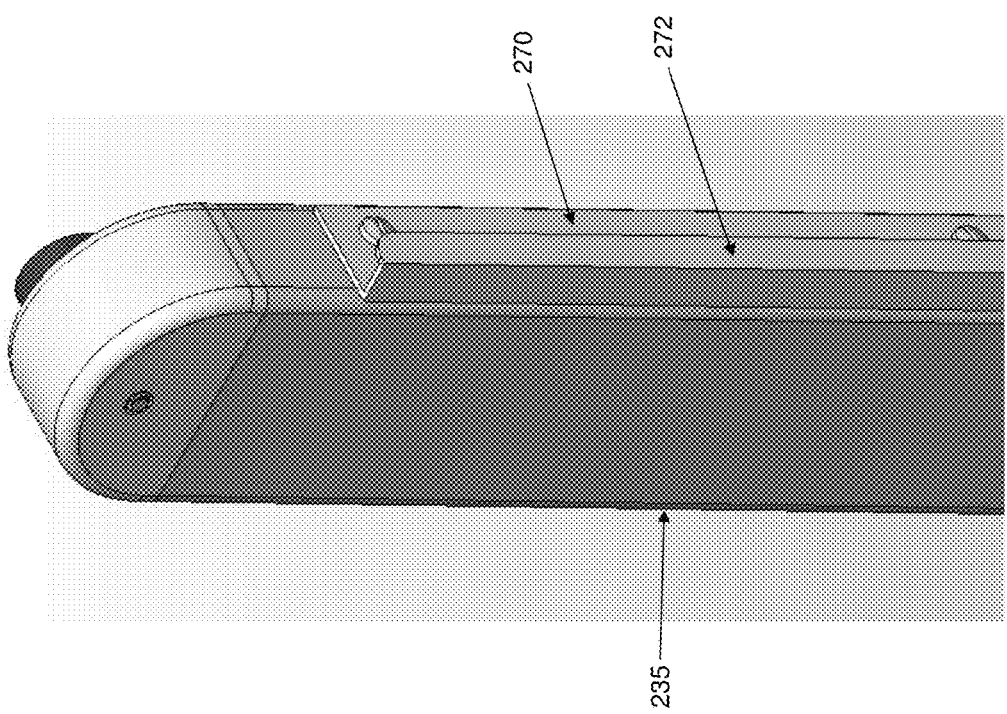
Figure 47:
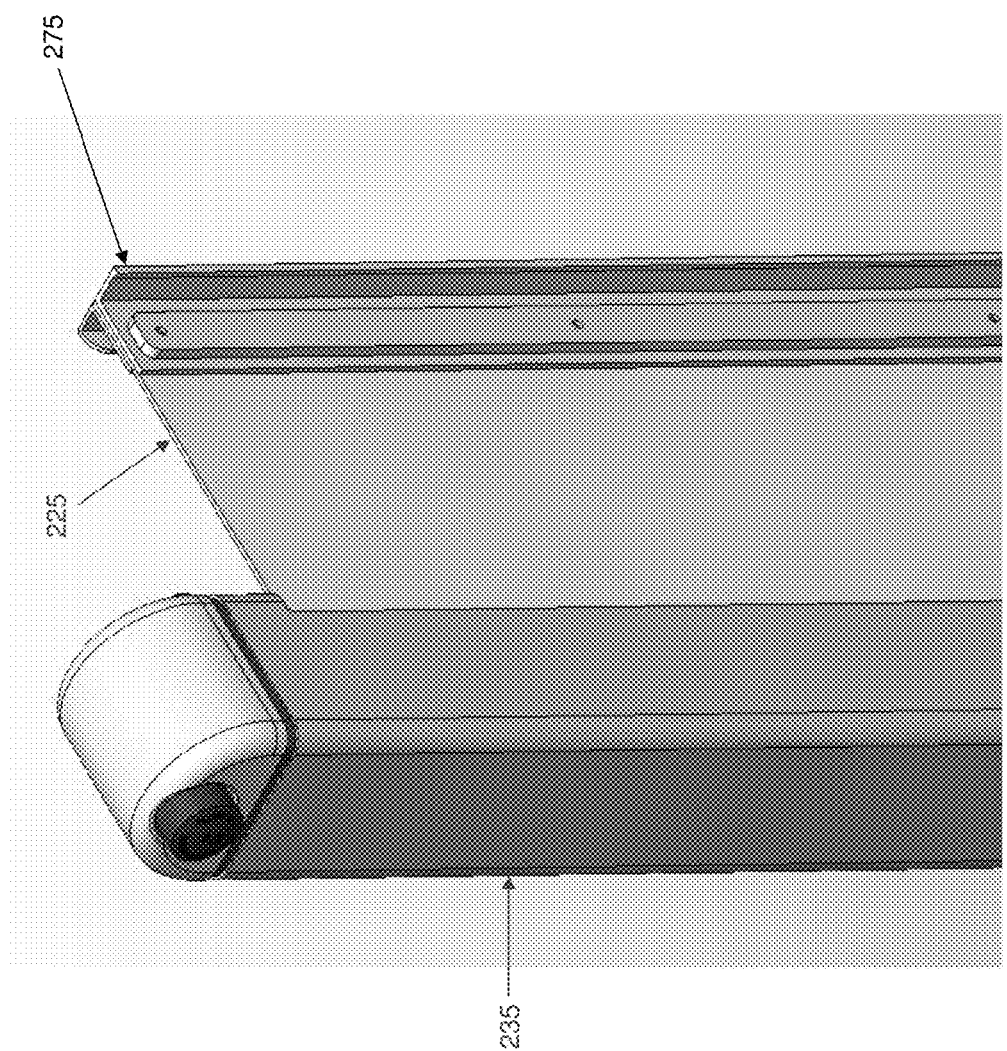
FIG. 47 is a schematic view showing further details of the flexible barrier of the safety gate of FIGS. 36-38.
Figure 48:
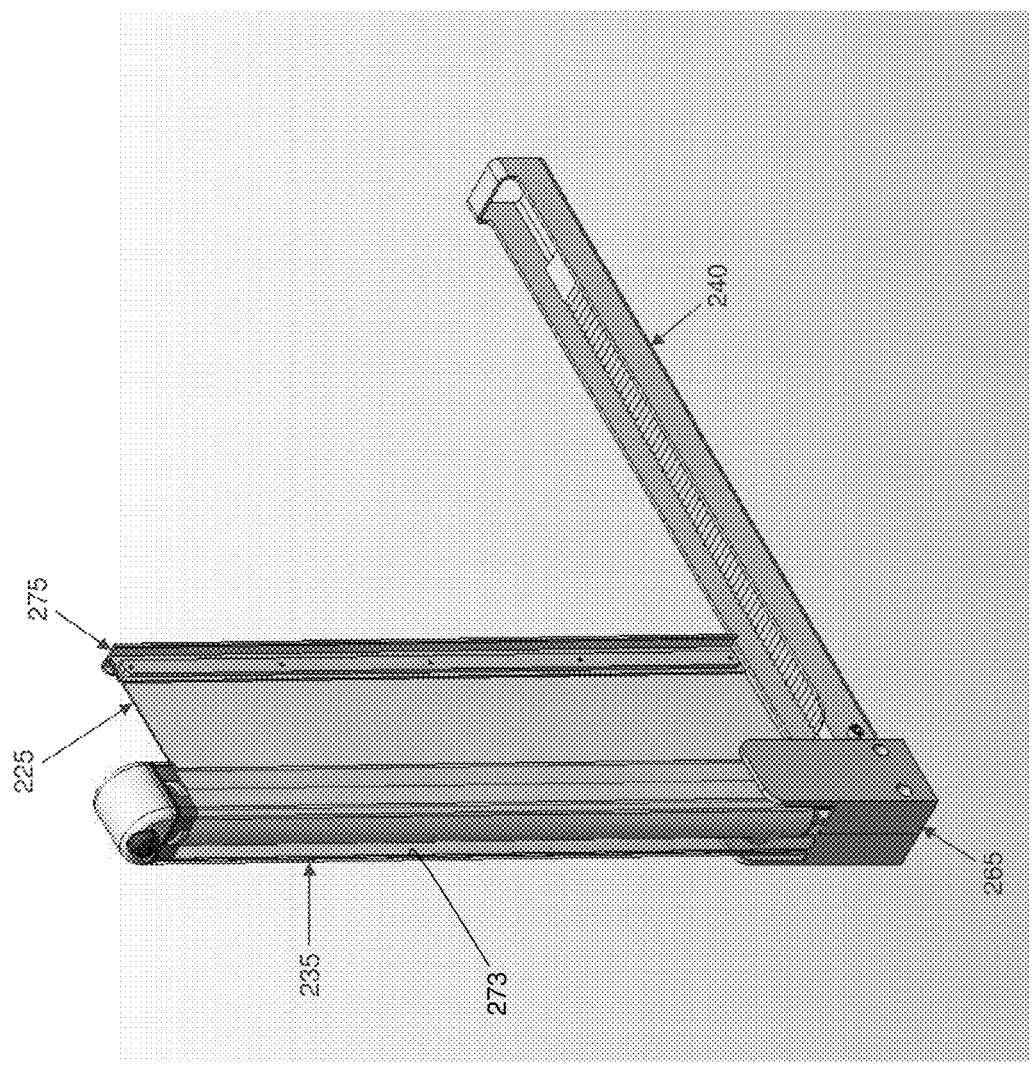
FIGS. 48-60 are schematic views showing further details of the spring-biased spool for spooling the flexible barrier into one arm of the collapsible frame of the safety gate of FIGS. 36-38.
Figure 49:
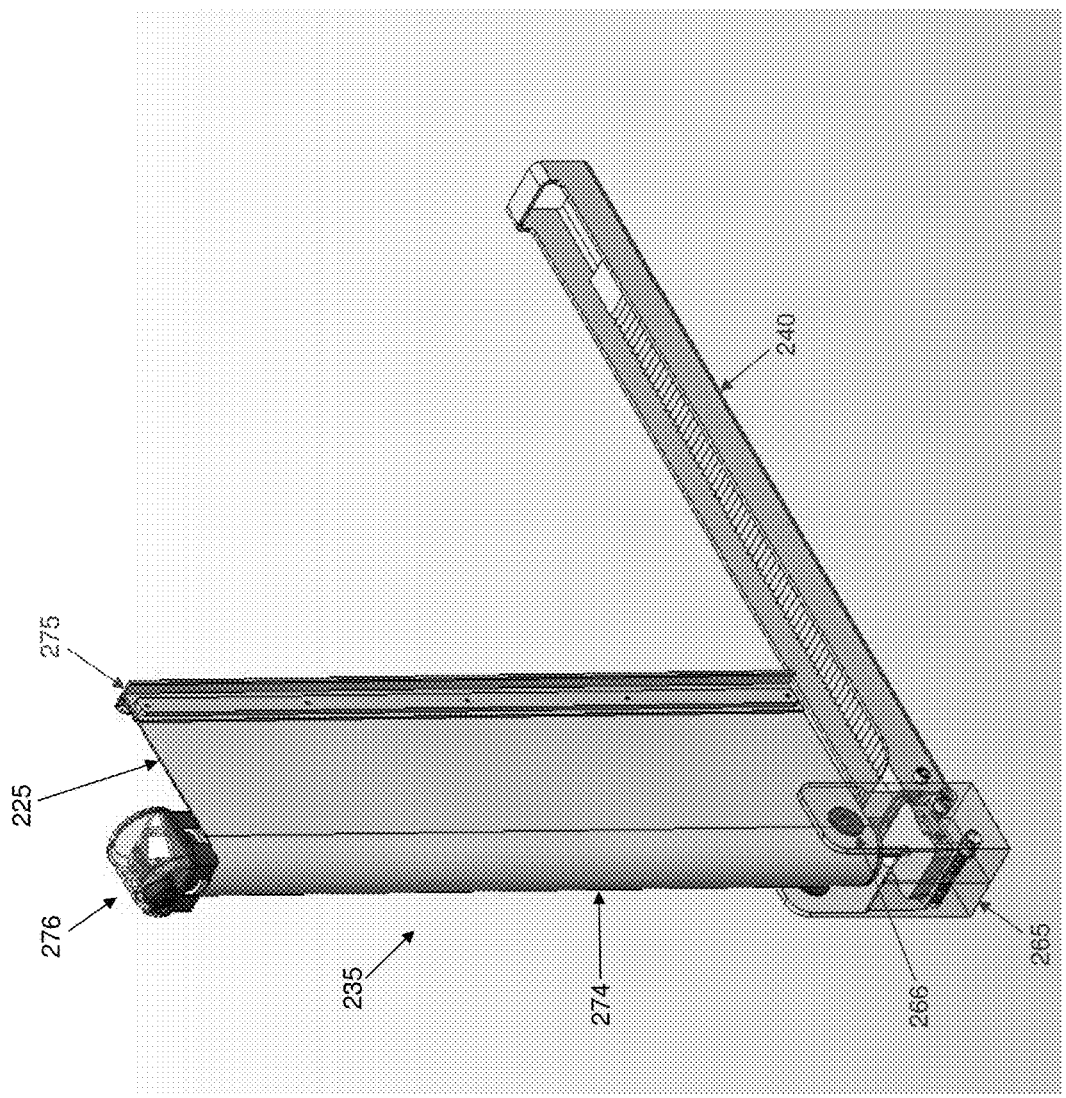
Figure 50:
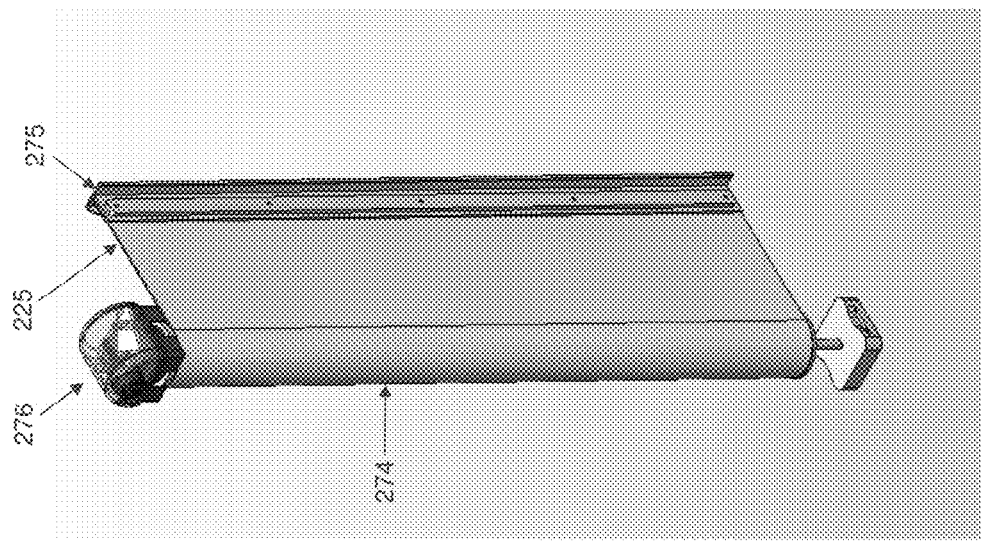
Figure 51:
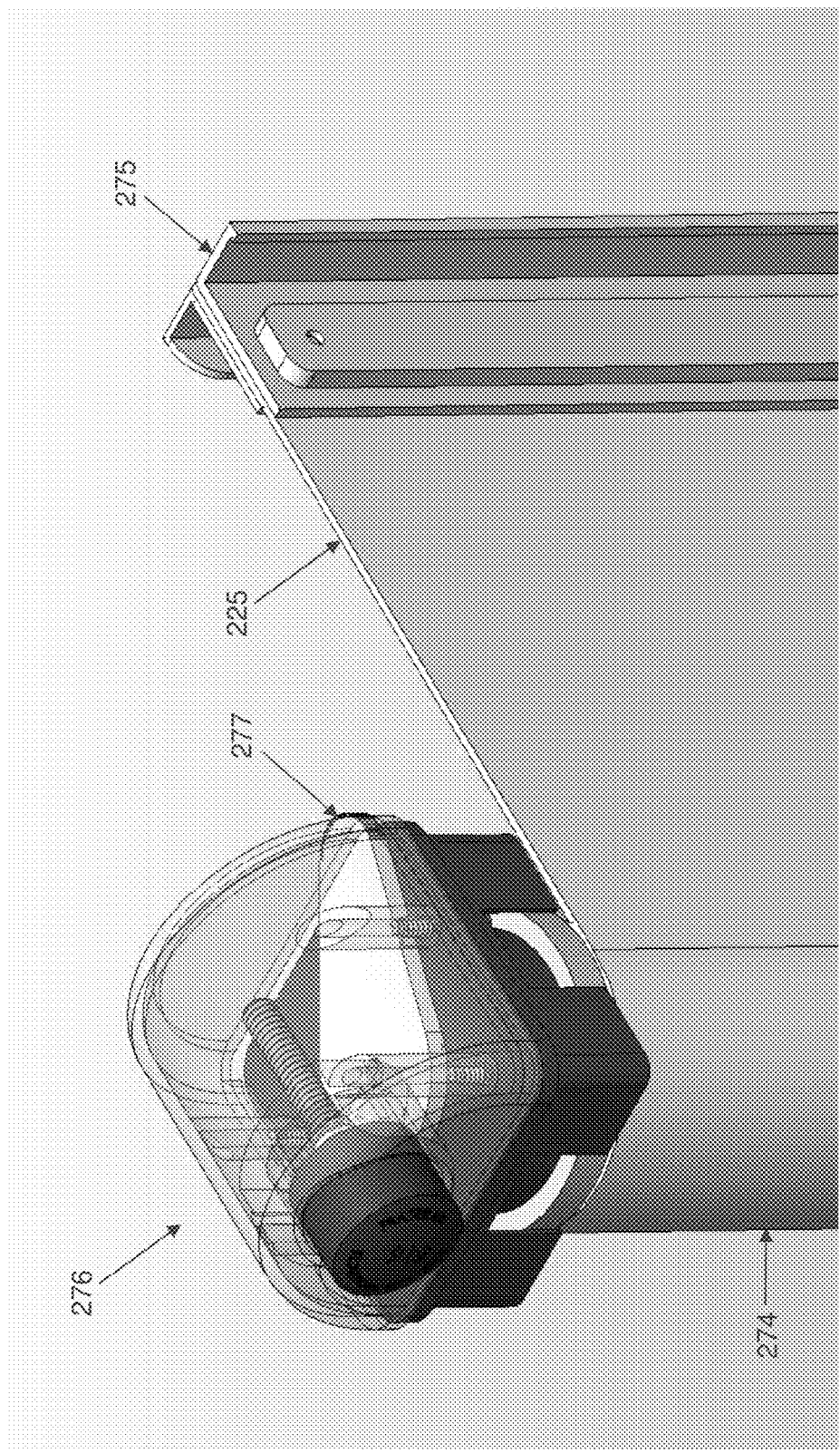
Figure 52:
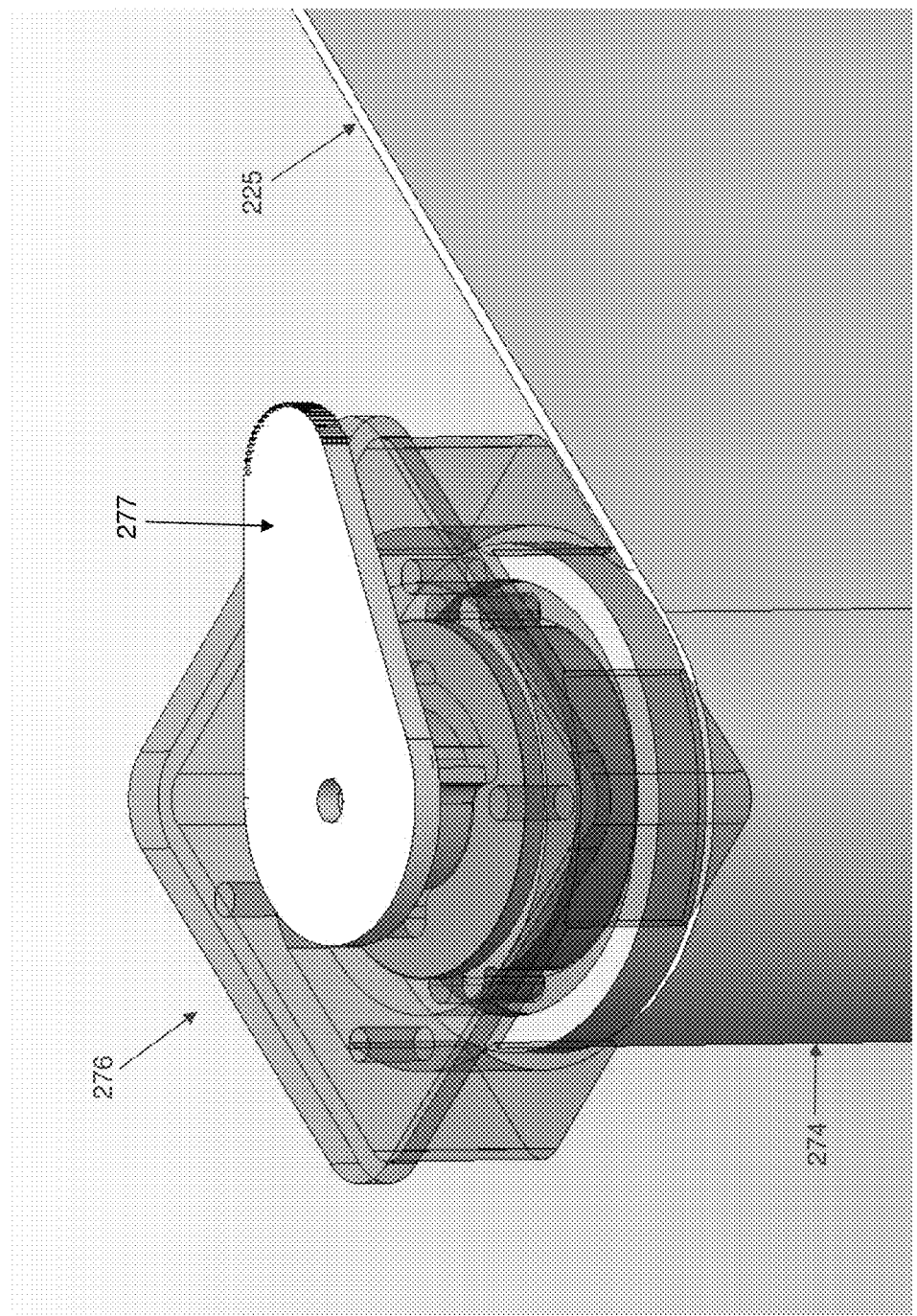
Figure 53:
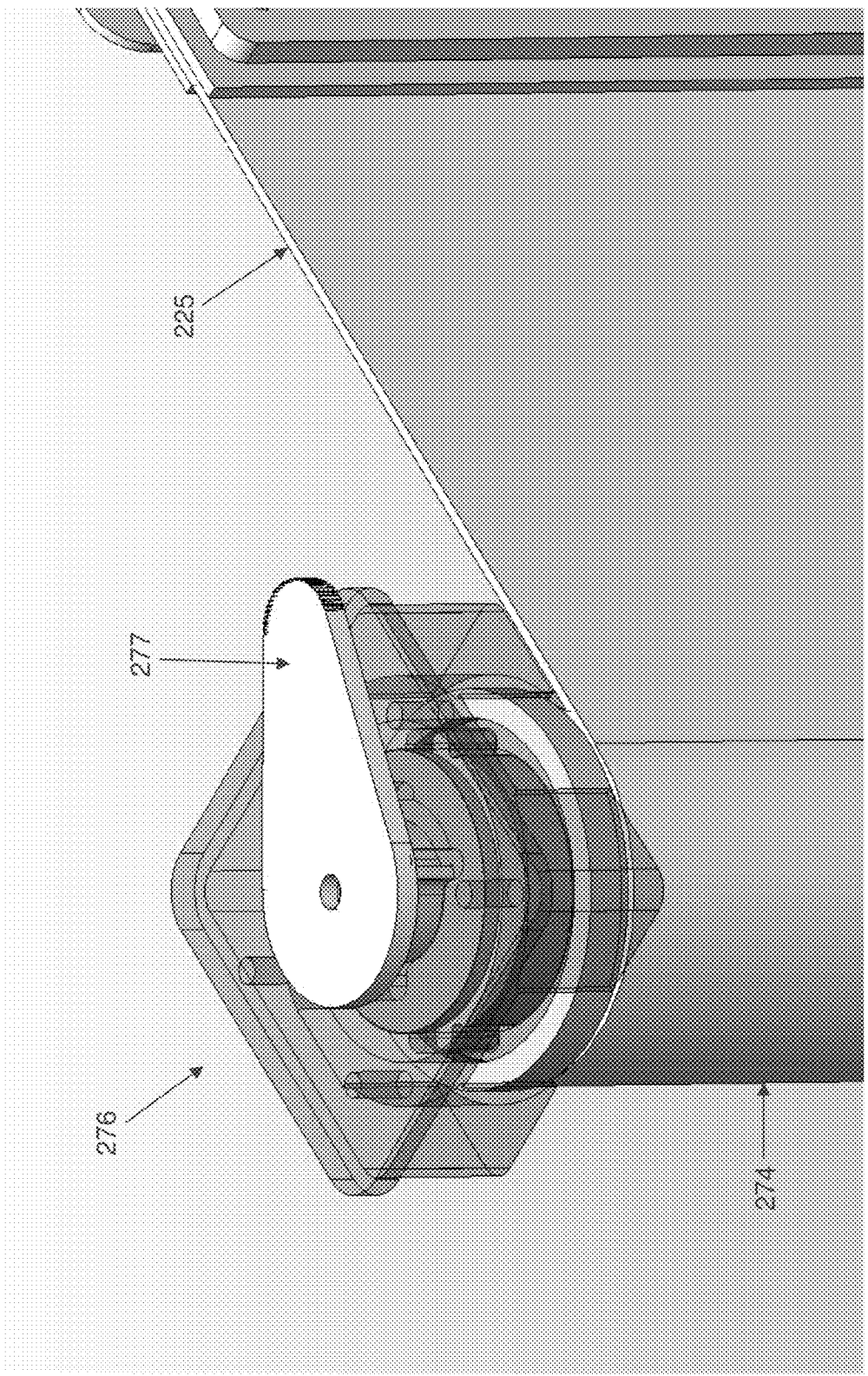
Figure 54:
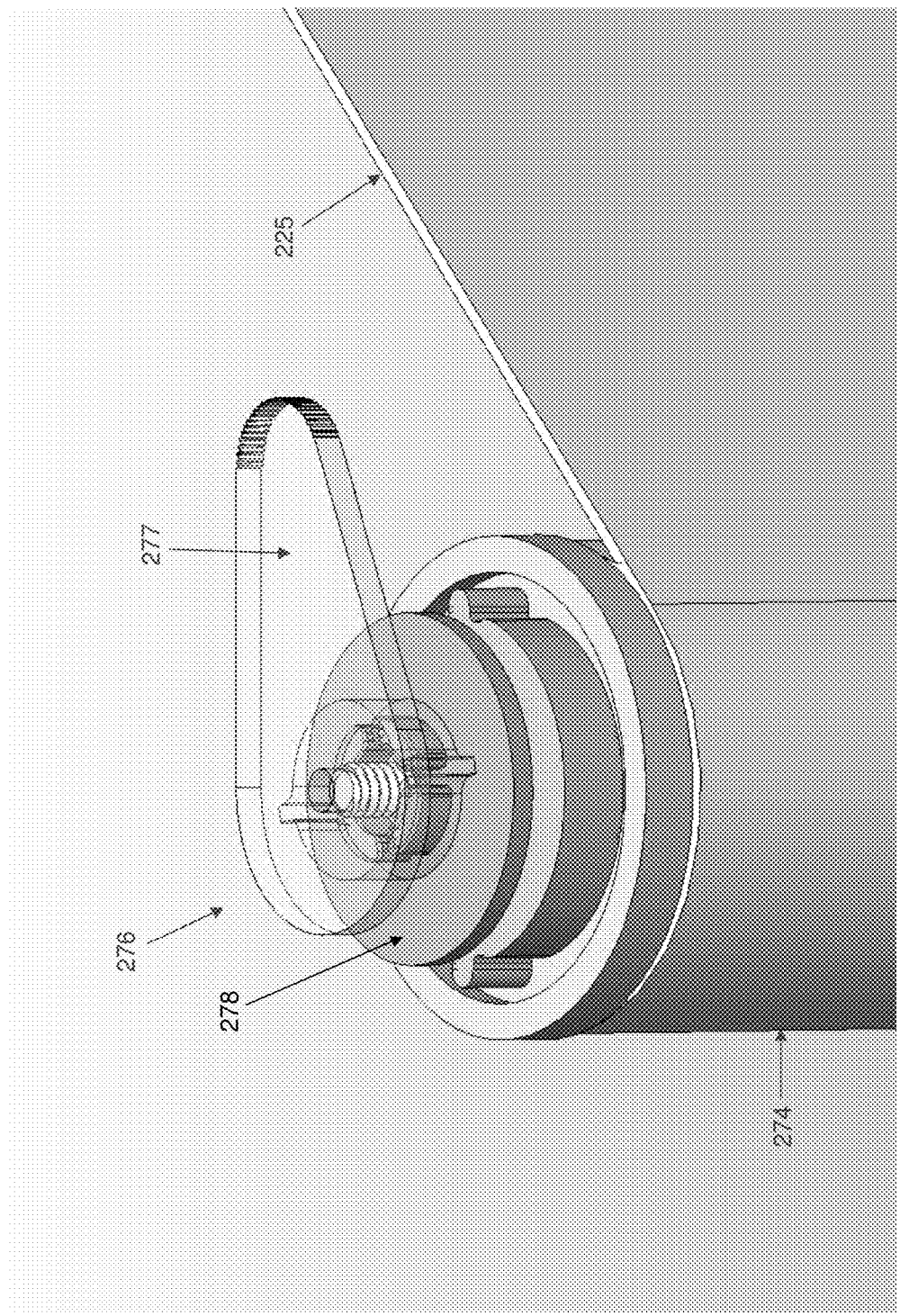
Figure 55:
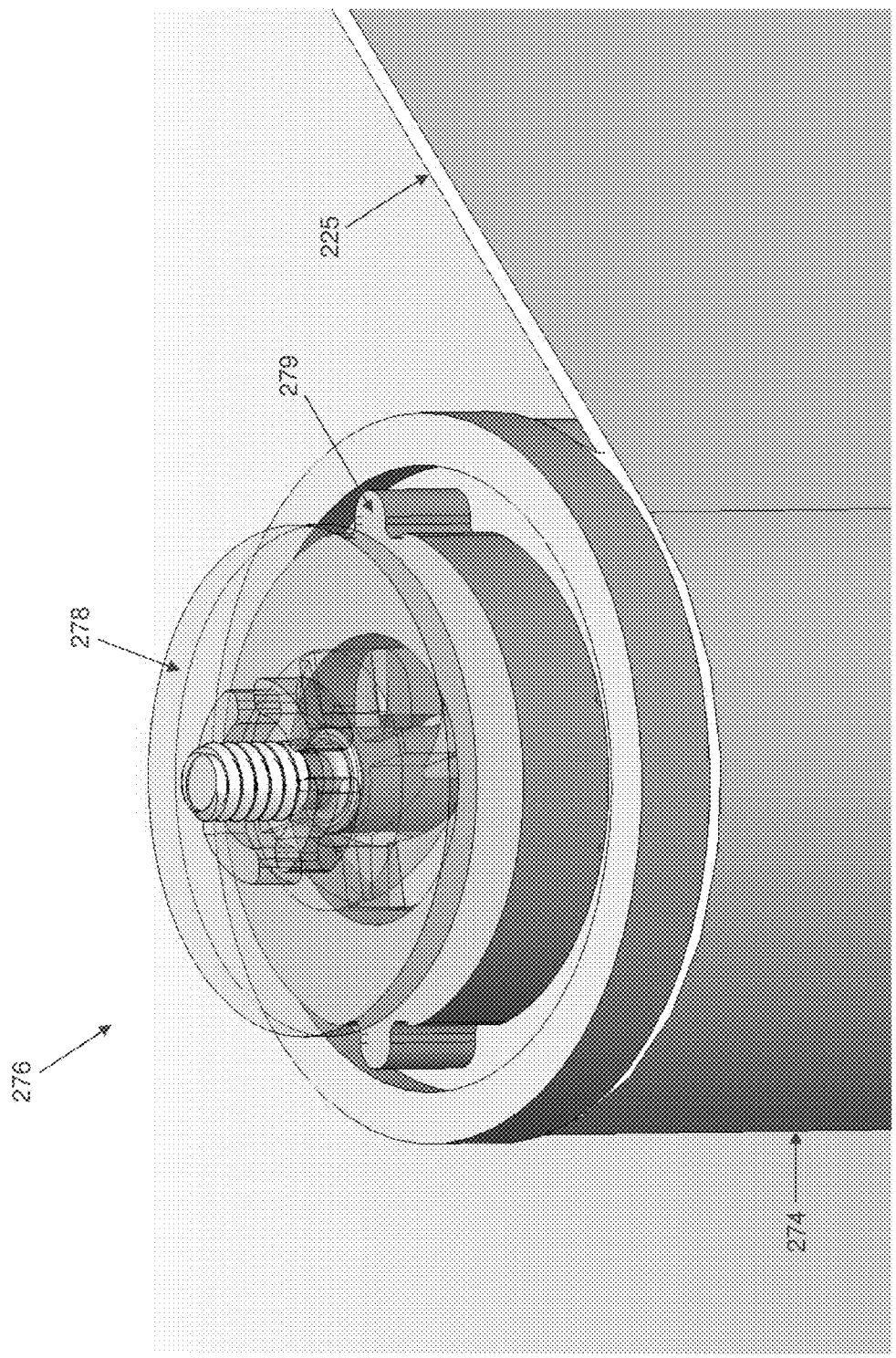
Figure 56:
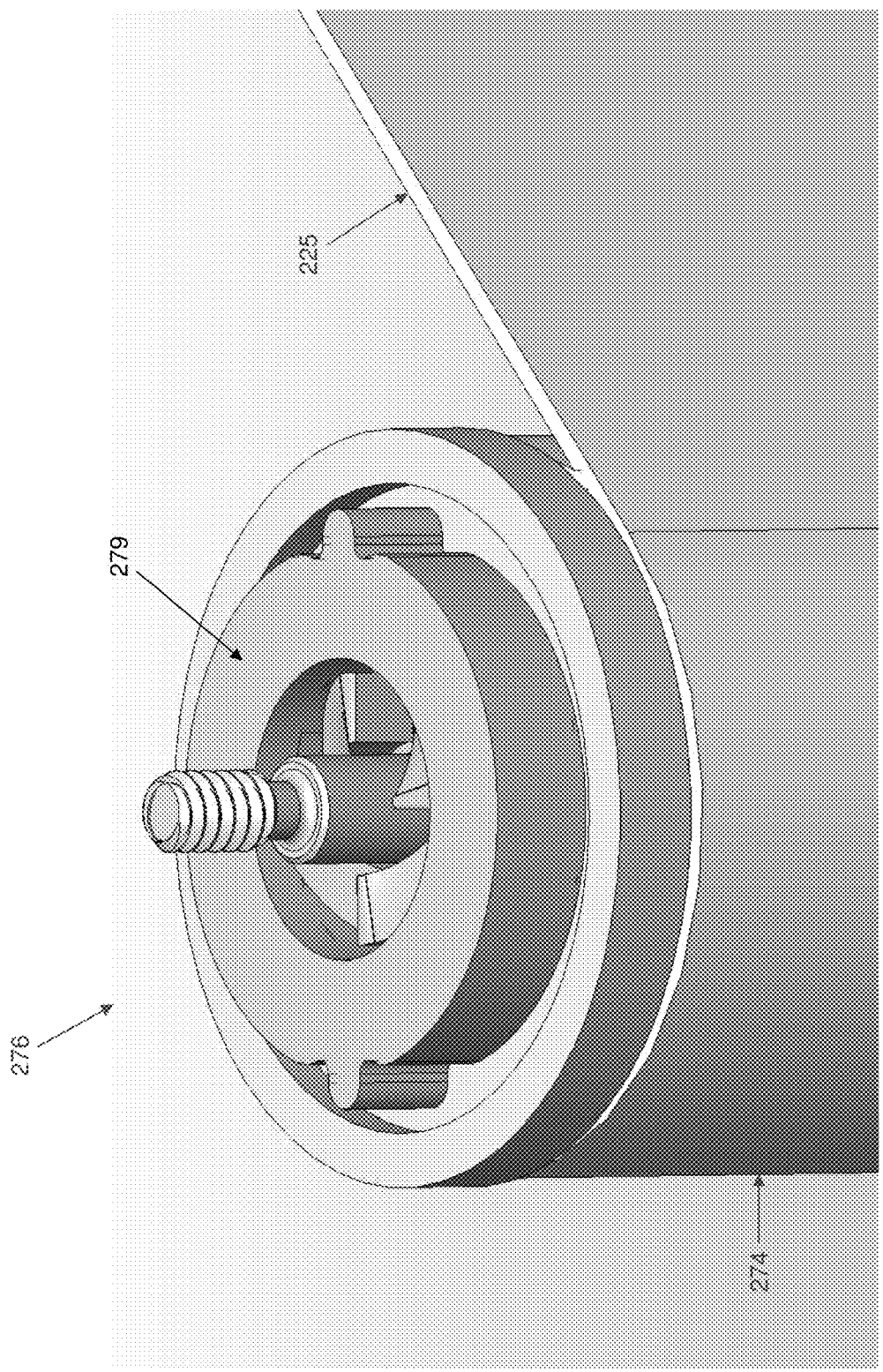
Figure 57:
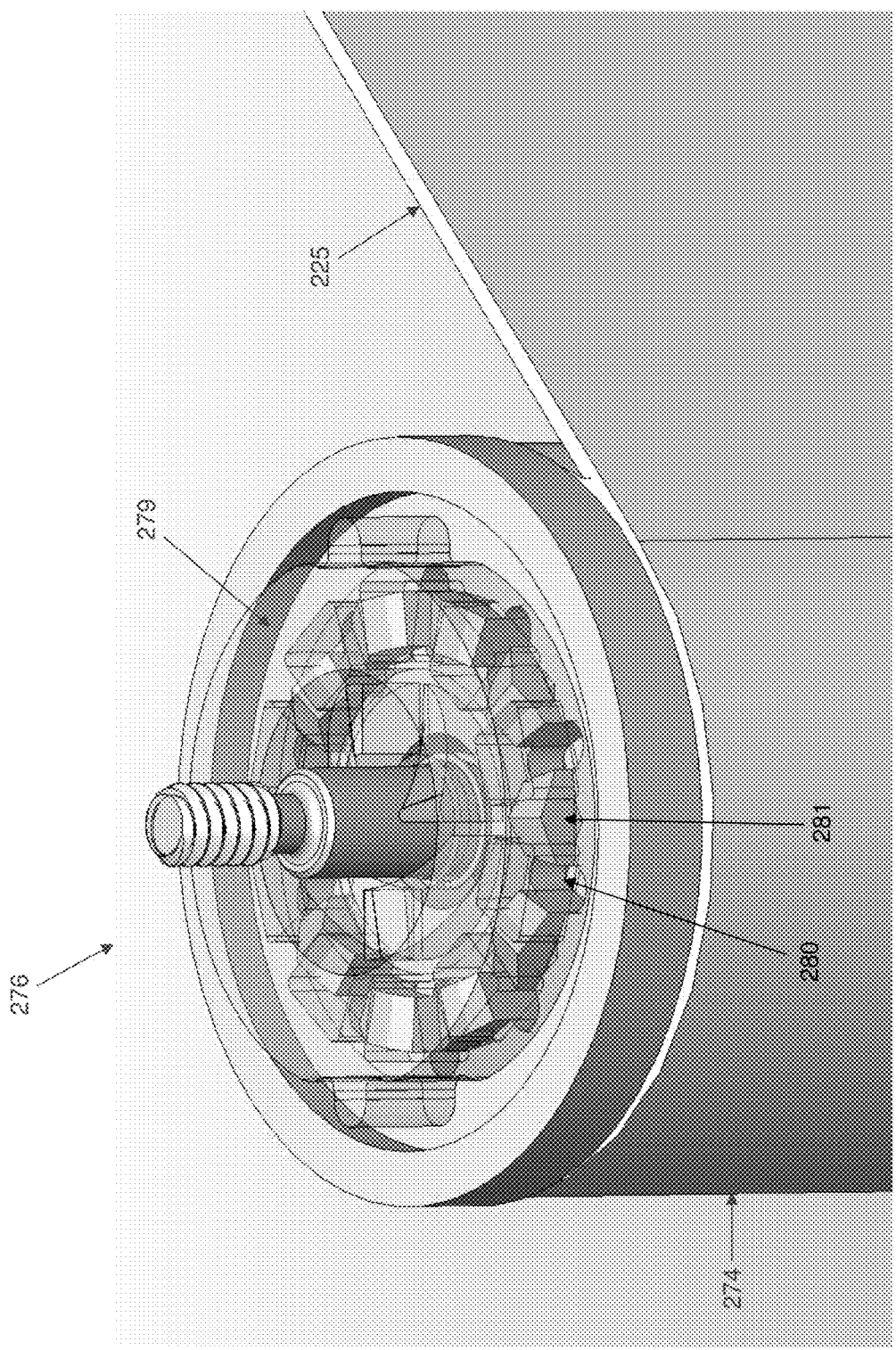
Figure 58:
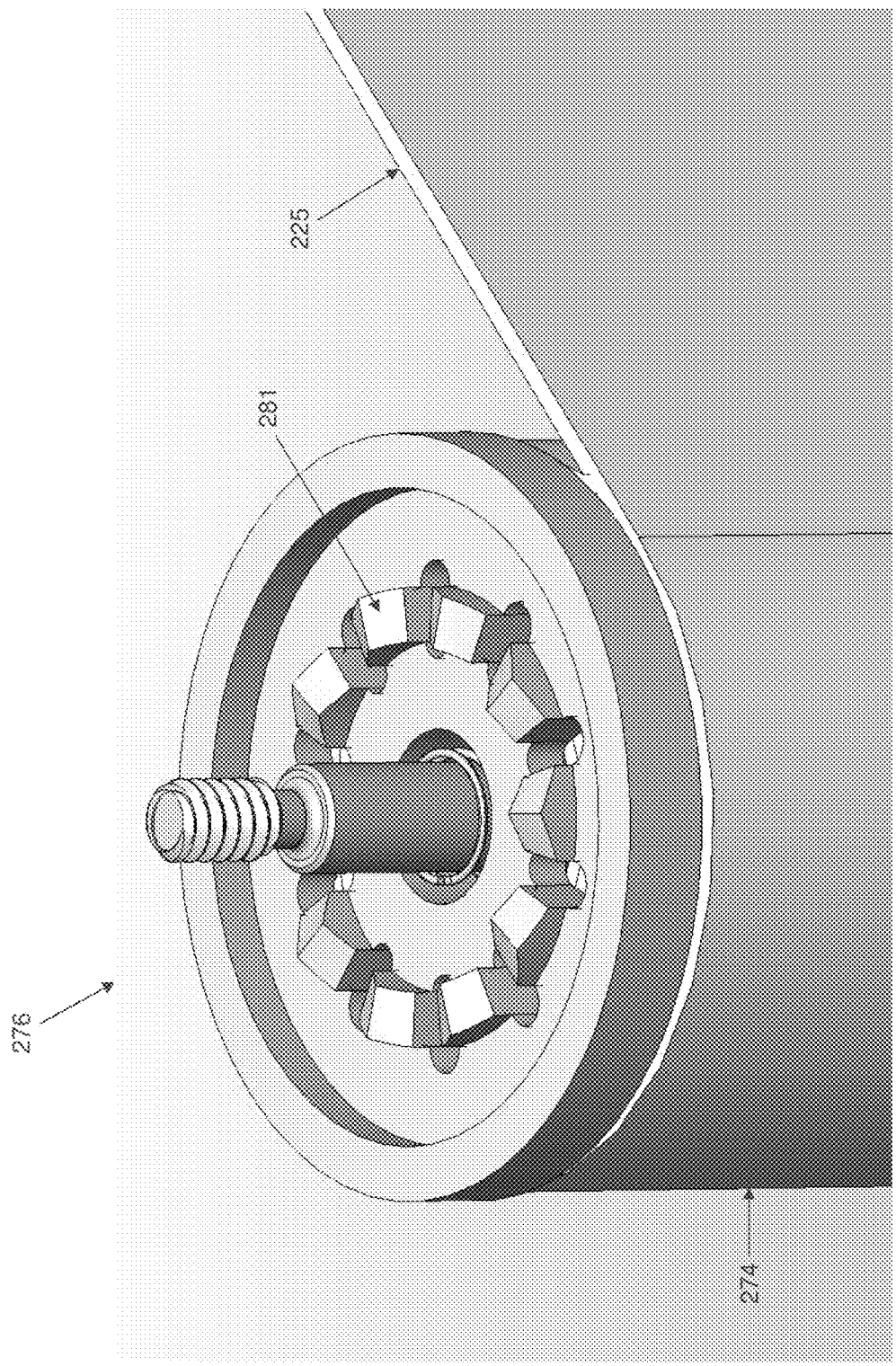
Figure 59:
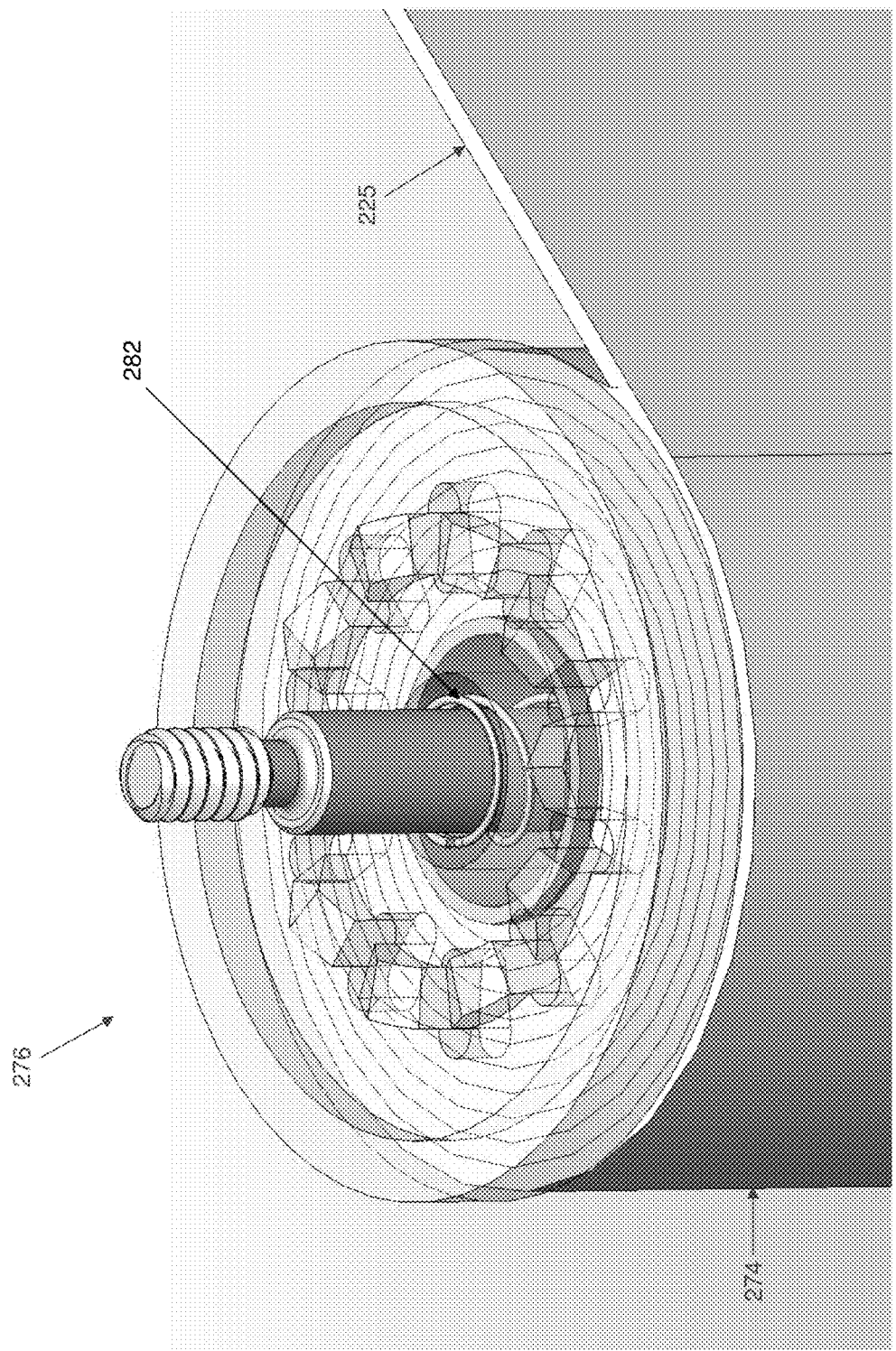
Figure 60:
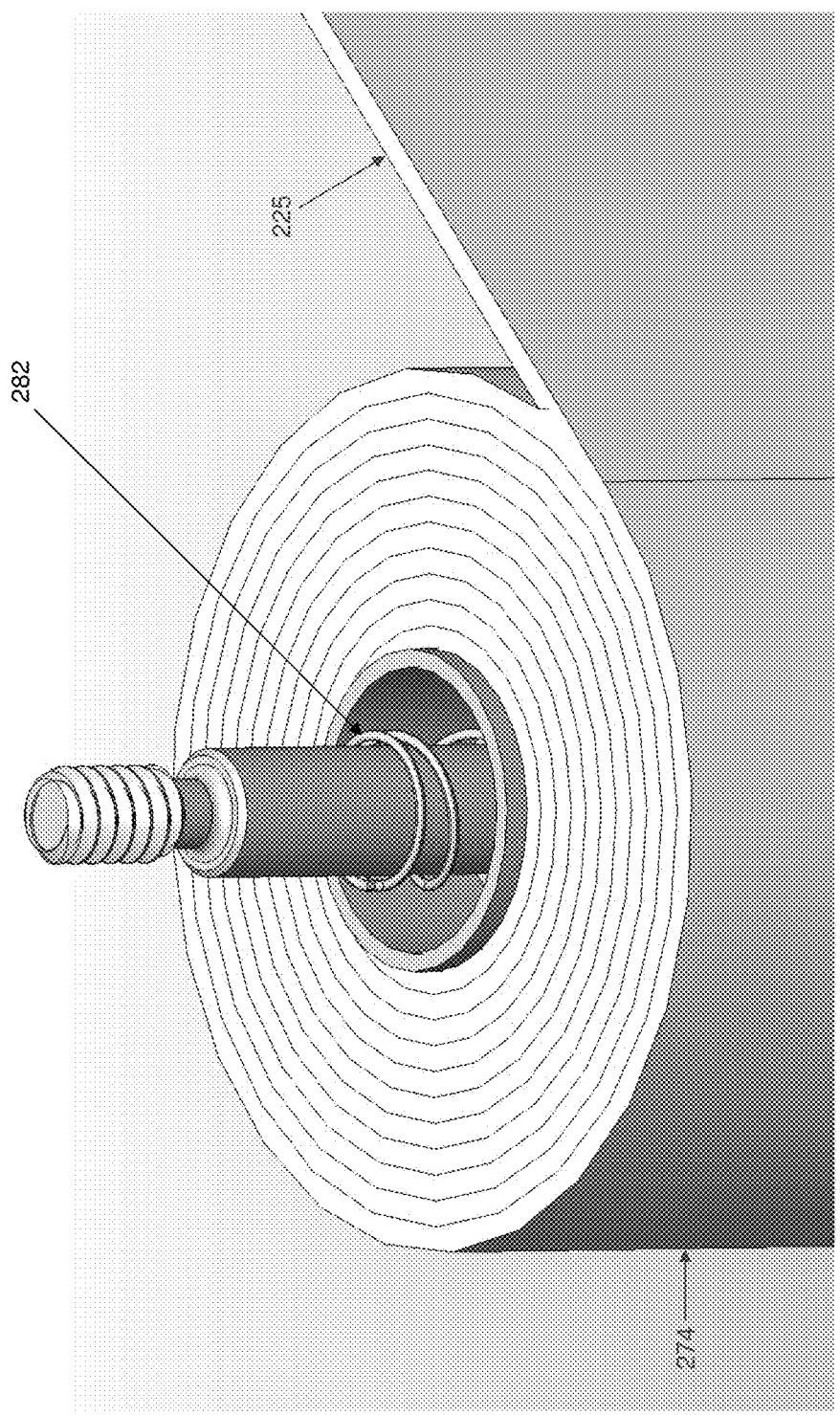
Figure 62:
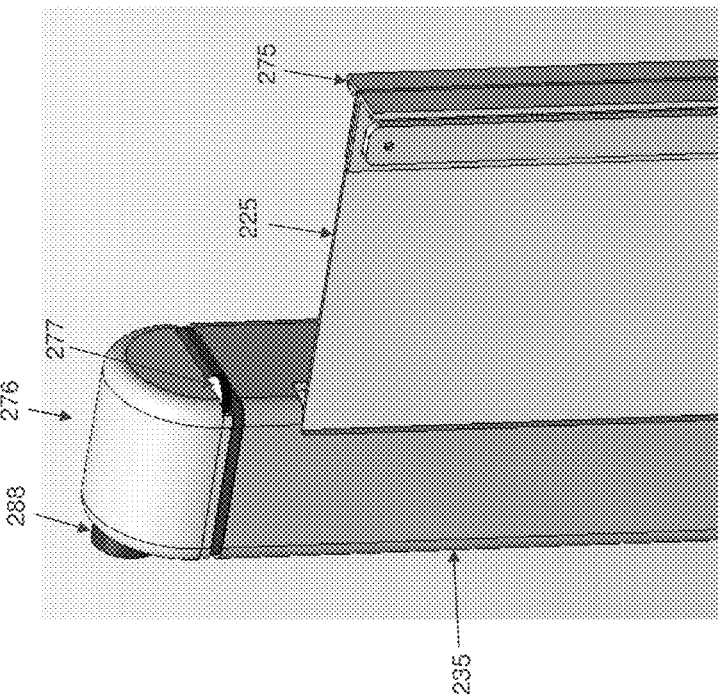
FIGS. 61-64 are schematic views showing adjustable bumpers which may be provided on the upper portions of the hinged arms of the collapsible frame of the safety gate of FIGS. 36-38.
Figure 61:
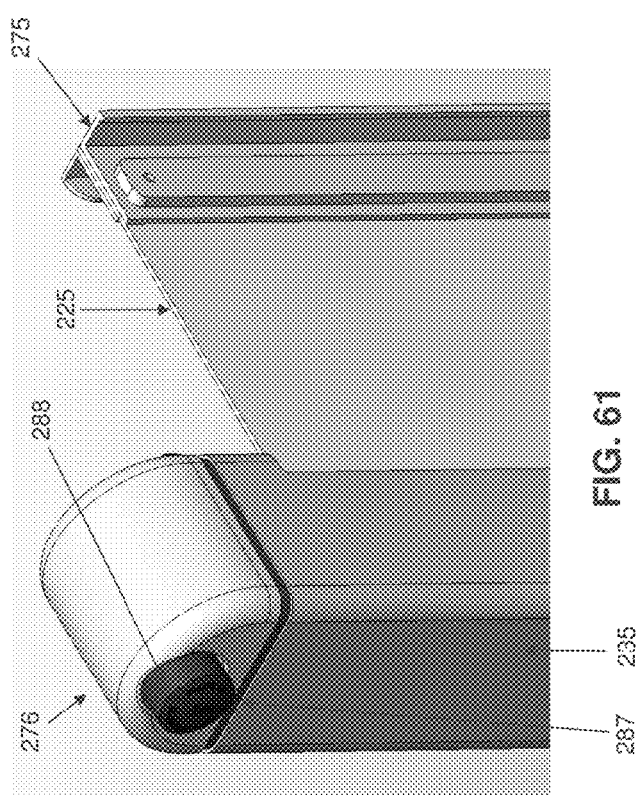
Figure 64:
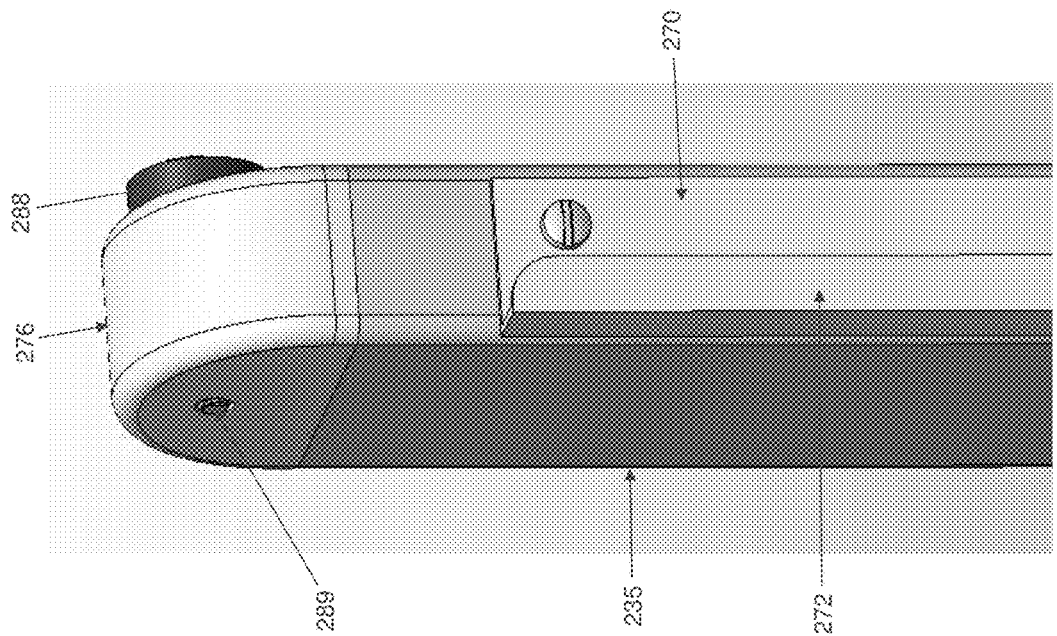
Figure 63:
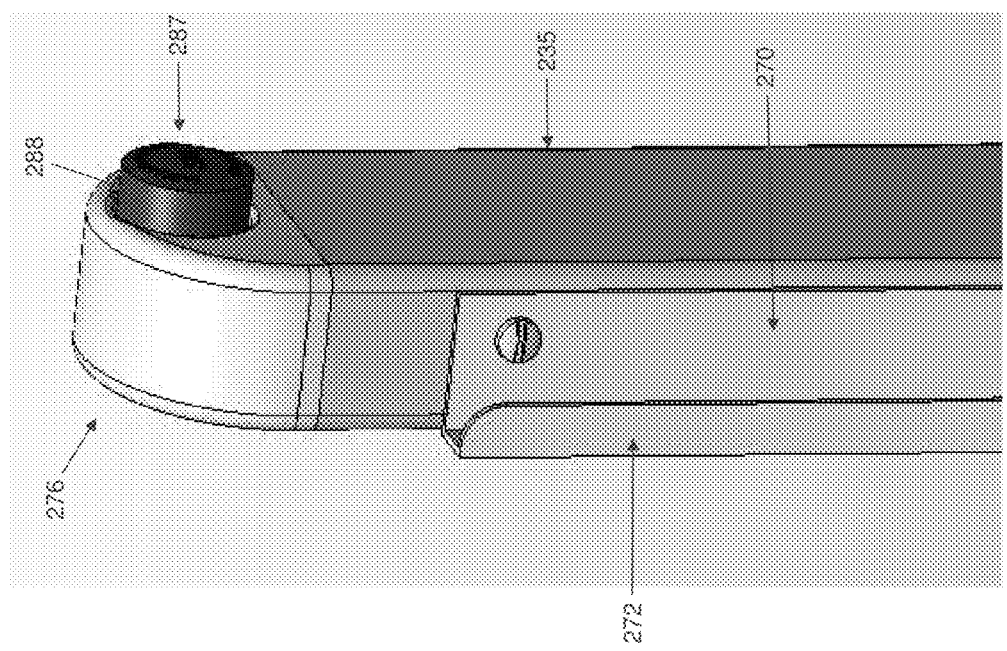

Looking now at FIGS. 44 and 45, hinged arms 235 pivot upwards from resting positions parallel to resizable base 230, pivoting on hinges 265 which are mounted to the ends of locking base members 240, 245. Hinges 265 each comprise two pins 266 which are fixed to the upper portion of each hinge 265, and a cavity 267 for receiving the end of each hinged arm 235. More particularly, pins 266 are received in a pair of diametrically-opposed slots 268 formed on the ends of each hinged arm 235 where each hinged arm 235 is mounted to a hinge 265. When hinged arms 235 are fully erect, they lock into place by sliding the ends of each hinged arm 235 on pins 266 (i.e., so that pins 266 run along slots 268 formed in each hinged arm 235) and so that the ends of each hinged arm are received in cavity 267 of each hinge 265. Hinged arms 235 can be released from their locked erect positions by pulling upwards on the hinged arms so that pins 266 ride along slots 268 and so that the ends of hinged arms 235 each exit cavity 267 of each hinge 265, and then folding the hinged arms back down on resizable base 230.

Note that when hinged arms 235 are in their erect positions, the hinged arms preferably yieldably angle outward slightly at their upper ends so as to ensure secure engagement of the hinged arms with the vertical walls of the doorway (or hallway or walkway). In other words, hinged arms 235 diverge outwardly as they extend away from resizable base 230, and hinged arms 235 are resilient so that they can be urged inwardly towards one another.

Note also that one of the hinged arms 235 includes a fastener 270 to which flexible barrier 225 may be releasably secured. In a preferred form of the present invention, fastener 270 comprises a hook-shaped clasp 272 which extends along substantially the entire length of one of the hinged arms 235. See FIG. 46. Clasp 272 is configured to receive and retain the free end of flexible barrier 225, as will hereinafter be discussed in further detail.

And note that resizable base 230 and hinged arms 235 may be folded up to a compact condition for easy transport and storage, i.e., with resizable base 230 reduced in size and with hinged arms 235 extending parallel to resizable base 230.

The Flexible Barrier

Flexible barrier 225 comprises a flexible material which is capable of preventing a pet or small child from passing by safety gate 205. By way of example but not limitation, flexible barrier 225 may comprise a woven mesh or screen which is preferably inelastic or nominally elastic.

In this form of the invention, and looking next at FIGS. 47-60, flexible barrier 225 is preferably stowed within one of the hinged arms 235 of collapsible frame 270 (i.e., the collapsible arm 235 opposite the collapsible arm to which fastener 270 is mounted) until needed.

More particularly, in this form of the invention, one of collapsible arms 235 comprises a cavity 273 having a spool 274 longitudinally disposed therein (i.e., parallel to the longitudinal axis of the collapsible arm 235). Spool 274 is preferably spring-biased so as to "take up" (and stow) flexible barrier 225 within the collapsible arm when desired (e.g., in a manner similar to how a window shade takes up the excess portion of the shade on a spring-biased spool). The free end of flexible barrier 225 comprises a clasp 275 for engagement with clasp 272 of collapsible arm 235. Note that the particular configurations of clasp 272 (on a hinged arm 235) and clasp 275 (on flexible barrier 225) may vary in type and location—the important thing is that the configurations of clasp 272 and clasp 275 be coordinated with one another so that clasp 272 and clasp 275 may selectively lock together or unlock from one another as needed.

In one form of the invention, flexible barrier 225 can be pulled out of spool 274 and remain under retractive tension as flexible barrier 225 is brought across to the opposing collapsible arm 235 and is releasably secured to clasp 272 of that collapsible arm 235.

In another form of the invention, a lock mechanism can be provided to lock spool 274 against movement when flexible barrier 225 has been brought across to the opposing collapsible arm 235 and has been releasably secured to clasp 272 of that collapsible arm 235. More particularly, in this form of the invention, a lock mechanism 276 is preferably disposed on the free end of the collapsible arm 235 which houses locking spool 274 for selectively locking spool 274 in a locked condition.

In one preferred form of the invention, lock mechanism 276 comprises a lever 277 mounted to a rotatable cam 278 which cams against a locking plate 279 mounted to the end of spool 274. Locking plate 279 has teeth 280 which can engage teeth 281 on spool 274. Locking plate 279 is normally spring-biased away from spool 274 by a spring 282, so that teeth 280 on locking plate 279 normally do not engage teeth 281 of spool 274 and spring-biased spool 274 is free to apply tension to flexible barrier 225. However, when lever 277 is rotated, cam 278 rotates, whereby to cam locking plate 279 downward (i.e., perpendicular to the axis of rotation of lever 277) and thereby cause teeth 280 (on locking plate 279) to engage teeth 281 (of spool 274), whereby to lock spool 274 against rotation. When lever 277 is rotated in the opposite direction, cam 278 disengages locking plate 279, thereby allowing locking plate 279 to move upward (i.e., under the power of a spring), whereby to allow spool 274 to rotate (i.e., to retract flexible barrier 225).

Note that it is generally preferred to provide a lock mechanism (e.g., the lock mechanism 276 discussed above) for spool 274, since this will prevent pets and small children from leaning against flexible barrier 225 and pulling a greater length of the flexible barrier off spool 274—in the absence of such a lock mechanism, the spring bias on spool 274 must be set fairly high in order to prevent a pet or small child from pulling more of the flexible barrier off spool 274. Such a high spring bias could impede normal deployment of flexible barrier 225 from spool 274.

Flexible barrier 225 is attached to collapsible frame 220 after collapsible frame 220 has been set in the doorway (or hallway or walkway), with resizable base 230 appropriately sized and locked in position, and with hinged arms 235 locked in their upright position. Flexible barrier 225 is then erected between the two hinged arms 235, with flexible barrier 225 being releasably secured to fastener 270 on the opposing hinged arm 235. More particularly, flexible barrier 225 is attached to collapsible frame 220 such that flexible barrier 225 extends across the opening between hinged arms 235 by pulling flexible barrier 225 out of spool 274 and across the gap between collapsible arms 235, and then releasably connecting clasp 275 of flexible barrier 225 with clasp 272 of the opposing collapsible arm 235. In other words, in this form of the invention, flexible barrier 225 of safety gate 225 is effectively spooled out of one hinged arm 235 on collapsible frame 220 until the appropriate length of flexible barrier 225 has been dispensed.

Use of the Novel Collapsible and Flexible Safety Gate

Safety gate 205 may be used by pet owners and parents of small children to prevent pets and small children from passing through an opening and into restricted areas.

More particularly, safety gate 205 can be erected in a desired opening by setting up collapsible frame 220 in the opening so that the collapsible frame makes a pressure fit against an adjoining architectural structure, and then extending flexible barrier 225 between the two hinged arms 235 of collapsible frame 225 (i.e., by manually drawing flexible barrier 225 across to the opposing side of collapsible frame 220).

In one preferred method of use, collapsible frame 220 has its two hinged arms 235 set in their erect positions, with the upper ends of the two arms yieldably diverging from one another. Resizable base 230 is then set in opening 215, latch mechanism 250 is set in its "disengaged" position so that base members 240, 245 are free to move relative to one another, and then base members 240, 245 are telescoped apart so that the outer ends of base members 240, 245 securely engage doorframe 210, and so that the two hinged arms 235 securely engage doorframe 210. As this occurs, the two hinged arms 235 press outwardly against doorframe 210, with the two hinged arms yielding as needed, so as to ensure that collapsible frame 220 makes a secure, binding fit with doorframe 210 (i.e., so that collapsible frame 220 makes a pressure fit against doorframe 210). Then latch mechanism 250 is set in its "engaged" position so that base members 240, 245 are locked against movement relative to one another. Then lever 277 on lock mechanism 276 is unlocked, flexible barrier 225 is drawn along the length of resizable base 230, and flexible barrier 225 is secured to the opposing hinged arm 235 (e.g., via clasps 275 and 272). Then lever 277 on lock mechanism 276 is locked.

To allow an adult to pass through the gate, a person can unlock lever 277 on lock mechanism 276, and unhook flexible barrier 225 from the opposing hinged arm, whereupon the flexible barrier will automatically retract onto spring-biased spool 274. When the person has passed through the opening, they will re-extend the flexible barrier back to the opposing hinged arm, secure the flexible barrier to the opposing hinged arm via clasps 275 and 272, and re-engage lock mechanism 276 on the spool arm.

When safety gate 205 is no longer needed in that location, the safety gate may be taken down and folded up to a manageable size for easy transportation and storage.

More particularly, in one preferred method of disassembly, lock mechanism 276 on the spool arm is released, flexible barrier 225 is detached from the opposing hinged arm 235, and flexible barrier 225 is retracted into the spool arm. Then latch mechanism 250 is released and base members 240, 245 are telescoped inward, preferably to the most minimal distance. As base members 240, 245 telescope inwardly, the force securing the two hinged arms 235 against the adjoining architectural structure is disengaged (i.e., the pressure fit of collapsible frame 220 against the doorframe is released). When the base members 240, 245 are preferably at their most minimal distance, latch mechanism 250 is then re-engaged so that base members 240, 245 are locked relative to one another (this effectively prevents base members 240, 245 from being able to telescope outwardly when the safety gate is being collapsed and/or thereafter being moved). Once latch mechanism 250 has been re-engaged to lock base members 240, 245 in position relative to one another, hinged arms 235 are pulled upward, and then folded down parallel to base members 240, 245. With safety gate 205 in its collapsed condition, the safety gate may then be easily transported and stored.

Thus it will be seen that the present invention provides a self-contained safety gate 205 which is (i) collapsible to a linear configuration which is easily transported and stored, and (ii) erectable to a substantially U-shaped configuration which is pressure-mounted against the surfaces of an adjoining architectural structure, with the pressure-mounted safety gate being locked in place against the adjoining architectural structure until the latch mechanism in the resizable base is released.

Gate Bumper (Bolsters)

In one preferred form of the invention, and looking now at FIGS. 61-64, adjustable bumpers (bolsters) 287 may be provided on the outside surfaces of the upper ends of hinged arms 235. As a result, when collapsible frame 220 is set in position against adjoining architectural surfaces, adjustable bumpers 287 engage the wall, doorway, surface, etc. that the hinged arms 235 abut against. Adjustable bumpers 287 provide an additional means for ensuring that collapsible frame 220 makes a pressure fit against adjacent architectural surfaces, particularly when the adjacent architectural surfaces do not have a uniform vertical surface (e.g., such as when a wall has base boards, etc.).

In one preferred form of the invention, adjustable bumpers 287 comprise rubber cylinders 288 which are mounted to threaded shafts 289 which extend into hinged arms 235. As a result of this construction, the extent to which adjustable bumpers 287 project out of hinged arms 235 can be adjusted by turning rubber cylinders 288 on their threaded shafts 289.

It should also be appreciated that, if desired, bumpers 287 can be fixed in position relative to hinged arms 235.

It should also be appreciated that, if desired, adjustable bumpers 287 may be provided on the aforementioned hinged arms 35 of safety gate 5.

Advantages of the Invention

The present invention provides numerous advantages over prior art safety gates. For one thing, the present invention provides a flexible safety gate which is pressure-mounted to adjacent architectural structures, thus enabling the safety gate to be temporary in nature. And the present invention provides the ability to pass through the safety gate by unlatching one end of the flexible barrier from a hinged arm while a person passes through the safety gate. Also, the present invention provides a safety gate which has a flexible horizontal top "crossbar" instead of a rigid horizontal top "crossbar". Furthermore, the present invention provides a self-contained safety gate that is easily stowed and transported.

MODIFICATIONS

While the present invention has been described in terms of certain exemplary preferred embodiments, it will be readily understood and appreciated by those skilled in the art that it is not so limited, and that many additions, deletions and modifications may be made to the preferred embodiments discussed above while remaining within the scope of the present invention.

What is claimed is:

1. A safety gate for preventing pets and small children from passing through an opening, the safety gate comprising:

a collapsible frame for selective disposition in the opening, the collapsible frame comprising:
  a resizable base having a first end, a second end, and a longitudinal axis extending therebetween, the resizable base being configured so that a distance extending between the first end and the second end is adjustable; and
  first and second arms, each of the first and second arms comprising a bottom end and a top end, wherein the bottom end of each of the first and second arms is adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and a flexible barrier for adjustable mounting to the collapsible frame so as to prevent a pet or small child from passing through the space between the resizable base and the first and second arms;

wherein the first and second arms are configured such that when the first and second arms are in the expanded configuration, the top ends of the first and second arms are yieldably angled outboard relative to an axis extending perpendicular to the longitudinal axis of the resizable base, whereby to secure the top ends of the first and second arms in the opening.

2. A safety gate according to claim 1 wherein the first and second arms are configured to yieldably diverge from one another as the first and second arms extend away from the resizable base.

3. A safety gate according to claim 1 wherein the first and second arms are hingedly connected to the first and second ends of the resizable base.

4. A safety gate according to claim 1 wherein the resizable base comprises first and second base members which are telescopically extendable relative to one another.

5. A safety gate according to claim 4 wherein the first and second base members are selectively lockable in position relative to one another.

6. A safety gate according to claim 1 wherein the flexible barrier is configured to be hung on the first and second arms.

7. A safety gate according to claim 6 wherein the first and second arms have fasteners thereon, and further wherein the flexible barrier is configured to be hung on the first and second arms using the fasteners.

8. A safety gate according to claim 6 wherein at least a portion of the flexible barrier is elastic.

9. A safety gate according to claim 8 wherein a top portion of the flexible barrier is elastic.

10. A safety gate according to claim 6 wherein the flexible barrier comprises a flexible net.

11. A safety gate according to claim 1 wherein the first arm comprises a spring-biased spool for spooling the flexible barrier onto the first arm.

12. A safety gate according to claim 11 wherein the first arm comprises a lock for locking the spring-biased spool against movement.

13. A safety gate according to claim 11 wherein the second arm comprises a fastener for releasably securing the flexible barrier to the second arm.

14. A method for preventing pets and small children from passing through an opening, the method comprising:

providing a safety gate, the safety gate comprising:

a collapsible frame for selective disposition in the opening, the collapsible frame comprising:

a resizable base having a first end, and a second end, and a longitudinal axis extending therebetween, the resizable base being configured so that a distance extending between the first end and the second end is adjustable; and first and second arms, each of the first and second arms comprising a bottom end and a top end, wherein the bottom end of each of the first and second arms is adjustably secured to the first and second ends of the resizable base, respectively, so as to be re-configurable between (i) a collapsed configuration wherein the first and second arms extend substantially parallel to one another and substantially parallel to the resizable base, and (ii) an expanded configuration wherein the first and second arms extend upright from the resizable base so that the collapsible frame comprises a substantially U-shaped configuration defining a space between the resizable base and the first and second arms; and a flexible barrier for adjustable mounting to the collapsible frame so as to prevent a pet or small child from passing through the space between the resizable base and the first and second arms;

wherein the first and second arms are configured such that when the first and second arms are in the expanded configuration, the top ends of the first and second arms are yieldably angled outboard relative to an axis extending perpendicular to the longitudinal axis of the resizable base, whereby to secure the top ends of the first and second arms in the opening;

positioning the collapsible frame across the opening in its expanded configuration so that the resizable base extends along the bottom of the opening and the first and second arms extend along opposing sides of the opening, with the first and second arms applying an outward force to opposing sides of the opening; and positioning the flexible barrier on the collapsible frame so as to prevent a pet or small child from passing through the space between the resizable base and the first and second arms.

15. A method according to claim 14 further comprising:
re-positioning the flexible barrier so as to allow passage through the space between the resizable base and the first and second arms.

16. A method according to claim 15 further comprising:
re-positioning the flexible barrier on the collapsible frame so as to prevent a pet or small child from passing through the space between the resizable base and the first and second arms.

17. A method according to claim 14 further comprising:
detaching the flexible barrier from the collapsible frame;
positioning the collapsible frame in its collapsed configuration wherein the first and second arms extend substantially parallel to one another and substantially parallel to the resizable base; and
removing the collapsible frame from the opening.

18. A method according to claim 14 wherein the first and second arms are configured to yieldably diverge from one another as the first and second arms extend away from the resizable base.

19. A method according to claim 14 wherein the first and second arms are hingedly connected to the first and second ends of the resizable base.

20. A method according to claim 14 wherein the resizable base comprises first and second base members which are telescopically extendable relative to one another.

21. A method according to claim 20 wherein the first and second base members are selectively lockable in position relative to one another.

22. A method according to claim 14 wherein the flexible barrier is configured to be hung on the first and second arms.

23. A method according to claim 14 wherein the first arm comprises a spring-biased spool for spooling the flexible barrier onto the first arm.

24. A method according to claim 23 wherein the first arm comprises a lock for locking the spring-biased spool against movement.

\* \* \* \* \*